US012786033B2

(12) United States Patent
Wang et al.

(10) Patent No.: US 12,786,033 B2
(45) Date of Patent: Nov. 3, 2026

(54) TIME DIVISION DUPLEX FRAMEWORK FOR WIRELESS ENERGY AND INFORMATION TRANSFER

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Greentown, PA (US); Luanxia Yang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 18/836,693

(22) PCT Filed: Apr. 5, 2022

(86) PCT No.: PCT/CN2022/085216

§ 371 (c)(1),
(2) Date: Aug. 7, 2024

(87) PCT Pub. No.: WO2023/193125

PCT Pub. Date: Oct. 12, 2023

(65) Prior Publication Data

US 2025/0039031 A1 Jan. 30, 2025

(51) Int. Cl.
*H04L 27/26* (2006.01)
*H04W 72/0446* (2023.01)

(52) U.S. Cl.
CPC ..... *H04L 27/2656* (2013.01); *H04W 72/0446* (2013.01)

(58) Field of Classification Search
CPC ............. H04L 27/2656; H04L 5/1469; H04W 72/0446; H04W 72/23; H02J 50/001; H02J 50/80
See application file for complete search history.

(56) References Cited

U.S. PATENT DOCUMENTS 11,736,213 B2 8/2023 Su et al.
2015/0303741 A1 10/2015 Malik et al.
(Continued)

FOREIGN PATENT DOCUMENTS

CN 111356130 A 6/2020
CN 111918320 A 11/2020
(Continued)

OTHER PUBLICATIONS

Supplementary European Search Report EP22936075 Search Authority the Hague Oct. 30, 2025.
(Continued)

*Primary Examiner* — Vineeta S Panwalkar
(74) *Attorney, Agent, or Firm* — Holland & Hart LLP

(57) ABSTRACT

Methods, systems, and devices for wireless communications are described. An energy receiver may receive a first message that includes information indicative of a time division duplex (TDD) configuration for wireless energy and information transfer, the TDD configuration indicating a temporal arrangement of energy and information resources. In some examples, an energy transmitter may configure the TDD configuration as cell-specific, energy receiver-specific, or using a slot format indication (SFI). In addition, the TDD configuration may include flexible resources able to be used for energy or information transfer. The energy receiver may receive one or more energy signals during the energy resources in accordance with the TDD configuration, the one or more energy signals providing energy to the energy receiver. Accordingly, the energy receiver may transmit one or more information signals during the information resources in accordance with the TDD configuration.

28 Claims, 22 Drawing Sheets

(56) References Cited

U.S. PATENT DOCUMENTS

| | | | | |
|---|---|---|---|---|
| 2018/0109150 | A1* | 4/2018 | Khan | H02J 50/20 |
| 2022/0303108 | A1* | 9/2022 | Faxér | H04L 5/1461 |

FOREIGN PATENT DOCUMENTS

| | | | |
|---|---|---|---|
| CN | 113872629 | A | 12/2021 |
| EP | 3927062 | A1 | 12/2021 |
| WO | WO-2020236664 | A1 | 11/2020 |

OTHER PUBLICATIONS

International Search Report and Written Opinion—PCT/CN2022/085216—ISA/EPO—Nov. 29, 2022.

* cited by examiner

TIME DIVISION DUPLEX FRAMEWORK FOR WIRELESS ENERGY AND INFORMATION TRANSFER

CROSS REFERENCE

The present application is a 371 national stage filing of International PCT Application No. PCT/CN2022/085216 by WANG et al. entitled "TIME DIVISION DUPLEX FRAMEWORK FOR WIRELESS ENERGY AND INFORMATION TRANSFER," filed Apr. 5, 2022, which is assigned to the assignee hereof, and which is expressly incorporated by reference in its entirety herein.

FIELD OF TECHNOLOGY

The following relates to wireless communications, including time division duplex (TDD) framework for wireless energy and information transfer.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support communications between an energy transmitter device and an energy receiver device. The energy receiver device may harvest energy from an energy signal transmitted by the energy transmitter device in order to process signals received from the energy transmitter device and transmit signals to the energy transmitter device. In some cases, however, the energy signals transmitted by the energy transmitter device and the signals transmitted by the energy receiver device may collide or interfere if the signals are transmitted in a same time interval.

SUMMARY

The described techniques relate to improved methods, systems, devices, and apparatuses that support a time division duplex (TDD) framework for wireless energy and information transfer. For example, the described techniques provide for the indication of a TDD configuration (e.g., framework) for wireless energy transfer (WET) and wireless information transfer (WIT) between an energy transmitter device and an energy receiver device. In some examples, the energy transmitter device (e.g., a network entity) may transmit a first message to the energy receiver device indicating the TDD configuration, which may indicate a temporal arrangement of energy resources and information resources (e.g., energy reception and information transmission resources for the energy receiver device, energy transmission and information reception resources for the energy transmitter device). In some examples, the energy receiver device (e.g., an internet of things (IoT) device, a user equipment (UE)) may receive one or more energy signals during an energy reception resource in accordance with the TDD configuration (e.g., in a WET operation), where the energy signals may provide energy to the energy receiver device for a subsequent WIT operation. As such, the energy receiver device may transmit one or more second messages during information transmission resources in accordance with the TDD configuration, where the second messages may include information signals.

In some examples, the energy transmitter device may configure different types of TDD configurations, and accordingly, may transmit different information including an indication of these TDD configurations to the energy receiver device. For example, the TDD configuration may include a cell-specific, static framework, which the energy transmitter device may indicate to one or more energy receiver devices in a system information block (SIB) or a master information block (MIB). In this case, the energy transmitter device may use one or more pattern configurations to schedule specific slots or symbols for use in WET and WIT operations. In another example, the TDD configuration may be specific to the energy receiver device (e.g., a UE-specific TDD configuration), and the energy transmitted device may transmit dedicated signaling to the energy receiver device indicating the energy receiver-specific TDD configuration. In this case, the energy receiver-device specific TDD configuration may override any flexible resource configurations previously made by the energy transmitter device. In some examples, the energy transmitter device may utilize group signaling to indicate a slot format indication (SFI) to the energy receiver device, where the energy transmitter device may use the SFI to dynamically configure energy and information resources according to data (e.g., traffic patterns, energy requirements) indicated by the energy receiver device.

A method for wireless communication at an energy receiver device is described. The method may include receiving a first message that includes information indicative of a TDD configuration for energy reception and information transmission, the TDD configuration indicating a temporal arrangement of energy reception resources and information transmission resources, receiving one or more energy signals during the energy reception resources in accordance with the TDD configuration, the one or more energy signals providing energy to the energy receiver device, and transmitting one or more second messages during the information transmission resources in accordance with the TDD configuration.

An apparatus for wireless communication at an energy receiver device is described. The apparatus may include a processor, memory coupled with the processor, and instructions stored in the memory. The instructions may be executable by the processor to cause the apparatus to receive a first message that includes information indicative of a TDD configuration for energy reception and information transmission, the TDD configuration indicating a temporal arrangement of energy reception resources and information transmission resources, receive one or more energy signals during the energy reception resources in accordance with the TDD configuration, the one or more energy signals providing energy to the energy receiver device, and transmit one or more second messages during the information transmission resources in accordance with the TDD configuration.

Another apparatus for wireless communication at an energy receiver device is described. The apparatus may include means for receiving a first message that includes information indicative of a TDD configuration for energy reception and information transmission, the TDD configuration indicating a temporal arrangement of energy reception resources and information transmission resources, means for receiving one or more energy signals during the energy reception resources in accordance with the TDD configuration, the one or more energy signals providing energy to the energy receiver device, and means for transmitting one or more second messages during the information transmission resources in accordance with the TDD configuration.

A non-transitory computer-readable medium storing code for wireless communication at an energy receiver device is described. The code may include instructions executable by a processor to receive a first message that includes information indicative of a TDD configuration for energy reception and information transmission, the TDD configuration indicating a temporal arrangement of energy reception resources and information transmission resources, receive one or more energy signals during the energy reception resources in accordance with the TDD configuration, the one or more energy signals providing energy to the energy receiver device, and transmit one or more second messages during the information transmission resources in accordance with the TDD configuration.

Some examples of the method, apparatuses, and non-transitory computer-readable medium described herein may further include operations, features, means, or instructions for identifying that the temporal arrangement indicated by the TDD configuration includes a combination of energy reception resources, information transmission resources, and flexible resources, where the flexible resources may be able to be used for either energy reception or information transmission.

Some examples of the method, apparatuses, and non-transitory computer-readable medium described herein may further include operations, features, means, or instructions for determining to use a flexible resource for energy reception or information transmission based on at least one of an energy storage capability or an energy charging capability of the energy receiver device.

In some examples of the method, apparatuses, and non-transitory computer-readable medium described herein, the TDD configuration may be cell-specific to an energy transmitter device that may be in communication with the energy receiver device.

In some examples of the method, apparatuses, and non-transitory computer-readable medium described herein, receiving the first message may include operations, features, means, or instructions for receiving the information indicative of the TDD configuration via at least one of a SIB or a broadcast channel that includes a MIB.

In some examples of the method, apparatuses, and non-transitory computer-readable medium described herein, the TDD configuration may be one of a set of multiple pre-configured TDD configurations.

In some examples of the method, apparatuses, and non-transitory computer-readable medium described herein, the temporal arrangement of the energy reception resources and the information transmission resources may be within a first time period having a first periodicity and that includes the energy reception resources followed by the information transmission resources, where the energy reception resources include one or more energy reception slots at a beginning of the first time period and the information transmission resources include one or more information transmission slots at an end of the first time period.

In some examples of the method, apparatuses, and non-transitory computer-readable medium described herein, the temporal arrangement of the energy reception resources and the information transmission resources further includes one or more energy reception symbols in a partial energy reception slot that follows the one or more energy reception slots and one or more information transmission symbols in a partial information transmission slot that precedes the one or more information transmission slots.

In some examples of the method, apparatuses, and non-transitory computer-readable medium described herein, the temporal arrangement of the energy reception resources and the information transmission resources further includes flexible resources in the partial energy reception slot, in the partial information transmission slot, and in one or more flexible slots that may be temporally between the energy reception resources and the information transmission resources, where the flexible resources may be able to be used for either energy reception or information transmission.

In some examples of the method, apparatuses, and non-transitory computer-readable medium described herein, the first periodicity aligns the first time period with a TDD radio frame boundary.

In some examples of the method, apparatuses, and non-transitory computer-readable medium described herein, the temporal arrangement of the energy reception resources and the information transmission resources may be within a combination of a first time period having a first periodicity and a second time period having a second periodicity, where the first time period includes a first portion of the energy reception resources followed by a first portion of the information transmission resources and the second time period includes a second portion of the energy reception resources followed by a second portion of the information transmission resources, where the energy reception resources include one or more first energy reception slots at a beginning of the first time period and one or more second energy reception slots at a beginning of the second time period, and the information transmission resources include one or more first information transmission slots at an end of the first time period and one or more second information transmission slots at an end of the second time period.

In some examples of the method, apparatuses, and non-transitory computer-readable medium described herein, the temporal arrangement of the energy reception resources and the information transmission resources further includes one or more first energy reception symbols in a first partial energy reception slot that follows the one or more first energy reception slots in the first time period, one or more second energy reception symbols in a second partial energy reception slot that follows the one or more second energy reception slots in the second time period, one or more first information transmission symbols in a first partial information transmission slot that precedes the one or more first information transmission slots in the first time period, and one or more second information transmission symbols in a second partial information transmission slot that precedes the one or more second information transmission slots in the second time period.

In some examples of the method, apparatuses, and non-transitory computer-readable medium described herein, the temporal arrangement of the energy reception resources and the information transmission resources further includes flexible resources in the first partial energy reception slot, in the first partial information transmission slot, in the second partial energy reception slot, in the second partial information transmission slot, in one or more first flexible slots that may be temporally between the one or more first energy reception slots and the one or more first information transmission slots, and in one or more second flexible slots that may be temporally between the one or more second energy reception slots and the one or more second information transmission slots, where the flexible resources may be able to be used for either energy reception or information transmission.

In some examples of the method, apparatuses, and non-transitory computer-readable medium described herein, the first periodicity and the second periodicity combine to align the temporal arrangement with a TDD radio frame boundary.

Some examples of the method, apparatuses, and non-transitory computer-readable medium described herein may further include operations, features, means, or instructions for receiving a third message via signaling that may be specific to the energy receiver device, the third message indicative of an energy receiver device-specific TDD configuration that identifies one or more flexible resources indicated by the TDD configuration of the first message to be used for energy reception or information transmission, where the flexible resources may be able to be used for either energy reception or information transmission.

Some examples of the method, apparatuses, and non-transitory computer-readable medium described herein may further include operations, features, means, or instructions for determining, based on the energy receiver device-specific TDD configuration, to use all symbols within one or more slots of the flexible resources indicated by the TDD configuration of the first message for energy reception, or to use all symbols within one or more slots of the flexible resources indicated by the TDD configuration of the first message for information transmission.

Some examples of the method, apparatuses, and non-transitory computer-readable medium described herein may further include operations, features, means, or instructions for identifying, based on the energy receiver device-specific TDD configuration, specific flexible resources of the TDD configuration of the first message for either energy reception or information transmission, the specific flexible resources indicated as a number of symbols or slots from among the flexible resources.

Some examples of the method, apparatuses, and non-transitory computer-readable medium described herein may further include operations, features, means, or instructions for receiving a third message via group signaling that includes an SFI, the SFI indicative of a one-shot TDD configuration that identifies at least one or more flexible resources indicated by the TDD configuration of the first message to be used for energy reception or information transmission, where the flexible resources may be able to be used for either energy reception or information transmission.

In some examples of the method, apparatuses, and non-transitory computer-readable medium described herein, the one-shot TDD configuration may be based on a traffic pattern and an energy usage requirement corresponding to the energy receiver device.

Some examples of the method, apparatuses, and non-transitory computer-readable medium described herein may further include operations, features, means, or instructions for determining a duration of applicability of the one-shot TDD configuration.

In some examples of the method, apparatuses, and non-transitory computer-readable medium described herein, the duration of applicability of the one-shot TDD configuration may be based on a periodicity of the third message that includes the SFI.

In some examples of the method, apparatuses, and non-transitory computer-readable medium described herein, receiving the third message via group signaling that includes the SFI may include operations, features, means, or instructions for receiving the SFI from among a set of multiple SFIs included in the third message, each of the set of multiple SFIs pertaining to different sets of energy receiver devices.

In some examples of the method, apparatuses, and non-transitory computer-readable medium described herein, the one-shot TDD configuration identifies only the one or more flexible resources indicated by the TDD configuration of the first message for energy reception or information transmission.

In some examples of the method, apparatuses, and non-transitory computer-readable medium described herein, the one-shot TDD configuration additionally identifies one or more energy reception resources in the TDD configuration to reconfigure and add to the information transmission resources, one or more information transmission resources in the TDD configuration to reconfigure and add to the energy reception resources, or both.

In some examples of the method, apparatuses, and non-transitory computer-readable medium described herein, receiving the third message via group signaling that includes the SFI may include operations, features, means, or instructions for receiving the SFI from among a set of multiple SFIs included in the third message, a combination of at least two of the set of multiple SFIs pertaining to the energy receiver device but for different time durations.

In some examples of the method, apparatuses, and non-transitory computer-readable medium described herein, receiving the third message via group signaling that includes the SFI may include operations, features, means, or instructions for receiving a combination identifier that indicates a combination of the SFI with one or more additional SFIs, that combination pertaining to the energy receiver device, with different time durations corresponding to each of the SFI and the one or more additional SFIs.

A method for wireless communication at an energy transmitter device is described. The method may include transmitting a first message that includes information indicative of a TDD configuration for energy transmission and information reception, the TDD configuration indicating a temporal arrangement of energy transmission resources and information reception resources, transmitting one or more energy signals during the energy transmission resources in accordance with the TDD configuration, the one or more energy signals providing energy to an energy receiver device, and receiving one or more second messages during the information reception resources in accordance with the TDD configuration.

An apparatus for wireless communication at an energy transmitter device is described. The apparatus may include a processor, memory coupled with the processor, and instructions stored in the memory. The instructions may be executable by the processor to cause the apparatus to transmit a first message that includes information indicative of a TDD configuration for energy transmission and information reception, the TDD configuration indicating a temporal arrangement of energy transmission resources and information reception resources, transmit one or more energy signals during the energy transmission resources in accordance with the TDD configuration, the one or more energy signals providing energy to an energy receiver device, and receive one or more second messages during the information reception resources in accordance with the TDD configuration.

Another apparatus for wireless communication at an energy transmitter device is described. The apparatus may include means for transmitting a first message that includes information indicative of a TDD configuration for energy transmission and information reception, the TDD configuration indicating a temporal arrangement of energy transmission resources and information reception resources, means for transmitting one or more energy signals during the energy transmission resources in accordance with the TDD configuration, the one or more energy signals providing energy to an energy receiver device, and means for receiving one or more second messages during the information reception resources in accordance with the TDD configuration.

A non-transitory computer-readable medium storing code for wireless communication at an energy transmitter device is described. The code may include instructions executable by a processor to transmit a first message that includes information indicative of a TDD configuration for energy transmission and information reception, the TDD configuration indicating a temporal arrangement of energy transmission resources and information reception resources, transmit one or more energy signals during the energy transmission resources in accordance with the TDD configuration, the one or more energy signals providing energy to an energy receiver device, and receive one or more second messages during the information reception resources in accordance with the TDD configuration.

Some examples of the method, apparatuses, and non-transitory computer-readable medium described herein may further include operations, features, means, or instructions for identifying that the temporal arrangement indicated by the TDD configuration includes a combination of energy transmission resources, information reception resources, and flexible resources, where the flexible resources may be able to be used for either energy transmission or information reception.

Some examples of the method, apparatuses, and non-transitory computer-readable medium described herein may further include operations, features, means, or instructions for configuring a flexible resource for energy transmission or information reception based on at least one of an energy storage capability or an energy charging capability of the energy receiver device.

In some examples of the method, apparatuses, and non-transitory computer-readable medium described herein, the TDD configuration may be cell-specific to an energy transmitter device that may be in communication with the energy receiver device.

In some examples of the method, apparatuses, and non-transitory computer-readable medium described herein, transmitting the first message may include operations, features, means, or instructions for transmitting the information indicative of the TDD configuration via at least one of a SIB or a broadcast channel that includes a MIB.

In some examples of the method, apparatuses, and non-transitory computer-readable medium described herein, the TDD configuration may be one of a set of multiple pre-configured TDD configurations.

In some examples of the method, apparatuses, and non-transitory computer-readable medium described herein, the temporal arrangement of the energy transmission resources and the information reception resources may be within a first time period having a first periodicity and that includes the energy transmission resources followed by the information reception resources, where the energy transmission resources include one or more energy transmission slots at a beginning of the first time period and the information reception resources include one or more information reception slots at an end of the first time period.

In some examples of the method, apparatuses, and non-transitory computer-readable medium described herein, the temporal arrangement of the energy transmission resources and the information reception resources further includes one or more energy transmission symbols in a partial energy transmission slot that follows the one or more energy transmission slots and one or more information reception symbols in a partial information reception slot that precedes the one or more information reception slots.

In some examples of the method, apparatuses, and non-transitory computer-readable medium described herein, the temporal arrangement of the energy transmission resources and the information reception resources further includes flexible resources in the partial energy transmission slot, in the partial information reception slot, and in one or more flexible slots that may be temporally between the energy transmission resources and the information reception resources, where the flexible resources may be able to be used for either energy transmission or information reception.

In some examples of the method, apparatuses, and non-transitory computer-readable medium described herein, the first periodicity aligns the first time period with a TDD radio frame boundary.

In some examples of the method, apparatuses, and non-transitory computer-readable medium described herein, the temporal arrangement of the energy transmission resources and the information reception resources may be within a combination of a first time period having a first periodicity and a second time period having a second periodicity, where the first time period includes a first portion of the energy transmission resources followed by a first portion of the information reception resources and the second time period includes a second portion of the energy transmission resources followed by a second portion of the information reception resources, where the energy transmission resources include one or more first energy transmission slots at a beginning of the first time period and one or more second energy transmission slots at a beginning of the second time period, and the information reception resources include one or more first information reception slots at an end of the first time period and one or more second information reception slots at an end of the second time period.

In some examples of the method, apparatuses, and non-transitory computer-readable medium described herein, the temporal arrangement of the energy transmission resources and the information reception resources further includes one or more first energy transmission symbols in a first partial energy transmission slot that follows the one or more first energy transmission slots in the first time period, one or more second energy transmission symbols in a second partial energy transmission slot that follows the one or more second energy transmission slots in the second time period, one or more first information reception symbols in a first partial information reception slot that precedes the one or more first information reception slots in the first time period, and one or more second information reception symbols in a second partial information reception slot that precedes the one or more second information reception slots in the second time period.

In some examples of the method, apparatuses, and non-transitory computer-readable medium described herein, the temporal arrangement of the energy transmission resources and the information reception resources further includes flexible resources in the first partial energy transmission slot, in the first partial information reception slot, in the second partial energy transmission slot, in the second partial information reception slot, in one or more first flexible slots that may be temporally between the one or more first energy transmission slots and the one or more first information reception slots, and in one or more second flexible slots that may be temporally between the one or more second energy transmission slots and the one or more second information reception slots, where the flexible resources may be able to be used for either energy transmission or information reception.

In some examples of the method, apparatuses, and non-transitory computer-readable medium described herein, the first periodicity and the second periodicity combine to align the temporal arrangement with a TDD radio frame boundary.

Some examples of the method, apparatuses, and non-transitory computer-readable medium described herein may further include operations, features, means, or instructions for transmitting a third message via group signaling that includes an SFI, the SFI indicative of a one-shot TDD configuration that identifies at least one or more flexible resources indicated by the TDD configuration of the first message to be used for energy transmission or information reception, where the flexible resources may be able to be used for either energy transmission or information reception.

In some examples of the method, apparatuses, and non-transitory computer-readable medium described herein, the one-shot TDD configuration may be based on a traffic pattern and an energy usage requirement corresponding to the energy receiver device.

Some examples of the method, apparatuses, and non-transitory computer-readable medium described herein may further include operations, features, means, or instructions for determining a duration of applicability of the one-shot TDD configuration.

In some examples of the method, apparatuses, and non-transitory computer-readable medium described herein, the duration of applicability of the one-shot TDD configuration may be based on a periodicity of the third message that includes the SFI.

In some examples of the method, apparatuses, and non-transitory computer-readable medium described herein, transmitting the third message via group signaling that includes the SFI may include operations, features, means, or instructions for transmitting the SFI from among a set of multiple SFIs included in the third message, each of the set of multiple SFIs pertaining to different sets of energy receiver devices.

In some examples of the method, apparatuses, and non-transitory computer-readable medium described herein, the one-shot TDD configuration identifies only the one or more flexible resources indicated by the TDD configuration of the first message for energy transmission or information reception.

In some examples of the method, apparatuses, and non-transitory computer-readable medium described herein, the one-shot TDD configuration additionally identifies one or more energy transmission resources in the TDD configuration to reconfigure and add to the information reception resources, one or more information reception resources in the TDD configuration to reconfigure and add to the energy transmission resources, or both.

In some examples of the method, apparatuses, and non-transitory computer-readable medium described herein, transmitting the third message via group signaling that includes the SFI may include operations, features, means, or instructions for transmitting the SFI from among a set of multiple SFIs included in the third message, a combination of at least two of the set of multiple SFIs pertaining to the energy receiver device but for different time durations.

In some examples of the method, apparatuses, and non-transitory computer-readable medium described herein, transmitting the third message via group signaling that includes the SFI may include operations, features, means, or instructions for transmitting a combination identifier that indicates a combination of the SFI with one or more additional SFIs, that combination pertaining to the energy receiver device, with different time durations corresponding to each of the SFI and the one or more additional SFIs.

Some examples of the method, apparatuses, and non-transitory computer-readable medium described herein may further include operations, features, means, or instructions for transmitting a third message via signaling that may be specific to the energy receiver device, the third message indicative of an energy receiver device-specific TDD configuration that identifies one or more flexible resources indicated by the TDD configuration of the first message to be used for energy reception or information transmission, where the flexible resources may be able to be used for either energy reception or information transmission.

Some examples of the method, apparatuses, and non-transitory computer-readable medium described herein may further include operations, features, means, or instructions for configuring, based on the energy receiver device-specific TDD configuration, to use all symbols within one or more slots of the flexible resources indicated by the TDD configuration of the first message for energy transmission, or to use all symbols within one or more slots of the flexible resources indicated by the TDD configuration of the first message for information reception.

Some examples of the method, apparatuses, and non-transitory computer-readable medium described herein may further include operations, features, means, or instructions for identifying, based on the energy receiver device-specific TDD configuration, specific flexible resources of the TDD configuration of the first message for either energy transmission or information transmission, the specific flexible resources indicated as a number of symbols or slots from among the flexible resources.

DETAILED DESCRIPTION

Figure 1:
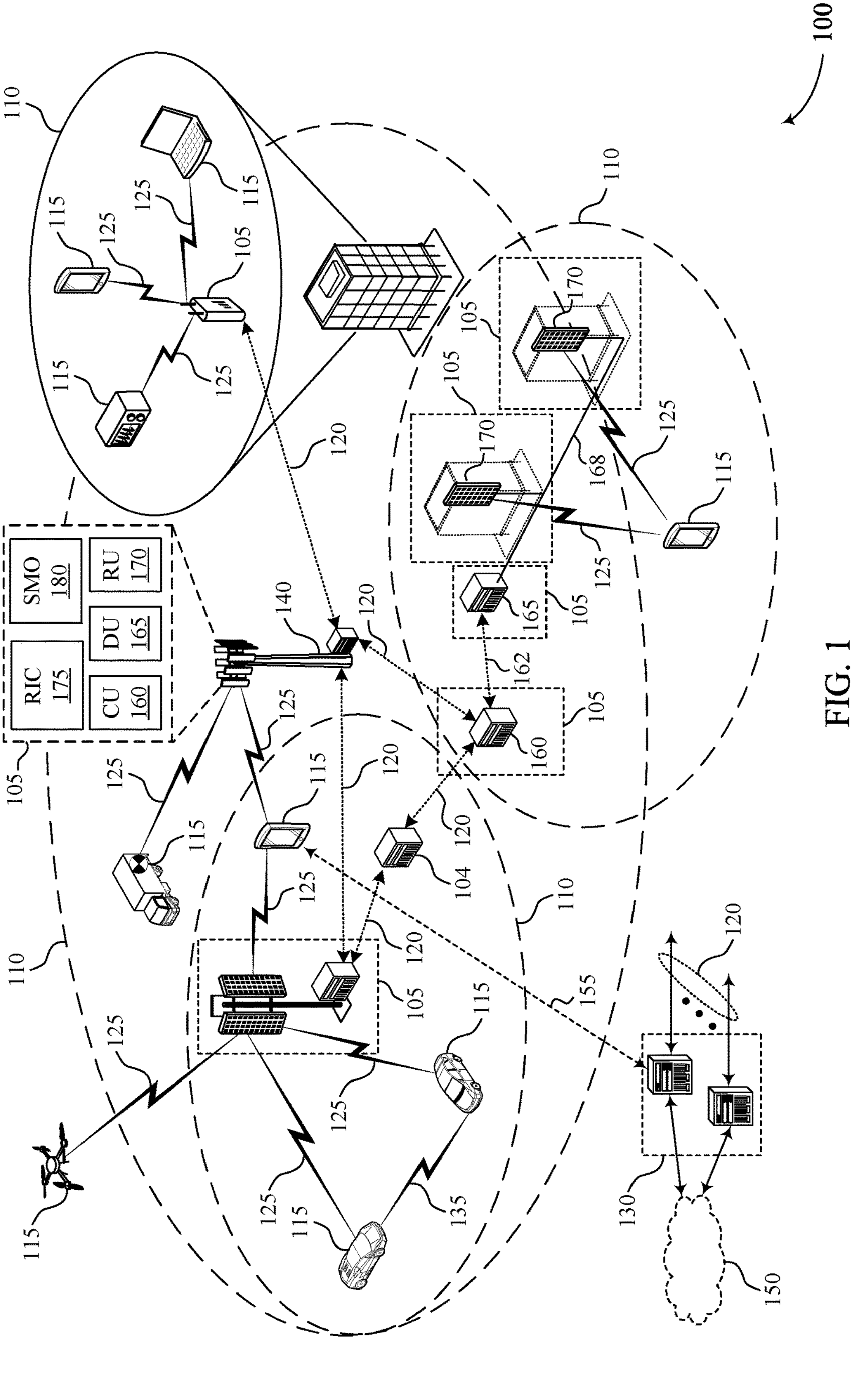
FIG. 1 illustrates an example of a wireless communications system that supports a time division duplex (TDD) framework for wireless energy and information transfer in accordance with one or more aspects of the present disclosure.

Some wireless communications systems may support communications between energy transfer devices, such as between an energy transmitter device and an energy receiver device. An energy receiver device may be a low power or passive communication device, such as a radio frequency identifier (RFID) device, a passive Internet of Things (IoT) device, a user equipment (UE), or some other energy receiver device, that uses energy harvested from signals received at the communication device to power one or more components of the communication device and communicate with an energy transmitter device. An energy transmitter device may be a communication device, such as a network entity, a base station, an RFID reader, or some other energy transmitter device, that may transmit, to an energy receiver device, an energy signal that may be harvested by the energy receiver device to support the communication of other signals between the energy transmitter device and the energy receiver device.

In some cases, wireless energy transfer (WET) and wireless information transfer (WIT) may occur in some wireless communication systems (e.g., sixth generation (6G) new radio (NR)) between energy transfer devices. For example, an energy receiver device may receive energy from an energy transmitter device during a WET operation, and the energy receiver device may transmit information to the energy transmitter device during a WIT operation. In some examples, WET and WIT operations may be deployed in different NR frequency bands. For example, WET and WIT may both be implemented in a time division duplex (TDD) band, such that the WET and the WIT may occur in time intervals that are locally controlled between just the two energy transfer devices involved (e.g., the energy transmitter device and the energy receiver device). However, these and other techniques used in the deployment of WET and WIT processes may be lacking in efficiency and effectiveness. For example, if WET and WIT involve multiple energy transfer devices (e.g., if WET and WIT is used within a cell), energy signals may collide and interfere with information signals without a framework for performing WET and WIT within the same TDD band. In addition, an energy receiver device may fail to obtain sufficient energy from WET to be able to transmit information in a WIT operation at a particular time without such a framework. As a result, communications between the energy receiver and transmitter devices may be low-quality or may be associated with high power consumption and inefficiency.

In some implementations of the present disclosure, a TDD configuration (e.g., framework) may be utilized for efficient energy and information transfer between an energy receiver device and an energy transmitter device. In some cases, during a time interval in which WET may be enabled, an energy receiver device (e.g., an IoT device, a UE) may accumulate energy from energy signals transmitted by an energy transmitter device (e.g., a network entity). During a subsequential time interval in which WIT may be enabled, the energy receiver device may expend the energy accumulated during the previous WET phase for the transmission of information signals to the energy transmitter device.

In some examples, the energy transmitter device may transmit a first message to the energy receiver device indicating the TDD configuration, which may indicate a temporal arrangement of energy resources and information resources (e.g., energy reception and information transmission resources for the energy receiver device, energy transmission and information reception resources for the energy transmitter device). That is, the TDD configuration may indicate resources (e.g., slots, symbols) dedicated to energy transfer or information transfer. In addition, the TDD configuration may indicate flexible resources which may be configured for energy transfer or information transfer.

In some examples, the energy transmitter device may configure different types of TDD configurations, and accordingly, may transmit different information including an indication of these TDD configurations to the energy receiver device. For example, the TDD configuration may include a cell-specific, static framework, which the energy transmitter device may indicate to one or more energy receiver devices in a system information block (SIB) or a master information block (MIB). In this case, the energy transmitter device may use one or more pattern configurations to schedule specific slots or symbols for use in WET and WIT operations. In another example, the TDD configuration may be specific to the energy receiver device (e.g., a UE-specific TDD configuration), and the energy transmitted device may transmit dedicated signaling to the energy receiver device indicating the energy receiver-specific TDD configuration. In this case, the energy receiver-device specific TDD configuration may override any flexible resource configurations previously made by the energy transmitter device. In some examples, the energy transmitter device may utilize group signaling to indicate a slot format indication (SFI) to the energy receiver device, where the energy transmitter device may use the SFI to dynamically configure energy and information resources according to data (e.g., traffic patterns, energy requirements) indicated by the energy receiver device.

Aspects of the subject matter described herein may be implemented to realize one or more of the following potential improvements, among others. The techniques employed by the described communication devices may enable the indication of a TDD configuration for WET and WIT between an energy transmitter device and an energy receiver device, which may support improved communications between the energy transmitter device and the energy receiver device. For example, by using a TDD configuration (e.g., framework) for WET and WIT, the energy receiver device may not require hardware that supports simultaneous WET and WIT operations, which may lower the cost of the energy receiver device. That is, upon the energy receiver device receiving energy signals (e.g., during WET), an IC, a microcontroller unit (MCU), or other chip at the energy receiver device may be reset, powered, and otherwise prepared for the subsequent WIT. In addition, using a TDD configuration may enable the energy transmitter device to receive information signals without interference from energy signals, which may reduce inter-cell interference and, as a result, increase signaling throughput and reliability. Additionally, the TDD configuration may enable the energy receiver device to expect deterministic energy charging opportunities, and the energy transmitter device may adapt the TDD configuration according to a cell size, a quantity and type of energy receiver devices in the cell (e.g., WP-IoT devices), and other parameters such that the energy receiver device may have sufficient energy to transmit information signals, among other benefits.

Aspects of the disclosure are initially described in the context of wireless communications systems. Aspects of the disclosure are then described in the context of TDD configurations, SFI configurations, and process flows. Aspects of the disclosure are further illustrated by and described with reference to apparatus diagrams, system diagrams, and flowcharts that relate to a TDD framework for wireless energy and information transfer.

FIG. 1 illustrates an example of a wireless communications system 100 that supports a TDD framework for wireless energy and information transfer in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support a TDD framework for wireless energy and information transfer as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support wireless communications between energy transfer devices, such as wireless communications between an energy transmitter device and an energy receiver device. Examples of energy transmitter devices include a network entity 105, a base station 140, and an RFID reader, among other energy transmitter devices. That is, an energy transmitter device may be a communication device that may transmit, to an energy receiver device, an energy signal that may be harvested by an energy receiver device to support the communication of other signals (e.g., information signals) between the energy transmitter device and the energy receiver device. For example, the energy receiver device may harvest and use energy from the energy signal to power one or more components of the energy receiver device and communicate with the energy transmitter device (e.g., process received information signals, transmit information signals, backscatter information signals). Examples of energy receiver devices include an RFID reader, a passive IoT device, a passive IoE device, and a UE 115 (e.g., a low power or low complexity UE 115), among other energy receiver devices. That is, an energy receiver device may be a communication device that uses harvested energy (e.g., at least in part) from received energy signals to perform wireless communications.

In some examples, energy transmitting devices such as RFID readers may be utilized because of economic benefits in inventory and asset management inside and outside of a warehouse, IoT connectivity, sustainable sensor networks in factories and agriculture settings, and in smart homes, among other examples. In some examples, an RFID reader may include small transponders (e.g., tags) which may emit information-bearing signals upon receiving a signal (e.g., from an energy transmitter device). Some RFID readers may operate without a battery at low operating expenses, a low maintenance cost, and a long life-cycle. In some cases, passive RFID readers may harvest energy over-the-air to power the transmission and reception circuitry, where signals may be backscatter modulated.

In accordance with examples disclosed herein, the wireless communications system 100 may support the indication of a TDD configuration (e.g., framework) for WET and WIT between an energy transmitter device and an energy receiver device. In some examples, the energy receiver device may receive a first message including information indicative of a TDD configuration for energy and information transfer (e.g., energy reception and information transmission, or energy transmission and information reception). The TDD configuration may indicate a temporal arrangement of energy resources and information resources (e.g., energy reception resources and information transmission resources for the energy receiver device, energy transmission resources and information reception resources for the energy transmitter device). In some examples, the energy receiver device may receive one or more energy signals during energy reception resources in accordance with the TDD configuration (e.g., in a WET operation), where the energy signals may provide energy to the energy receiver device for a subsequent WIT operation. As such, the energy receiver device may transmit one or more second messages during information transmission resources in accordance with the TDD configuration, where the second messages may include information signals.

Figure 2:
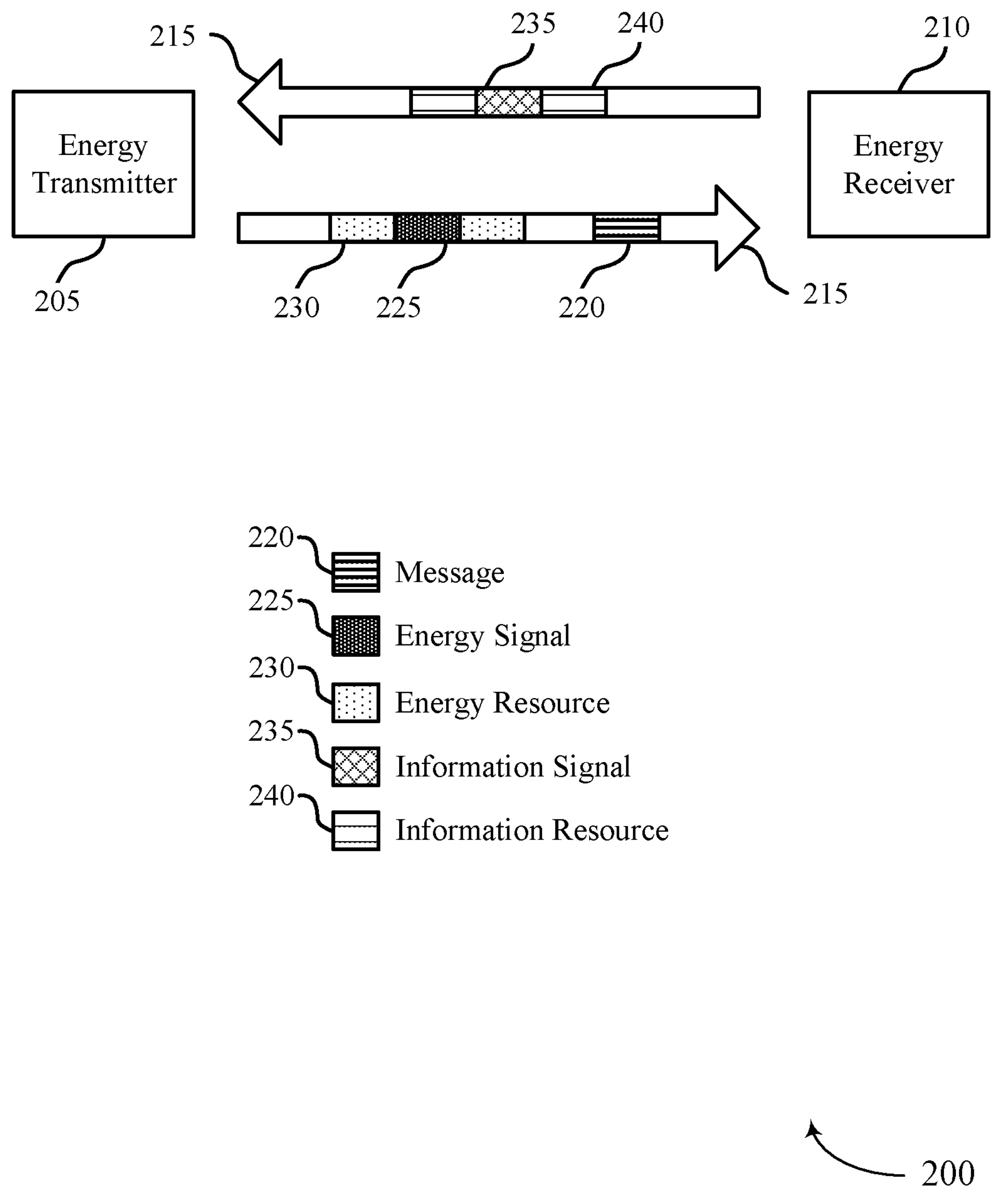
FIGS. 2 and 3 illustrate examples of wireless communications systems that support a TDD framework for wireless energy and information transfer in accordance with one or more aspects of the present disclosure.

FIG. 2 illustrates an example of a wireless communications system 200 that supports a TDD framework for wireless energy and information transfer in accordance with one or more aspects of the present disclosure. The wireless communications system 200 may implement or be implemented by aspects of the wireless communications system 100 described with reference to FIG. 1. For example, the wireless communications system 200 may include an energy transmitter 205 and an energy receiver 210. In some examples, the energy transmitter 205 may be an example of an energy transmitter device or a network entity 105 described with reference to FIG. 1. In some examples, the energy receiver 210 may be an example of an energy receiver device or a UE 115 described with reference to FIG. 1. The wireless communications system 200 may support a TDD framework for WET and WIT between energy transfer devices (e.g., between the energy transmitter 205 and the energy receiver 210), which may support improved communications between energy transmitter and energy receiver devices, improved signaling reliability and throughput, reduced latency, and improved (e.g., more efficient) power harvesting, among other benefits.

The wireless communications system 200 may support communications between the energy transmitter 205 and the energy receiver 210. For example, the energy transmitter 205 may communicate signals with the energy receiver 210 over respective communication links 215, which may be examples of a communication link 125 described with reference to FIG. 1.

To support communications between the energy transmitter 205 and the energy receiver 210, the energy transmitter 205 may be configured to perform wireless power transfer to the energy receiver 210. For example, the energy transmitter 205 may transmit an energy signal 225 to the energy receiver 210 via a channel (e.g., over a communication link 215), and the energy receiver 210 may perform energy harvesting to harvest energy from the energy signal 225 for use in powering one or more components of the energy receiver 210. In some examples, the energy transmitter 205 may transmit the energy signal 225 during one or more energy harvesting intervals during which the energy receiver 210 may perform energy harvesting. As such, the energy transmitter 205 may perform WET and an energy receiver 210 may perform WIT during different time intervals.

During a WET operation in a first time interval, the energy transmitter 205 may transmit the one or more energy signals 225 for to the energy receiver 210, such that the energy receiver 210 may accumulate energy for subsequent WIT. In some examples, the energy signals 225 may include dedicated and power-optimized waveforms for wireless energy charging at the energy receiver 210. Alternatively, the energy signals 225 may include over-the-air communication signals (e.g., NR signaling), or the energy signals 225 may be combined with information signals transmitted from the energy transmitter 205 or the energy receiver 210. During a WIT operation in a second time interval (e.g., which may be subsequent to the WET operation in the first time interval), the energy receiver 210 may transmit one or more information signals 235 to the energy transmitter 205 using the energy accumulated during the WET operation. In some examples, in addition to transmitting the information signals 235, the energy accumulated during the WET operation may be used to power an IC (e.g., or another chip) at the energy receiver 210 which may perform local computations such as decoding, running WIT protocols, computing bits to be transmitted, and other local computations.

The wireless communications system 200 may support a TDD configuration (e.g., framework) for WET and WIT between the energy transmitter 205 and the energy receiver 210, for example, to reduce collisions and interference and increase the efficiency of information transfer by the energy receiver 210, among other benefits. To communicate a TDD configuration which the energy transmitter 205 and the energy receiver 210 may use for energy and information transfer, the energy transmitter 205 may transmit one or more messages 220 (e.g., first messages) to the energy receiver 210. A message 220 may include information that indicates the TDD configuration for energy reception and information transmission by the energy receiver 210 (e.g., and energy transmission and information reception by the energy transmitter 205), where the TDD configuration may indicate a temporal arrangement of energy resources 230 and information resources 240 (e.g., energy reception resources and information transmission resources for the energy receiver 210, and energy transmission resources and information reception resources for the energy transmitter 205). In some examples, the temporal arrangement indicated by the TDD configuration may include flexible resources in addition to the energy resources 230 and the information resources 240, where the flexible resources may be used for either energy reception or transmission or information reception or transmission.

The message 220 may indicate the TDD configuration of the channel (e.g., the communication link 215), which may be configured by the energy transmitter 205. In addition, the TDD configuration may support various configurations for the temporal arrangement of resources to support WET and WIT. For example, the energy transmitter 205 may configure slots or symbols (e.g., or other TTIs) in the temporal arrangement for energy transfer, information transfer, or as flexible resources, which may be used for energy or information transfer. In addition, the energy transmitter 205 may configure the temporal arrangement of resources statically, semi-statically, or dynamically. For example, the energy transmitter 205 may statically configure a cell-specific TDD configuration, the cell supported by the energy transmitter 205, and indicate the cell-specific TDD configuration to one or multiple energy receivers including the energy receiver 210 via a SIB or a MIB. Additional details related to the cell-specific TDD configuration are described with reference to FIGS. 4-6 below.

Alternatively, the TDD configuration of the channel may be specific to the energy receiver 210 (e.g., a UE-specific configuration). For example, the energy transmitter 205 may configure an energy receiver-specific TDD configuration and indicate the TDD configuration to the energy receiver 210 via dedicated signaling. In some examples, the energy receiver-specific TDD configuration may enable the energy transmitter 205 to override any flexible resources as indicated in a cell-specific TDD configuration such that the flexible resources may be used for energy transfer or information transfer. Additional details related to the TDD configuration specific to the energy receiver 210 are described with reference to FIG. 6 below.

In some examples, the energy transmitter 205 may dynamically configure the TDD configuration such that the temporal arrangement of energy resources 230, information resources 240, and flexible resources may change based on a traffic pattern and an energy usage requirement corresponding to the energy receiver 210. For example, if the energy receiver 210 has insufficient power to transmit one or more information signals 235, the energy transmitter 205 may transmit multiple energy signals 225 (e.g., extend a WET operation) on multiple energy resources 230, where the energy resources 230 may be indicated as such in the TDD configuration. In some examples, the energy transmitter 205 may configure an SFI, which may be a one-shot TDD configuration indicating one or more flexible resources that may be used for energy transfer or information transfer. The energy transmitter 205 may transmit the SFI to one or more energy receivers (e.g., including the energy receiver 210) in group signaling. Additional details related to the dynamic TDD configuration and SFI are described with reference to FIG. 7 below.

In response to the message 220, the energy transmitter 205 may transmit an energy signal 225 during an energy resource 230 (e.g., an energy transmission resource) to the energy receiver 210 and in accordance with the TDD configuration. The energy receiver 210 may perform energy harvesting to harvest energy from the energy signal 225 for use in powering one or more components of the energy receiver 210. That is, the energy signal 225 may provide energy to the energy receiver 210. The energy receiver 210 may transmit an information signal 235 (e.g., a second message) during an information resource 240 (e.g., an information transmission resource) to the energy transmitter 205 and in accordance with the TDD configuration. Accordingly, the energy receiver 210 may transmit the information signal 235 to the energy transmitter 205 at some time after the energy receiver 210 receives the energy signal 225, which may provide power to the energy receiver 210 for transmitting the information signal 235.

By communicating the message 220 indicating the TDD configuration between the energy transmitter 205 and the energy receiver 210, communications between the energy transmitter 205 and the energy receiver 210 may be improved. For example, a temporal arrangement of energy transmission and reception resources, information transmission and reception resources, and flexible resources may reduce interference between energy signals 225 and information signals 235, which may increase a reliability, a throughput, and a data rate of the signals may be increased, among other benefits. Additionally, the energy transmitter 205 may adapt the TDD configuration based on requirements of the energy receiver 210, which may increase power reliability for the energy receiver 210, among other benefits.

Figure 3:
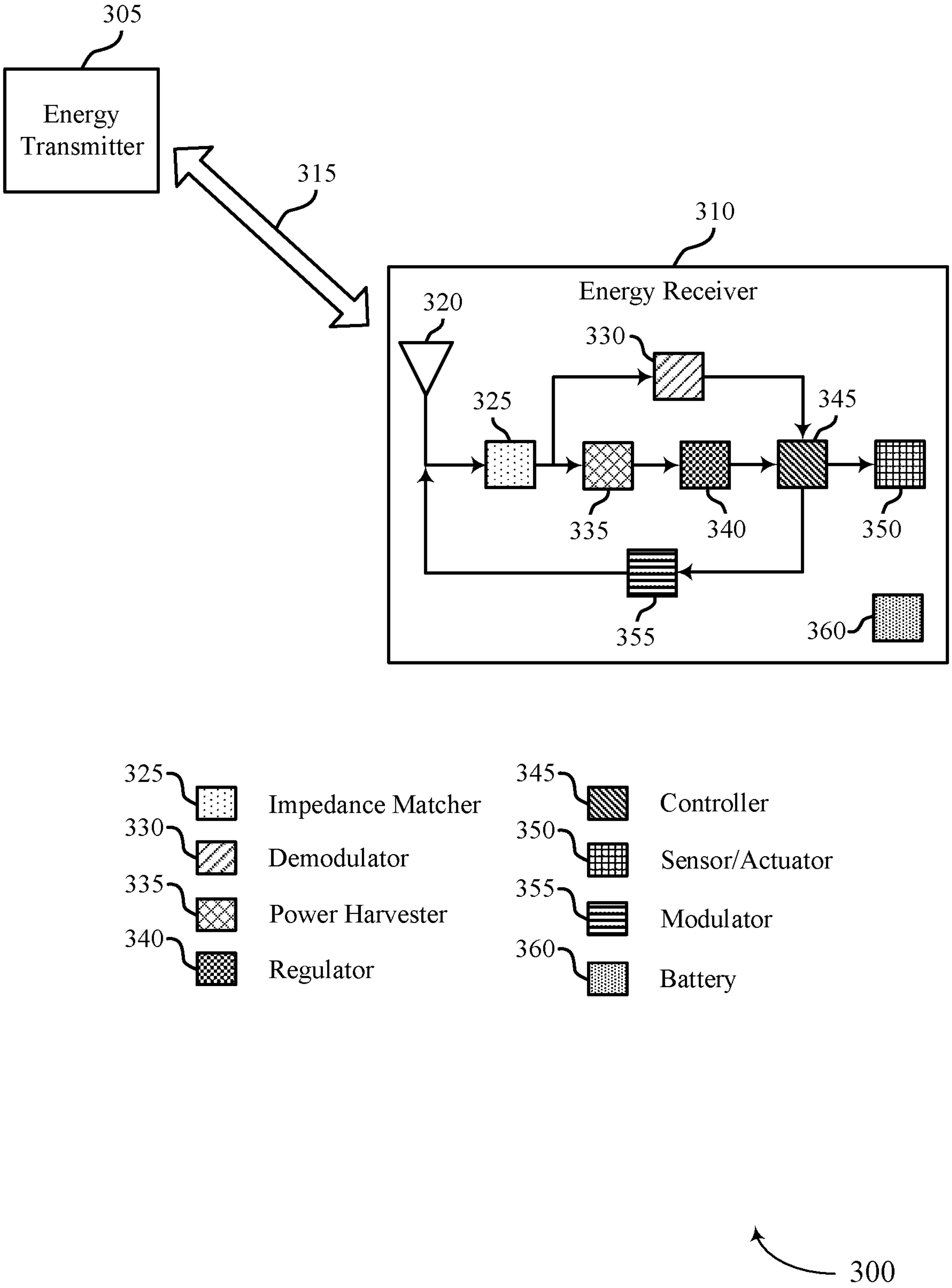

FIG. 3 illustrates an example of a wireless communications system 300 that supports a TDD framework for wireless energy and information transfer in accordance with one or more aspects of the present disclosure. The wireless communications system 300 may implement or be implemented by aspects of the wireless communications systems 100 and 200 described with reference to FIGS. 1 and 2, respectively. For example, the wireless communications system 300 may include an energy transmitter 305 and an energy receiver 310, which may be examples of the corresponding devices described with reference to FIGS. 1 and 2.

The wireless communications system 300 may support communications between the energy transmitter 305 and the energy receiver 310. For example, the energy transmitter 305 may communicate signals with the energy receiver 310 over a communication link 315, which may be an example of a communication link 125 or a communication link 215 described with reference to FIGS. 1 and 2, respectively. The wireless communications system 300 may support a TDD framework for WET and WIT between the energy transmitter 305 and the energy receiver 310 as described with reference to FIG. 2.

The energy receiver 310 may include various components to support the communication of signaling with the energy transmitter 305. For example, the energy receiver 310 may include an antenna 320 that supports the reception of signals transmitted by the energy transmitter 305 and the transmission of signals to the energy transmitter 305. The energy receiver 310 may also include an impedance matcher 325 (e.g., coupled with the antenna 320). The impedance matcher 325 may be a fixed or adjustable component that may set an impedance of a line from the antenna 320. Absorption or reflection of signals received at the antenna 320 may be based on an impedance of the impedance matcher 325.

The energy receiver 310 may include a power harvester 335 that is operable to harvest energy from energy signals received from the energy transmitter 305. For example, energy signals received from the energy transmitter 305 may be routed to the power harvester 335, which may harvest energy from the energy signals to power one or more components of the energy receiver 310. In some examples, the energy receiver 310 may include a regulator 340 that is operable to regulate the energy harvested by the power harvester 335. For example, the regulator 340 may regulate the energy to a voltage or a current that is compatible with the one or more components powered by the energy.

In addition, the energy receiver 310 may include a demodulator 330 that is operable to demodulate signals received from the energy transmitter 305 and send the demodulated signals to a controller 345 included in the energy receiver 310. In some examples, the controller 345 may be an example of a microcontroller. The controller 345 may process the demodulated signals and perform one or more operations based on the information included in the demodulated signals. For example, the controller 345 may operate a sensor 350 or an actuator 350 included in (e.g., or coupled with, connected to) the energy receiver 310 in accordance with the information. For instance, the controller 345 may activate the sensor 350, deactivate the sensor 350, read a measurement taken by the sensor 350, activate the actuator 350, deactivate the actuator 350, or a combination thereof, among other operations that the controller 345 may perform.

In some examples, the controller 345 may send signaling to a modulator 355 that is to be transmitted to the energy transmitter 305. The modulator 355 may modulate the signaling in accordance with an MCS and send the modulated signaling to the antenna 320 for transmission. For example, the modulator 355 may modulate an energy signal based on determined CSI and send the modulate energy signal to the antenna 320 for transmission to the energy transmitter 305. Additionally, the modulator 355 may modulate identification information associated with the energy receiver 310, data, information associated with operation of the energy receiver 310, or information associated with the sensor 350 or the actuator 350, among other types of signaling that may be modulated by the modulator 355 and transmitted to the energy transmitter 305.

The wireless communications system 300 may support various types of energy receivers 310. For example, a first type of energy receiver 310 may correspond to an energy receiver 310 that excludes or is unconnected from a power source, such as a battery 360 (although other types of power sources are possible). Here, the components of the energy receiver 310 may be powered by the energy harvested from energy signals received at the energy receiver 310. For example, an RFID reader may operate without a battery 360 at low operating expenses, a low maintenance cost, and a long life-cycle. A second type of energy receiver 310 may correspond to an energy receiver 310 that includes or is connected to a power source, such as the battery 360. Here, the components of the energy receiver 310 may be powered by the energy harvested from energy signals, the battery 360, or a combination thereof. In some examples, the power harvested from the energy signals may be used to charge the battery 360, which may increase a battery life of the battery 360 and reduce a frequency at which the battery 360 is replaced, among other benefits.

In some examples, the energy transmitter 305 may transmit a message indicating a TDD configuration (e.g., framework) indicative of a temporal arrangement of energy resources and information resources (e.g., energy reception and information transmission resources, or energy transmission and information reception resources) to the energy receiver 310. The TDD configuration may support different types of energy receivers 310. For example, an energy receiver 310 of the first type (e.g., an RFID reader, a passive IoT device) may have deterministic energy charging opportunities based on the TDD configuration, which may be adapted to the particular type and quantity of energy receivers 310 in communications with the energy transmitter 305.

Figure 4:
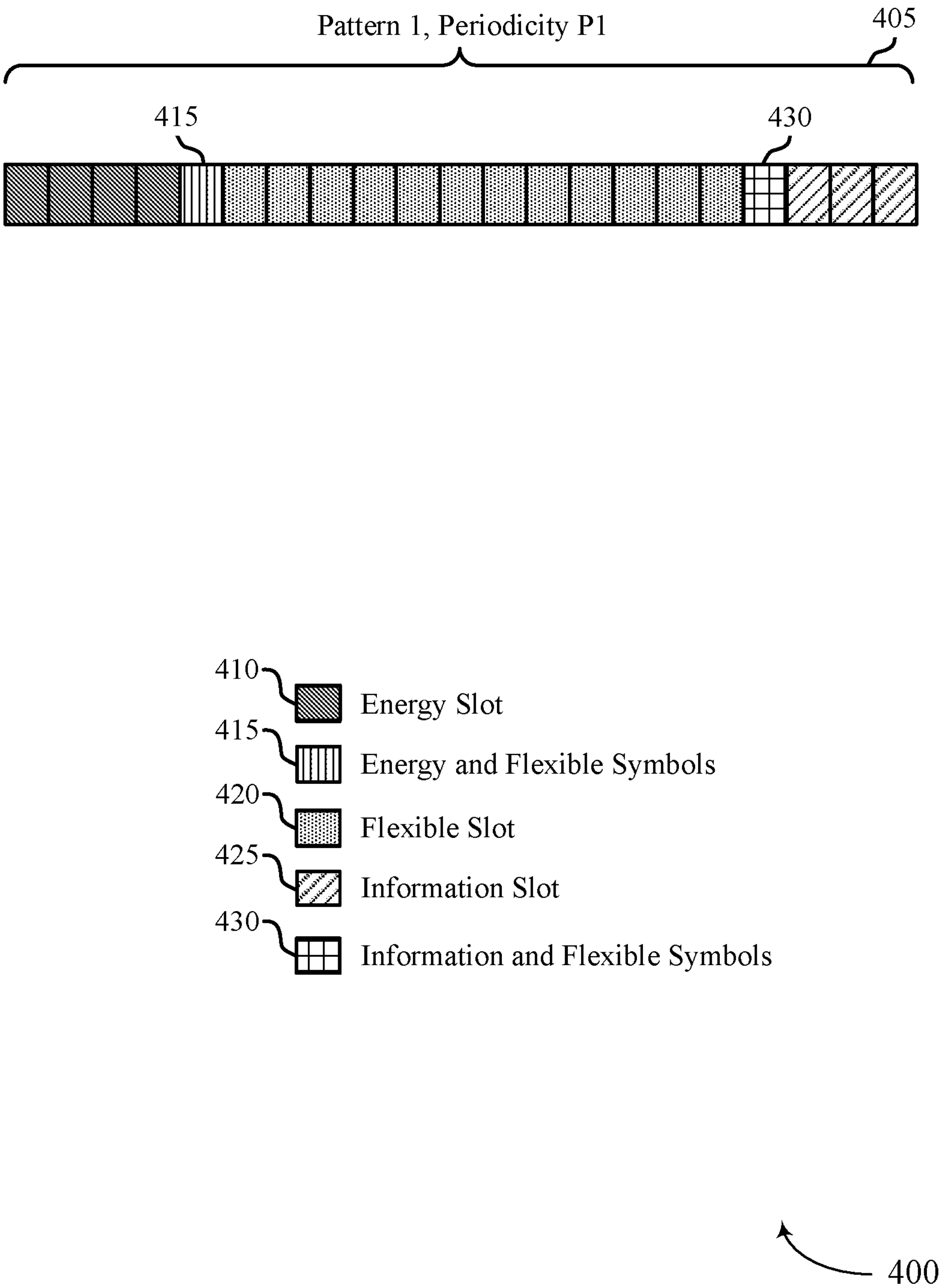
FIGS. 4 through 7 illustrate examples of TDD configurations that support a TDD framework for wireless energy and information transfer in accordance with one or more aspects of the present disclosure.

FIG. 4 illustrates an example of a TDD configuration 400 that supports a TDD framework for wireless energy and information transfer in accordance with one or more aspects of the present disclosure. The TDD configuration 400 may implement or be implemented by aspects of the wireless communications system 100 and 200 as described with reference to FIG. 1 and FIG. 2. For example, an energy transmitter and an energy receiver may use the TDD configuration 400 to increase efficiency in WET and WIT operations. In some cases, the TDD configuration 400 may include a temporal arrangement of resources for WET and WIT, where the temporal arrangement may correspond to a pattern 405.

In some examples, the energy receiver may receive a first message indicating the TDD configuration 400 for energy and information transfer. The TDD configuration 400 may indicate a temporal arrangement of energy resources and information resources during which the energy transmitter and the energy receiver may communicate energy and information signals. In some examples, the TDD configuration 400 may include a specific temporal arrangement of slots (e.g., one or more energy slots 410, one or more flexible slots 420, one or more information slots 425) and symbols (e.g., one or more energy symbols, flexible symbols, or both in a slot 415, one or more information symbols, flexible symbols, or both in a slot 430), which may be configured by an energy transmitter.

In some cases, the energy slots 410 and the energy symbols within the slot 415 may be dedicated for energy transfer (e.g., downlink signaling). Likewise, the information slots 425 and the information symbols within the slot 430 may be dedicated for information transfer (e.g., uplink signaling). For example, the energy receiver may receive energy signals during the energy slots 410 and the energy symbols in the slot 415 and transmit information signals during the information slots 425 and the information symbols in the slot 430, while the energy transmitter may transmit the energy signals during the energy slots 410 and the energy symbols in the slot 415 and receive the information signals during the information slots 425 and the information symbols in the slot 430. Additionally, the TDD configuration 400 may include one or more flexible slots 420, which the energy transmitter and the energy receiver may use for energy transfer or information transfer. For example, the configuration of a flexible slot 420 or a flexible symbol within the slot 415 or the slot 430 may depend on energy storage and charging capabilities of the energy receiver. In addition, the energy transmitter may implement the temporal arrangement of these various resources in a static, semi-static, or dynamic manner. In the case that the energy transmitter fails to provide the TDD configuration 400 to the energy receiver, the energy receiver may configure each slot and symbol as energy resources or information resources according to the energy storage and charging capabilities of the energy receiver (e.g., the energy receiver may consider all slots and symbols to be flexible).

In some examples, the energy transmitter device may configure the TDD configuration 400 as a static, cell-specific TDD configuration. For example, the energy transmitter may statically configure slots (e.g., the energy slots 410, the flexible slots 420, the information slots 425) and symbols (e.g., the energy symbols, the flexible symbols, or both in the slot 415, and the information symbols, the flexible symbols, or both in the slot 430) in a cell-specific temporal arrangement for energy transfer and information transfer and transmit the cell-specific TDD configuration to the energy receiver. In some cases, the energy transmitter may indicate (e.g., unicast) the cell-specific TDD configuration to the energy receiver via a SIB, via a broadcast channel in a MIB, via energy receiver-dedicated signaling, or a combination thereof.

The energy transmitter may indicate the cell-specific TDD configuration to the energy receiver with one or more options for temporally arranging the energy and information resources. For example, the temporal arrangement of resources in the cell-specific TDD configuration may indicate a single pattern 405 (e.g., pattern 1) of the various resources (e.g., slots, symbols) that is associated with a first periodicity (e.g., P1). The pattern may include one or more energy slots 410 located at the beginning of the pattern 405 and one or more information slots 425 located at the end of the pattern 405. In addition, the pattern 405 may include some quantity of energy symbols, flexible symbols, or both located in the slot 415 that is subsequent to the one or more energy slots 410 (e.g., in the time domain). Likewise, the pattern 405 may include some quantity of information symbols, flexible symbols, or both 430 located in the slot 430 preceding the one or more information slots 425. The slots between the slot 415 and the slot 430 may include flexible slots 420, which the energy transmitter may configure for energy or information transfer.

In some examples, the energy transmitter may statically configure multiple cell-specific temporal arrangements of resources and indicate one of the temporal arrangements to the energy receiver. For example, the energy transmitter may configure multiple patterns 405 having the first periodicity (e.g., a first time period, P1) with at least one or more energy slots 410, one or more slots 415, one or more flexible slots 420, one or more information slots 425, one or more slots 430, or any combination thereof, and the energy transmitter may transmit an indication of one of the patterns 405 to the energy receiver to implement in WET and WIT. In some examples, the energy transmitter may configure the first periodicity such that it may align with a TDD radio frame boundary (e.g., N*Period=M*frameDuration, where N and M may represent integers and frameDuration may represent the length of a TDD radio frame).

Figure 5:
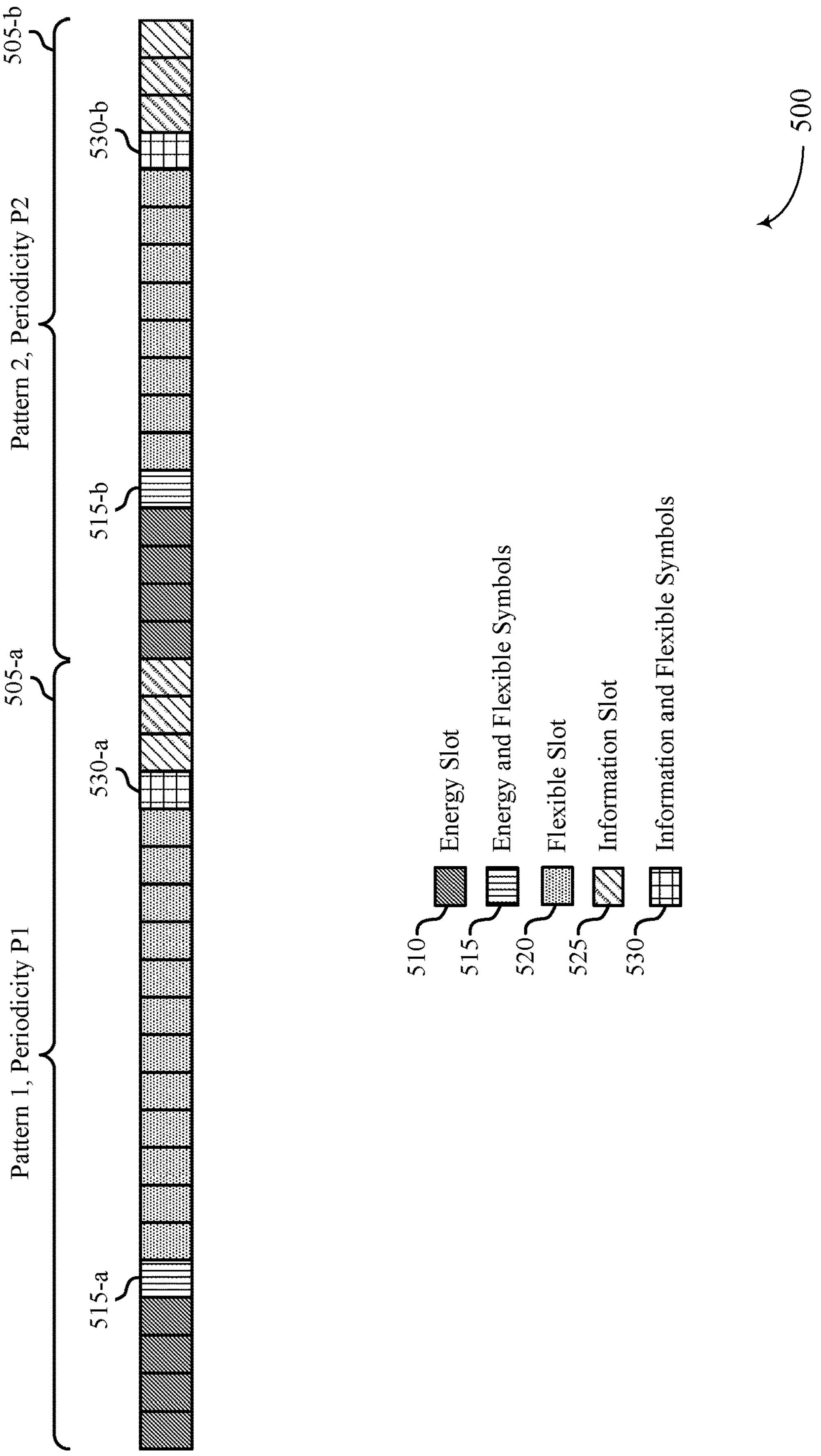

FIG. 5 illustrates an example of a TDD configuration 500 that supports a TDD framework for wireless energy and information transfer in accordance with one or more aspects of the present disclosure. The TDD configuration 500 may implement or be implemented by aspects of the wireless communications system 100 and 200 as described with reference to FIG. 1 and FIG. 2. For example, an energy transmitter and an energy receiver may use the TDD configuration 500 to increase efficiency in WET and WIT operations. In some cases, the TDD configuration 500 may include a temporal arrangement of resources for WET and WIT, where the temporal arrangement may correspond to a two-pattern configuration including a pattern 505-*a* and a pattern 505-*b*.

In some examples, the energy receiver may receive a first message indicating the TDD configuration 500 for energy and information transfer. The TDD configuration 500 may indicate a temporal arrangement of energy resources and information resources during which the energy transmitter and the energy receiver may communicate energy and information signals. In some examples, the TDD configuration 500 may include a specific temporal arrangement of slots (e.g., one or more energy slots 510, one or more flexible slots 520, one or more information slots 525) and symbols (e.g., one or more energy symbols, flexible symbols, or both in a slot 515, and one or more information symbols, flexible symbols, or both in a slot 530), which may be configured by an energy transmitter.

In some cases, the energy slots 510 and the energy symbols within a slot 515 may be dedicated for energy transfer (e.g., downlink signaling). Likewise, the information slots 525 and the information symbols within a slot 530 may be dedicated for information transfer (e.g., uplink signaling). For example, the energy receiver may receive energy signals during the energy slots 510 and the energy symbols and transmit information signals during the information slots 525 and the information symbols, while the energy transmitter may transmit the energy signals during the energy slots 510 and the energy symbols and receive the information signals during the information slots 525 and the information symbols. Additionally, the TDD configuration 500 may include one or more flexible slots 520, which the energy transmitter and the energy receiver may use for energy transfer or information transfer. For example, the configuration of a flexible slot 520 may depend on energy storage and charging capabilities of the energy receiver. In addition, the energy transmitter may implement the temporal arrangement of these various resources in a static, semi-static, or dynamic manner. In the case that the energy transmitter fails to provide the TDD configuration 500 to the energy receiver, the energy receiver may configure each slot and symbol as energy resources or information resources according to the energy storage and charging capabilities of the energy receiver (e.g., the energy receiver may consider all slots and symbols to be flexible).

In some examples, the energy transmitter device may configure the TDD configuration 500 as a static, cell-specific TDD configuration. For example, the energy transmitter may statically configure slots (e.g., the energy slots 510, the flexible slots 520, the information slots 525) and symbols (e.g., the energy symbols, flexible symbols, or both in the slot 515, and the information symbols, the flexible symbols, or both in the slot 530) in a cell-specific temporal arrangement for energy transfer and information transfer, and transmit the cell-specific TDD configuration to the energy receiver. In some cases, the energy transmitter may indicate (e.g., unicast) the cell-specific TDD configuration to the energy receiver via a SIB, via a broadcast channel in a MIB, via energy receiver-dedicated signaling, or a combination thereof.

The energy transmitter may indicate the cell-specific TDD configuration to the energy receiver with one or more options for temporally arranging the energy and information resources. For example, the temporal arrangement of resources in the cell-specific TDD configuration may indicate a two-pattern (e.g., pattern 1 and pattern 2) configuration of the various resources (e.g., slots, symbols). The two-pattern configuration may include a pattern 505-*a* (e.g., a first pattern, pattern 1) of the various resources (e.g., slots, symbols) that is associated with a first periodicity (e.g., P1), and a pattern 505-*b* (e.g., a second pattern, pattern 2) of the various resources (e.g., slots, symbols) that is associated with a second periodicity (e.g., P2).

As described with reference to FIG. 4, the pattern 505-*a* may include one or more energy slots 510 located at the beginning of the pattern 505-*a* and one or more information slots 525 located at the end of the pattern 505-*a*. In addition, the pattern 505-*a* may include some quantity of energy symbols, flexible symbols, or both located in a slot 515-*a* subsequent to the one or more energy slots 510 (e.g., in the time domain). Likewise, the pattern 505-*a* may include some quantity of information symbols, flexible symbols, or both located in a slot 530-*a* that precedes the one or more information slots 525. The slots between the slot 515-*a* and the slot 530-*a* may include flexible slots 520, which the energy transmitter may configure for energy or information transfer.

Similarly, the second pattern 505-*b* may include one or more energy slots 510 located at the beginning of the pattern 505-*b* and one or more information slots 525 located at the end of the pattern 505-*b*. In addition, the pattern 505-*b* may include some quantity of energy symbols, flexible symbols, or both located in a slot 515-*b* lot subsequent to the one or more energy slots 510 (e.g., in the time domain). Likewise, the pattern 505-*b* may include some quantity of information symbols, flexible symbols, or both located in a slot 530-*b* that precedes the one or more information slots 525. The slots between the slot 515-*b* and the slot 530-*b* may include flexible slots 520, which the energy transmitter may configure for energy or information transfer.

In some examples, for increased scheduling flexibility, the energy transmitter may statically configure multiple cell-specific TDD configurations including multiple patterns, and indicate the pattern 505-*a*, the pattern 505-*b*, or a combination thereof to the energy receiver. For example, the energy transmitter may configure the pattern 505-*a* having the first periodicity (e.g., a first time period, P1) with at least one or more energy slots 510, one or more slots 515, one or more flexible slots 520, one or more information slots 525, one or more slots 530, or any combination thereof. Additionally, the energy transmitter may configure the pattern 505-*b* having the second periodicity (e.g., a second time period, P2) with at least one or more energy slots 510, one or more slots 515, one or more flexible slots 520, one or more information slots 525, one or more slots 530, or any combination thereof. The energy transmitter may transmit an indication of the first pattern 505-*a*, the second pattern 505-*b*, or both (e.g., having a periodicity of P1+P2) to the energy receiver to implement in WET and WIT. In some examples, transmission of a single pattern (e.g., the pattern 505-*a* or the pattern 505-*b*) may be mandatory, while a two-pattern configuration (e.g., the pattern 505-*a* plus the pattern 505-*b*) may be optional. In some examples, the energy transmitter may configure a combination of the first periodicity corresponding to the pattern 505-*a* and the second periodicity corresponding to the pattern 505-*b* such that the overall period (e.g., P1+P2) may align with a TDD radio frame boundary (e.g., N*(P1+P2)=M*frameDuration, where N and M may represent integers and frameDuration may represent the length of a TDD radio frame).

Figure 6:
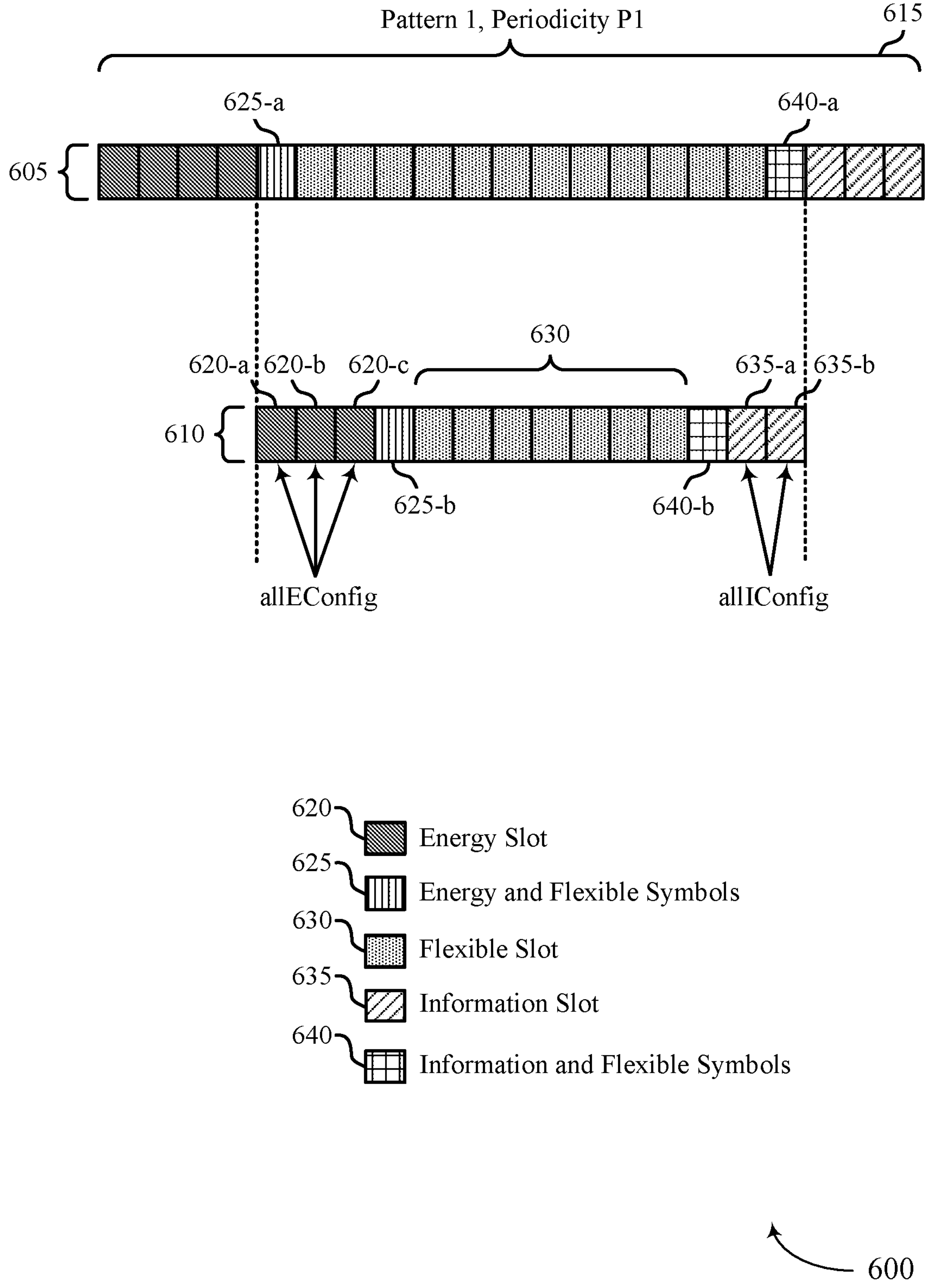

FIG. 6 illustrates an example of a TDD configuration 600 that supports a TDD framework for wireless energy and information transfer in accordance with one or more aspects of the present disclosure. The TDD configuration 600 may implement or be implemented by aspects of the wireless communications system 100 and 200 as described with reference to FIG. 1 and FIG. 2. For example, an energy transmitter and an energy receiver may use the TDD configuration 600 to increase efficiency in WET and WIT operations. In some cases, the TDD configuration 600 may include a temporal arrangement of resources for WET and WIT, where the temporal arrangement may correspond to a cell-specific TDD configuration 605 having a pattern 615, or an energy receiver-specific TDD configuration 610.

In some examples, the energy receiver may receive a first message indicating the TDD configuration 600 for energy and information transfer. The TDD configuration 600 may indicate a temporal arrangement of energy resources and information resources during which the energy transmitter and the energy receiver may communicate energy and information signals. In some examples, the TDD configuration 600 may include a specific temporal arrangement of slots (e.g., one or more energy slots 620, one or more flexible slots 630, one or more information slots 635) and symbols (e.g., one or more energy symbols, flexible symbols, or both in a slot 625, and one or more information symbols, flexible symbols, or both in a slot 640), which may be configured by an energy transmitter.

In some cases, the energy slots 620 and the energy symbols within a slot 625 may be dedicated for energy transfer (e.g., downlink signaling). Likewise, the information slots 635 and the information symbols within a slot 640 may be dedicated for information transfer (e.g., uplink signaling). For example, the energy receiver may receive energy signals during the energy slots 620 and the energy symbols and transmit information signals during the information slots 635 and the information symbols, while the energy transmitter may transmit the energy signals during the energy slots 620 and the energy symbols and receive the information signals during the information slots 635 and the information symbols. Additionally, the TDD configuration 600 may include one or more flexible slots 630, which the energy transmitter and the energy receiver may use for energy transfer or information transfer. For example, the configuration of a flexible slot 630 may depend on energy storage and charging capabilities of the energy receiver. In addition, the energy transmitter may implement the temporal arrangement of these various resources in a static, semi-static, or dynamic manner. In the case that the energy transmitter fails to provide the TDD configuration 600 to the energy receiver, the energy receiver may configure each slot and symbol as energy resources or information resources according to the energy storage and charging capabilities of the energy receiver (e.g., the energy receiver may consider all slots and symbols to be flexible).

In some examples, as described with reference to FIGS. 4 and 5, the energy transmitter device may configure the TDD configuration 600 as a cell-specific TDD configuration 605. For example, the energy transmitter may configure slots (e.g., the energy slots 620, the flexible slots 630, the information slots 640) and symbols (e.g., the energy symbols, flexible symbols, or both in a slot 625-*a*, and the information symbols, the flexible symbols, or both in a slot 640-*a*) in a cell-specific temporal arrangement for energy transfer and information transfer, and transmit an indication of the cell-specific TDD configuration 605 to the energy receiver.

In some cases, the energy transmitter may further configure an energy receiver-specific TDD configuration 610 (e.g., a UE-specific configuration) and transmit dedicated signaling (e.g., energy receiver-dedicated signaling, UE-dedicated signaling) to the energy receiver indicating the energy receiver-specific TDD configuration 610. For example, an energy receiver located relatively far away from the energy transmitter may be required to accumulate greater amounts of energy to account for the distance, which may trigger the energy transmitter to configure more resources in the energy receiver-specific TDD configuration 610 for energy transfer. In this case, the energy receiver-specific TDD configuration 610 may override one or more flexible resources (e.g., flexible symbols in a slot 625-*a*, flexible slots 630, and flexible symbols in a slot 640-*a*) indicated in the cell-specific TDD configuration 605 based on the energy receiver-specific TDD configuration 610.

The energy transmitter may indicate the cell-specific TDD configuration 605 to the energy receiver with one or more options for temporally arranging the energy and information resources. For example, the temporal arrangement of resources in the cell-specific TDD configuration 605 may indicate a single pattern 615 (e.g., pattern 1) of the various resources (e.g., slots, symbols) that is associated with a first periodicity (e.g., P1). The pattern may include one or more energy slots 620 located at the beginning of the pattern 615 and one or more information slots 635 located at the end of the pattern 615. In addition, the pattern 615 may include some quantity of energy symbols, flexible symbols, or both located in a slot 625-*b* subsequent to the one or more energy slots 620 (e.g., in the time domain). Likewise, some quantity of information symbols, flexible symbols, or both located in a slot 640-*b* that precedes the one or more information slots 635. The slots between the slot 625-*b* and the slot 640-*b* may include flexible slots 630, which the energy transmitter may configure for energy or information transfer, or override using the energy receiver-specific TDD configuration 610.

In some examples, the energy transmitter may transmit the energy receiver-dedicated signaling to the energy receiver indicating the energy receiver-specific TDD configuration 610. For example, the energy receiver may receive a message via the energy receiver-dedicated signaling, the message indicating the energy receiver-specific TDD configuration 610 that identifies one or more flexible resources indicated by the cell-specific TDD configuration 605 to be used for energy or information transfer. The energy receiver-dedicated signaling may indicate a slot index corresponding to a flexible slot 630 of the energy receiver-specific TDD configuration 610 that may be configured by the energy transmitter. In addition, the energy receiver-dedicated signaling may indicate how to configure the flexible slot 630 based on the energy receiver-specific TDD configuration 610 (e.g., whether to use the flexible slot 630 for energy or information transfer). As such, the energy receiver-specific TDD configuration 610 may override the flexible resources (e.g., any flexible symbols in the slot 625-*a*, the flexible slots 630, and any flexible symbols in the slot 640-*a*) of the cell-specific TDD configuration 605 as indicated in the energy receiver-dedicated signaling.

In some examples, the energy receiver-dedicated signaling may indicate a configuration option for one or more flexible resources. For example, a first configuration option (e.g., allEconfig) may configure one or more flexible resources of the cell-specific TDD configuration 605 as energy resources (e.g., energy slots 620-*a*, 620-*b*, and 620-*c*). For example, the energy receiver-specific dedicated signaling may indicate a slot index corresponding to the slot 625-*a* which includes one or more flexible symbols. As such, the energy transmitter may override and configure the flexible symbols in the slot 635-*a* as energy resources. Similarly, a second configuration (e.g., allIconfig) may configure one or more flexible resources of the cell-specific TDD configuration 605 as information resources (e.g., information slots 635-*a* and 635-*b*). For example, the energy receiver-specific dedicated signaling may indicate a slot index corresponding to the slot 640-*a* which includes one or more flexible symbols. Accordingly, the energy transmitter may override and configure the flexible symbols in the slot 640-*a* as information resources. In this way, based on the energy receiver-specific TDD configuration 610, the energy receiver may determine to use all of the flexible symbols within the slot 625-*a* (e.g., or one or more slots 625) for energy transfer, all of the flexibles symbols within the slot 640-*a* (e.g., or one or more slots 640) for information transfer, or both.

Additionally, or alternatively, a third configuration (e.g., explicitConfig) may explicitly configure one or more specific flexible resources of the cell-specific TDD configuration 605 as either energy resources or information resources. Based on the energy receiver-specific TDD configuration 610, the energy receiver may identify one or more specific flexible resources of the cell-specific TDD configuration 605 for either energy or information transfer, where the specific flexible resources may be indicated as a quantity of symbols or slots from among the flexible resources (e.g., a flexible slot 630, a flexible symbol). For example, the energy receiver-specific dedicated signaling may indicate a slot index corresponding to a particular flexible symbol in the slot 625-*a* or the slot 640-*a*, or a particular flexible slot 630. Accordingly, the energy transmitter may override and configure the flexible symbols in the slot 625-*a* or the slot 640-*a* or the flexible slots 630 as energy or information resources. As such, the energy receiver-dedicated signaling may enable the energy transmitter to reconfigure the cell-specific configuration using an explicit indication (e.g., the explicitConfig configuration).

In some examples, the energy receiver-specific TDD configuration 610 may include a temporal arrangement of the various energy and information resources (e.g., slots, symbols) in a particular pattern For example, the energy receiver-specific TDD configuration 610 may include one or more energy slots 620 (e.g., energy slots 620-*a*, 620-*b*, and 620-*c*) located at the beginning of the configuration and one or more information slots 635 (e.g., information slots 635-*a* and 635-*b*) located at the end of the configuration. In addition, the energy receiver-specific TDD configuration 610 may include some quantity of energy symbols, flexible symbols, or both located in a slot 625-*b* subsequent to the one or more energy slots 620 (e.g., in the time domain). For example, the energy transmitter may configure all of the flexible symbols in the slot 625-*a* of the cell-specific TDD configuration 605 for energy transfer. As such, all of the flexible symbols in the slot 625-*b* of the energy receiver-specific TDD configuration 610 may be configured for energy transfer. Likewise, the energy receiver-specific TDD configuration 610 may include some quantity of information symbols, flexible symbols, or both located in a slot 640-*b* that precedes the one or more information slots 635. The slots between the slot 625-*b* and the slot 640-*b* may include flexible slots 630, which the energy receiver may configure for energy or information transfer.

Figure 7:
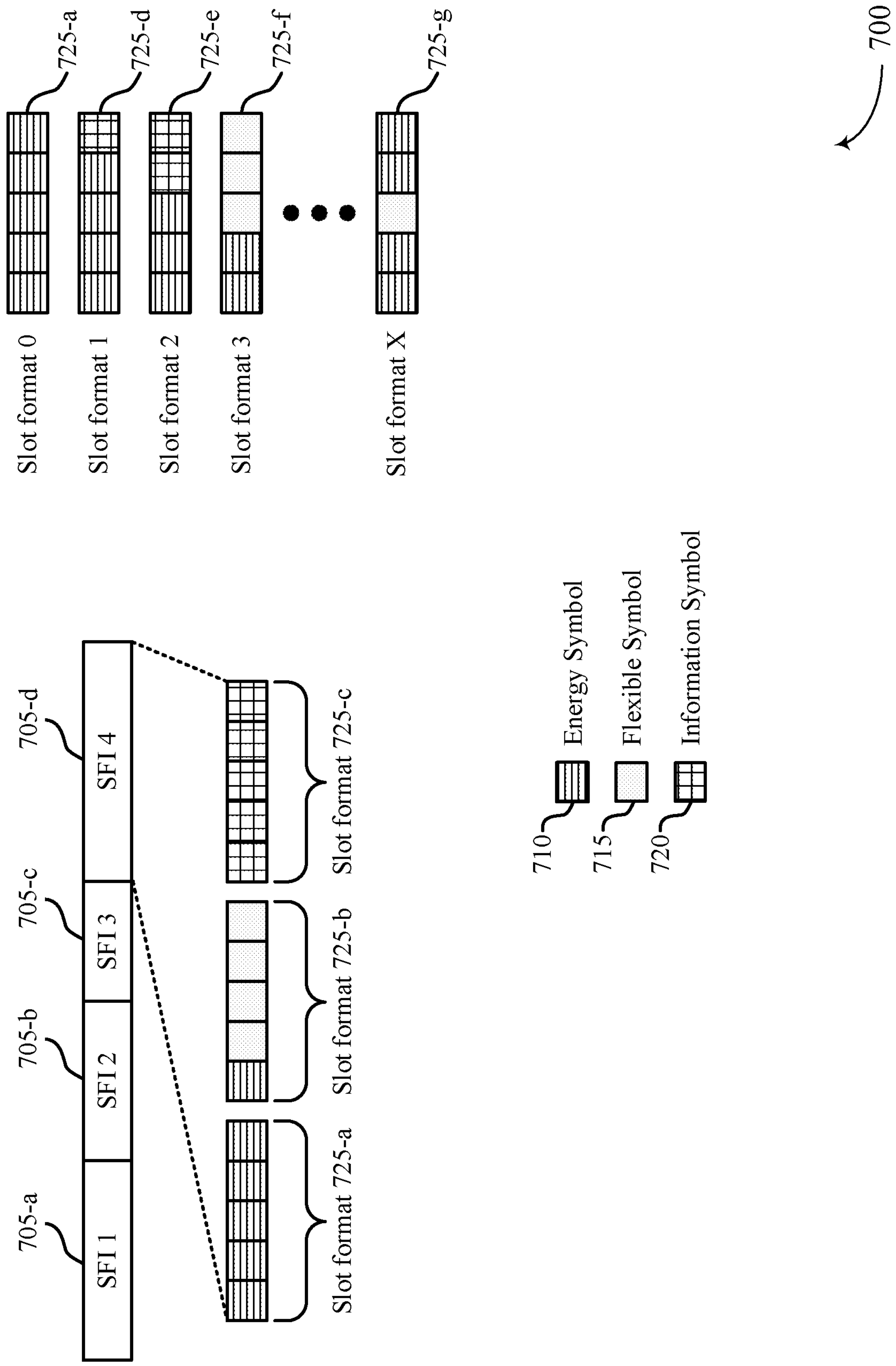

FIG. 7 illustrates an example of an SFI configuration 700 that supports a TDD framework for wireless energy and information transfer in accordance with one or more aspects of the present disclosure. The SFI configuration 700 may implement or be implemented by aspects of the wireless communications system 100 and 200 as described with reference to FIG. 1 and FIG. 2. For example, an energy transmitter and an energy receiver may use the SFI configuration 700 to increase efficiency in WET and WIT operations.

As described herein, the energy receiver may receive a first message indicating a TDD configuration for energy and information transfer. The TDD configuration may indicate a temporal arrangement of energy resources and information resources (e.g., slots and symbols) during which the energy transmitter and the energy receiver may communicate energy and information signals. In some examples, the TDD configuration may include a specific temporal arrangement of slots and symbols, which may be configured by the energy transmitter for energy or information transfer.

In some cases, energy resources may be dedicated for energy transfer (e.g., downlink signaling). Likewise, information resources may be dedicated for information transfer (e.g., uplink signaling). For example, the energy receiver may receive energy signals during one or more energy symbols 710 and transmit information signals during one or more information symbols 720, while the energy transmitter may transmit the energy signals during the one or more energy symbols 710 and receive the information signals during the one or more information symbols 720. Additionally, the TDD configuration may include one or more flexible symbols 715, which the energy transmitter and the energy receiver may use for energy transfer or information transfer. For example, the configuration of a flexible slot symbol 715 or a flexible slot may depend on energy storage and charging capabilities of the energy receiver. In addition, the energy transmitter may implement the temporal arrangement of these various resources in a static, semi-static, or dynamic manner.

In some examples, the energy transmitter device may configure the TDD configuration using an SFI 705. For example, the energy receiver may receive a second message via group signaling including an SFI 705, the SFI 705 indicative of a one-shot TDD configuration that identifies at least one or more flexible resource indicated by the TDD configuration of the first message to be used for energy or information transfer, where the flexible resources are able to be used for either energy or information transfer. That is, the energy transmitter may transmit the SFI 705 to the energy receiver to dynamically configure one or more symbols in a slot (e.g., the energy symbols 710, the flexible symbols 715, the information symbols 720) according to a traffic pattern and an energy usage requirement of the energy receiver. For example, the energy transmitter may extend a WET operation if the energy receiver indicates insufficient power for a subsequent WIT operation, or the energy transmitter may reduce the duration of a WET operation if the energy receiver indicates sufficient power for the subsequent WIT operation. In this way, the energy receiver and the energy transmitter may determine a duration of applicability of the one-shot TDD configuration.

In some cases, the energy receiver may transmit the SFI 705 to one or more energy receivers, the SFI 705 indicating that a temporal arrangement of energy, information, and flexible resources in the TDD configuration may change in a given quantity of next slots that are configurable. For example, the SFI 705 may indicate that the usage of the flexible resources (e.g., particularly symbols) in the TDD configuration may change for the next 10 slots (e.g., may be used for energy or information transfer as indicated by the SFI 705), where the flexible resources may return to a flexible functionality after the next 10 slots. That is, the energy receiver may receive an SFI 705 from among multiple SFIs 705 included in the second message, where each of the SFIs 705 pertains to different sets of energy receivers such that the energy transmitter configures each energy receiver with a specific TDD configuration.

In some examples, the energy transmitter may indicate a common or different reading position of the SFI 705 to each of the one or more energy receivers such that the energy transmitter may configure a same SFI 705 or a different SFI 705 for each energy receiver. As such, an SFI 705 may be a dynamic, one-shot TDD configuration as compared to a static or semi-static TDD configuration (e.g., a cell-specific TDD configuration, an energy receiver-specific TDD configuration). Additionally, a time duration (e.g., a duration of applicability) of the one-shot TDD configuration may be based on a periodicity of the second message that includes the SFI 705 (e.g., an SFI transmission periodicity). For example, if the periodicity of the second message is 10 ms, the energy transmitter may configure the SFI 705 to be 10 ms.

In some cases, the one-shot TDD configuration indicated in an SFI 705 may identify only the one or more flexible resources indicated by the TDD configuration of the first message for energy or information transfer. That is, in some cases, the SFI 705 may only override any semi-static, flexible slots or symbols (e.g., the SFI 705 may fail to override any semi-static energy or information slots or symbols). Put another way, the SFI 705 may only configure any flexible slots or symbols that the energy transmitter failed to configure using a cell-specific TDD configuration (e.g., as described with reference to FIG. 4 through FIG. 6), an energy receiver-specific TDD configuration (e.g., as described with reference to FIG. 6), or both.

Alternatively, the SFI 705 may reconfigure any semi-static energy or information slots or symbols in a dynamic manner (e.g., for a particular time duration). For examples, the one-shot TDD configuration may additionally identify one or more energy resources in the TDD configuration to reconfigure and add to the information resources, one or more information resources in the TDD configuration to reconfigure and add to the energy reception resources, or both. In some examples, the SFI 705 may override the energy and information resources according to a traffic pattern and an energy usage requirement of the energy receiver. In addition, the energy transmitter may enable the SFI 705 such that the SFI 705 reconfigures semi-static information resources into energy resources and refrains from reconfiguring semi-static energy resources into information resources (e.g., as the energy receiver may use longer WET operations than WIT operations). Additionally, as the reconfiguration based on an SFI 705 corresponds to the one-shot TDD configuration, the SFI 705 may fail to change a semi-static TDD configuration.

As described herein, the energy transmitter may transmit one or more SFIs 705 to one or more energy receivers in group signaling, where the energy transmitter may further configure the one or more energy receivers to read different SFIs 705 from different positions of the group signaling. For example, a first energy receiver may read a first 10 bits of an SFI 705 and a second energy receiver may read a second 10 bits of the SFI 705 to obtain respective one-shot TDD configurations. In some cases, an SFI 705 may indicate a combination of slot formats 725 (e.g., pre-configured slot formats). For example, a slot format 725-*a* (e.g., slot format 0) may include five energy symbols 710, a slot format 725-*b* (e.g., slot format 5) may include one energy symbol 710 and four flexible symbols 715, and a slot format 725-*c* (e.g., slot format 45) may include five information symbols 720. In some cases, the energy transmitter may configure other slot formats 725 including a slot format 725-*d* (e.g., slot format 1) including four energy symbols 710 and one information symbol 720, a slot format 725-*e* (e.g., slot format 2) including three energy symbols 710 and two energy symbols 720, a slot format 725-*f* (e.g., slot format 3) including two energy symbols 710 and three flexible symbols 715, and a slot format 725-*g* (e.g., slot format X) including four energy symbols 710 and one flexible symbol 715, among other examples.

As shown in FIG. 7, each SFI 705 may correspond to a particular energy receiver. For example, an SFI 705-*a* (e.g., SFI1) may correspond to a first energy receiver (e.g., UE1), an SFI 705-*b* (e.g., SFI2) may correspond to a second energy receiver (e.g., UE2), an SFI 705-*c* (e.g., SFI3) may correspond to a third energy receiver (e.g., UE3), an SFI 705-*d* (e.g., SFI4) may correspond to a fourth energy receiver, and so on, where each SFI 705 may include a quantity of bits used to indicate a respective one-shot TDD configuration. In some examples, the energy transmitter may configure the first energy receiver and the second energy receiver to read the SFI 705-*b* based on the first energy receiver and the second energy receiver having a same one-shot TDD configuration and this, sharing a common reading position of the SFI 705-*b*. For example, the SFI 705-*d* may indicate slot formats 725 for the next three slots, while the SFI 705-*c* may indicate slot formats 725 for the next two slots, and so on. That is, the energy receiver may receive an SFI 705 from among multiple SFIs 705 included in the second message, where a combination of at least two of the SFIs 705 pertain to the energy receiver device by for different time durations.

Additionally, or alternatively, the energy transmitter may configure a slot format combination identifier (e.g., indication) using a combination identifier which may indicate a combination of the slot formats 725. For example, a first combination identifier corresponding to the SFI 705-*d* may indicate that one or more energy receivers may use the slot format 725-*a*, the slot format 725-*b*, and the slot format 725-*c* for the next three slots in the one-shot TDD configuration. Based on the SFI 705-*d* configuring the next three slots, the SFI 705-*d* may indicate a slot format combination indication indicating which slot format 725 to apply to which slot in the TDD configuration. As such, the energy receiver may receive a combination identifier that indicates a combination of an SFI 705 with one or more additional SFIs 705 (e.g., the SFI 705-*d*), that combination pertaining to the energy receiver device, and with different time durations corresponding to each of the SFI 705 and the one or more additional SFIs 705.

Figure 8:
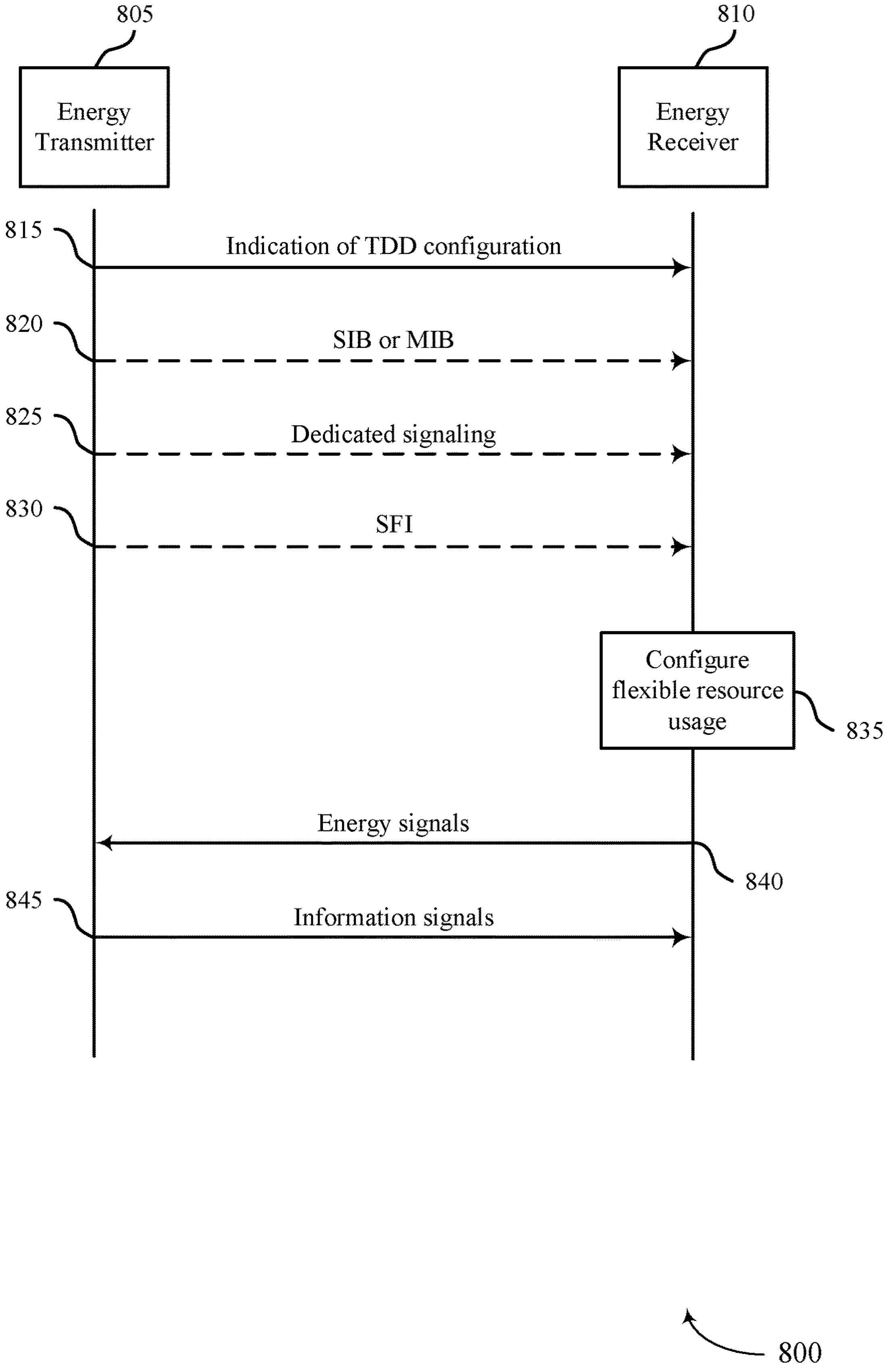
FIG. 8 illustrates an example of a slot format indication (SFI) configuration that supports a TDD framework for wireless energy and information transfer in accordance with one or more aspects of the present disclosure.

FIG. 8 illustrates an example of a process flow 800 that supports a TDD framework for wireless energy and information transfer in accordance with one or more aspects of the present disclosure. The process flow 800 may implement aspects of wireless communications systems 100 and 200, or may be implemented by aspects of the wireless communications system 100 and 200. For example, the process flow 800 may illustrate operations between an energy transmitter 805 and an energy receiver 810, which may be examples of corresponding devices described herein. In the following description of the process flow 800, the operations between the energy transmitter 805 and the energy receiver 810 may be transmitted in a different order than the example order shown, or the operations performed by the energy transmitter 805 and the energy receiver 810 may be performed in different orders or at different times. Some operations may also be omitted from the process flow 800, and other operations may be added to the process flow 800.

At 815, the energy receiver 810 may receive, from the energy transmitter 805, a first message that includes information indicative of a TDD configuration for energy reception and information transmission (e.g., energy transmission and information reception for the energy transmitter 805), the TDD configuration indicating a temporal arrangement of energy reception resources and information transmission resources (e.g., energy transmission resources and information reception resources for the energy transmitter 805). In some examples, the temporal arrangement may include one or more flexible resources in addition to the energy and information resources, where the flexible resources are able to be used for either energy reception or information transmission (e.g., energy transmission and information reception for the energy transmitter 805).

At 820, the energy receiver 810 may receive, from the energy transmitter 805, the first message that includes information indicative of the TDD configuration via at least one of a SIB or a broadcast channel that include a MIB, where the TDD configuration is cell-specific to the energy transmitter 805 that is in communication with the energy receiver device. That is, the energy transmitter 805 may configure a static, cell-specific TDD configuration and indicate the configuration to the energy receiver 810 using a SIB or a MIB. In some cases, the cell-specific TDD configuration may include a temporal arrangement of energy, information, and flexible resources according to one or more patterns.

At 825, the energy receiver 810 may receive, from the energy transmitter 805, a second message via signaling that is specific to the energy receiver 810, the second message indicative of an energy receiver device-specific TDD configuration that identifies one or more flexible resources indicated by the TDD configuration of the first message to be used for energy reception or information transmission (e.g., energy transmission or information reception for the energy transmitter 805), where the flexible resources are able to be used for either energy reception (e.g., or transmission) or information transmission (e.g., or reception). That is, the energy transmitter 805 may configure the energy receiver device-specific TDD configuration and indicate the configuration to the energy receiver via the energy receiver-dedicated signaling. In some examples, the energy receiver-dedicated signaling may enable the energy transmitter 805 to reconfigure any flexible resources in a cell-specific TDD configuration with an explicit indication.

At 830, the energy receiver 810 may receive, from the energy transmitter 805, a third message via group signaling that includes an SFI, the SFI indicative of a one-shot TDD configuration that identifies at least one or more flexible resources indicated by the TDD configuration of the first message to be used for energy reception or information transmission (e.g., energy transmission or information reception for the energy transmitter 805), where the flexible resources are able to be used for either energy reception (e.g., or transmission) or information transmission (e.g., or reception). In some cases, the energy transmitter 805 may transmit the group signaling indicating the SFI to dynamically configure energy, information, and flexible resources according to a traffic pattern or an energy requirement of one or more energy receivers communicating with the energy transmitter 805.

At 835, the energy transmitter 805 may configure a flexible resource for energy reception (e.g., or transmission) or information transmission (e.g., or reception) based on at least one of an energy storage capability or an energy charging capability of the energy receiver 810. In addition, the energy transmitter 805 may configure the flexible resource based on whether the energy transmitter 805 configured a cell-specific TDD configuration, an energy receiver-specific TDD configuration, or an SFI. For example, the energy transmitter 805 may configure each flexible slot and symbol in a TDD configuration for energy transfer based on the energy receiver 810 having a requirement to harvest more energy for subsequent information transfer.

At 840, the energy receiver 810 may receive, from the energy transmitter 805, one or more energy signals during the energy reception resources in accordance with the TDD configuration, the one or more energy signals providing energy to the energy receiver 810. As such, the energy receiver 810 may harvest energy during a WET operation during the energy reception resources for use in transmitting subsequent information signals (e.g., during a WIT operation).

At 845, the energy receiver 810 may transmit, to the energy transmitter 805, one or more fourth messages during the information transmission resources in accordance with the TDD configuration. The one or more fourth messages may include information signals. As such, the energy receiver 810 may transmit information to the energy transmitter 805 in a WIT operation using energy accumulated from received energy signals during a prior WET operation.

Figure 9:
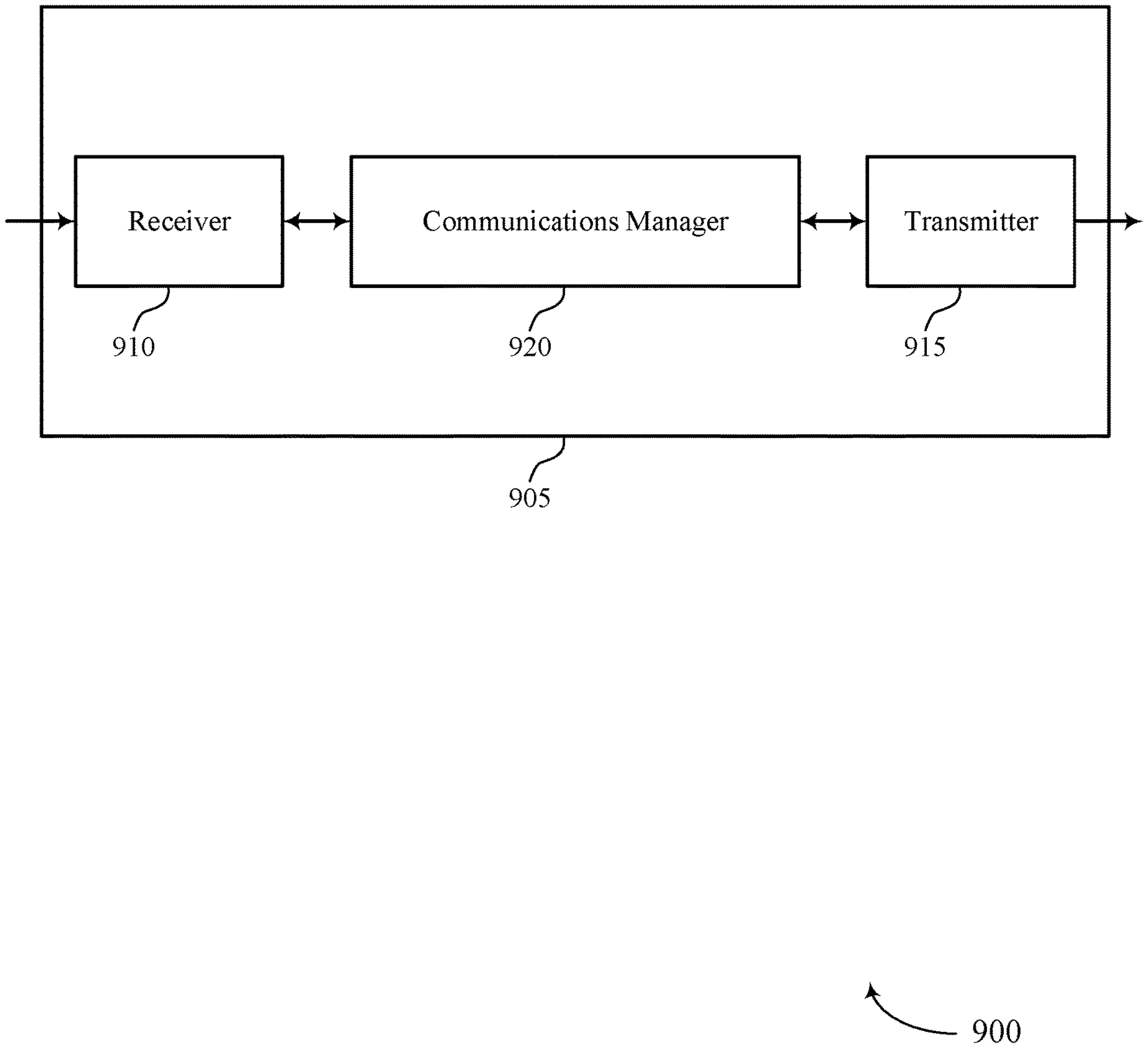
FIG. 9 illustrates an example of a process flow that supports a TDD framework for wireless energy and information transfer in accordance with one or more aspects of the present disclosure.

FIG. 9 shows a block diagram 900 of a device 905 that supports a TDD framework for wireless energy and information transfer in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a TDD framework for wireless energy and information transfer). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a TDD framework for wireless energy and information transfer). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of a TDD framework for wireless energy and information transfer as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at an energy receiver device in accordance with examples as disclosed herein. For example, the communications manager 920 may be configured as or otherwise support a means for receiving a first message that includes information indicative of a TDD configuration for energy reception and information transmission, the TDD configuration indicating a temporal arrangement of energy reception resources and information transmission resources. The communications manager 920 may be configured as or otherwise support a means for receiving one or more energy signals during the energy reception resources in accordance with the TDD configuration, the one or more energy signals providing energy to the energy receiver device. The communications manager 920 may be configured as or otherwise support a means for transmitting one or more second messages during the information transmission resources in accordance with the TDD configuration.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for configuring a TDD configuration (e.g., framework) for wireless energy and information transfer, which may support improved communications between an energy receiver device (e.g., a UE) and an energy transmitter device (e.g., a network entity). In some examples, the described techniques may reduce hardware costs, reduce interference and collisions between energy and information signals, and increase the dependability of an energy source for the energy receiver device, among other benefits.

Figure 10:
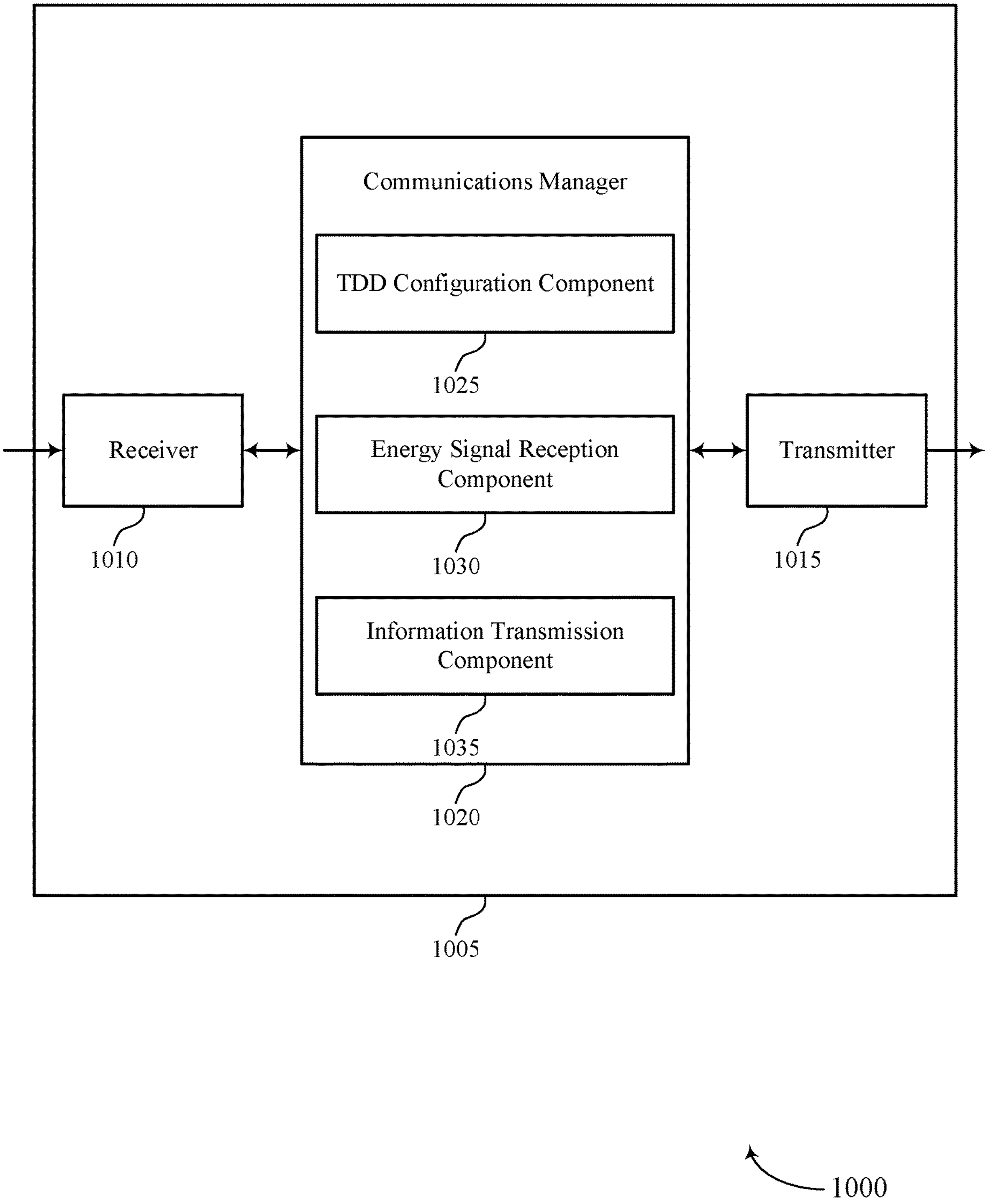
FIGS. 10 and 11 show block diagrams of devices that support a TDD framework for wireless energy and information transfer in accordance with one or more aspects of the present disclosure.

FIG. 10 shows a block diagram 1000 of a device 1005 that supports a TDD framework for wireless energy and information transfer in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a TDD framework for wireless energy and information transfer). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a TDD framework for wireless energy and information transfer). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of a TDD framework for wireless energy and information transfer as described herein. For example, the communications manager 1020 may include a TDD configuration component 1025, an energy signal reception component 1030, an information transmission component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at an energy receiver device in accordance with examples as disclosed herein. The TDD configuration component 1025 may be configured as or otherwise support a means for receiving a first message that includes information indicative of a TDD configuration for energy reception and information transmission, the TDD configuration indicating a temporal arrangement of energy reception resources and information transmission resources. The energy signal reception component 1030 may be configured as or otherwise support a means for receiving one or more energy signals during the energy reception resources in accordance with the TDD configuration, the one or more energy signals providing energy to the energy receiver device. The information transmission component 1035 may be configured as or otherwise support a means for transmitting one or more second messages during the information transmission resources in accordance with the TDD configuration.

Figure 11:
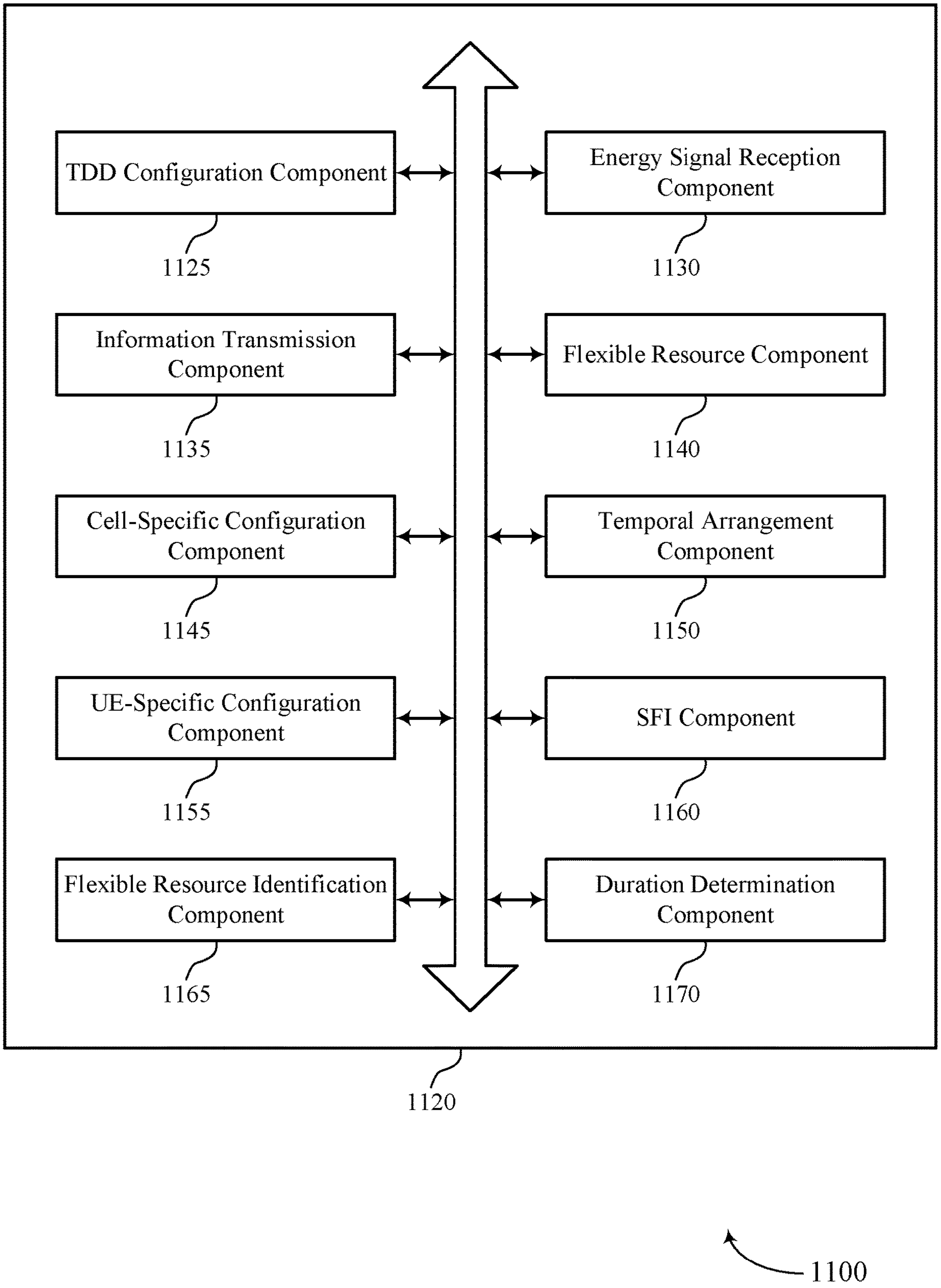

FIG. 11 shows a block diagram 1100 of a communications manager 1120 that supports a TDD framework for wireless energy and information transfer in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of a TDD framework for wireless energy and information transfer as described herein. For example, the communications manager 1120 may include a TDD configuration component 1125, an energy signal reception component 1130, an information transmission component 1135, a flexible resource component 1140, a cell-specific configuration component 1145, a temporal arrangement component 1150, a UE-specific configuration component 1155, an SFI component 1160, a flexible resource identification component 1165, a duration determination component 1170, or any combination thereof. Each of these components may communicate, directly or indirectly, with one another (e.g., via one or more buses).

The communications manager 1120 may support wireless communication at an energy receiver device in accordance with examples as disclosed herein. The TDD configuration component 1125 may be configured as or otherwise support a means for receiving a first message that includes information indicative of a TDD configuration for energy reception and information transmission, the TDD configuration indicating a temporal arrangement of energy reception resources and information transmission resources. The energy signal reception component 1130 may be configured as or otherwise support a means for receiving one or more energy signals during the energy reception resources in accordance with the TDD configuration, the one or more energy signals providing energy to the energy receiver device. The information transmission component 1135 may be configured as or otherwise support a means for transmitting one or more second messages during the information transmission resources in accordance with the TDD configuration.

In some examples, the flexible resource component 1140 may be configured as or otherwise support a means for identifying that the temporal arrangement indicated by the TDD configuration includes a combination of energy reception resources, information transmission resources, and flexible resources, where the flexible resources are able to be used for either energy reception or information transmission.

In some examples, the flexible resource component 1140 may be configured as or otherwise support a means for determining to use a flexible resource for energy reception or information transmission based on at least one of an energy storage capability or an energy charging capability of the energy receiver device. In some examples, the TDD configuration is cell-specific to an energy transmitter device that is in communication with the energy receiver device.

In some examples, to support receiving the first message, the cell-specific configuration component 1145 may be configured as or otherwise support a means for receiving the information indicative of the TDD configuration via at least one of a SIB or a broadcast channel that includes a MIB. In some examples, the TDD configuration is one of a set of multiple pre-configured TDD configurations.

In some examples, the temporal arrangement of the energy reception resources and the information transmission resources is within a first time period having a first periodicity and that includes the energy reception resources followed by the information transmission resources, where the energy reception resources include one or more energy reception slots at a beginning of the first time period and the information transmission resources include one or more information transmission slots at an end of the first time period.

In some examples, the temporal arrangement of the energy reception resources and the information transmission resources further includes one or more energy reception symbols in a partial energy reception slot that follows the one or more energy reception slots and one or more information transmission symbols in a partial information transmission slot that precedes the one or more information transmission slots.

In some examples, the temporal arrangement of the energy reception resources and the information transmission resources further includes flexible resources in the partial energy reception slot, in the partial information transmission slot, and in one or more flexible slots that are temporally between the energy reception resources and the information transmission resources, where the flexible resources are able to be used for either energy reception or information transmission. In some examples, the first periodicity aligns the first time period with a TDD radio frame boundary.

In some examples, the temporal arrangement of the energy reception resources and the information transmission resources is within a combination of a first time period having a first periodicity and a second time period having a second periodicity, where the first time period includes a first portion of the energy reception resources followed by a first portion of the information transmission resources and the second time period includes a second portion of the energy reception resources followed by a second portion of the information transmission resources, where the energy reception resources include one or more first energy reception slots at a beginning of the first time period and one or more second energy reception slots at a beginning of the second time period, and the information transmission resources include one or more first information transmission slots at an end of the first time period and one or more second information transmission slots at an end of the second time period.

In some examples, the temporal arrangement of the energy reception resources and the information transmission resources further includes one or more first energy reception symbols in a first partial energy reception slot that follows the one or more first energy reception slots in the first time period, one or more second energy reception symbols in a second partial energy reception slot that follows the one or more second energy reception slots in the second time period, one or more first information transmission symbols in a first partial information transmission slot that precedes the one or more first information transmission slots in the first time period, and one or more second information transmission symbols in a second partial information transmission slot that precedes the one or more second information transmission slots in the second time period.

In some examples, the temporal arrangement of the energy reception resources and the information transmission resources further includes flexible resources in the first partial energy reception slot, in the first partial information transmission slot, in the second partial energy reception slot, in the second partial information transmission slot, in one or more first flexible slots that are temporally between the one or more first energy reception slots and the one or more first information transmission slots, and in one or more second flexible slots that are temporally between the one or more second energy reception slots and the one or more second information transmission slots, where the flexible resources are able to be used for either energy reception or information transmission. In some examples, the first periodicity and the second periodicity combine to align the temporal arrangement with a TDD radio frame boundary.

In some examples, the UE-specific configuration component 1155 may be configured as or otherwise support a means for receiving a third message via signaling that is specific to the energy receiver device, the third message indicative of an energy receiver device-specific TDD configuration that identifies one or more flexible resources indicated by the TDD configuration of the first message to be used for energy reception or information transmission, where the flexible resources are able to be used for either energy reception or information transmission.

In some examples, the UE-specific configuration component 1155 may be configured as or otherwise support a means for determining, based on the energy receiver device-specific TDD configuration, to use all symbols within one or more slots of the flexible resources indicated by the TDD configuration of the first message for energy reception, or to use all symbols within one or more slots of the flexible resources indicated by the TDD configuration of the first message for information transmission.

In some examples, the flexible resource identification component 1165 may be configured as or otherwise support a means for identifying, based on the energy receiver device-specific TDD configuration, specific flexible resources of the TDD configuration of the first message for either energy reception or information transmission, the specific flexible resources indicated as a number of symbols or slots from among the flexible resources.

In some examples, the SFI component 1160 may be configured as or otherwise support a means for receiving a third message via group signaling that includes an SFI, the SFI indicative of a one-shot TDD configuration that identifies at least one or more flexible resources indicated by the TDD configuration of the first message to be used for energy reception or information transmission, where the flexible resources are able to be used for either energy reception or information transmission. In some examples, the one-shot TDD configuration is based on a traffic pattern and an energy usage requirement corresponding to the energy receiver device.

In some examples, the duration determination component 1170 may be configured as or otherwise support a means for determining a duration of applicability of the one-shot TDD configuration. In some examples, the duration of applicability of the one-shot TDD configuration is based on a periodicity of the third message that includes the SFI.

In some examples, to support receiving the third message via group signaling that includes the SFI, the SFI component 1160 may be configured as or otherwise support a means for receiving the SFI from among a set of multiple SFIs included in the third message, each of the set of multiple SFIs pertaining to different sets of energy receiver devices. In some examples, the one-shot TDD configuration identifies only the one or more flexible resources indicated by the TDD configuration of the first message for energy reception or information transmission.

In some examples, the one-shot TDD configuration additionally identifies one or more energy reception resources in the TDD configuration to reconfigure and add to the information transmission resources, one or more information transmission resources in the TDD configuration to reconfigure and add to the energy reception resources, or both.

In some examples, to support receiving the third message via group signaling that includes the SFI, the SFI component 1160 may be configured as or otherwise support a means for receiving the SFI from among a set of multiple SFIs included in the third message, a combination of at least two of the set of multiple SFIs pertaining to the energy receiver device but for different time durations.

In some examples, to support receiving the third message via group signaling that includes the SFI, the SFI component 1160 may be configured as or otherwise support a means for receiving a combination identifier that indicates a combination of the SFI with one or more additional SFIs, that combination pertaining to the energy receiver device, with different time durations corresponding to each of the SFI and the one or more additional SFIs.

Figure 12:
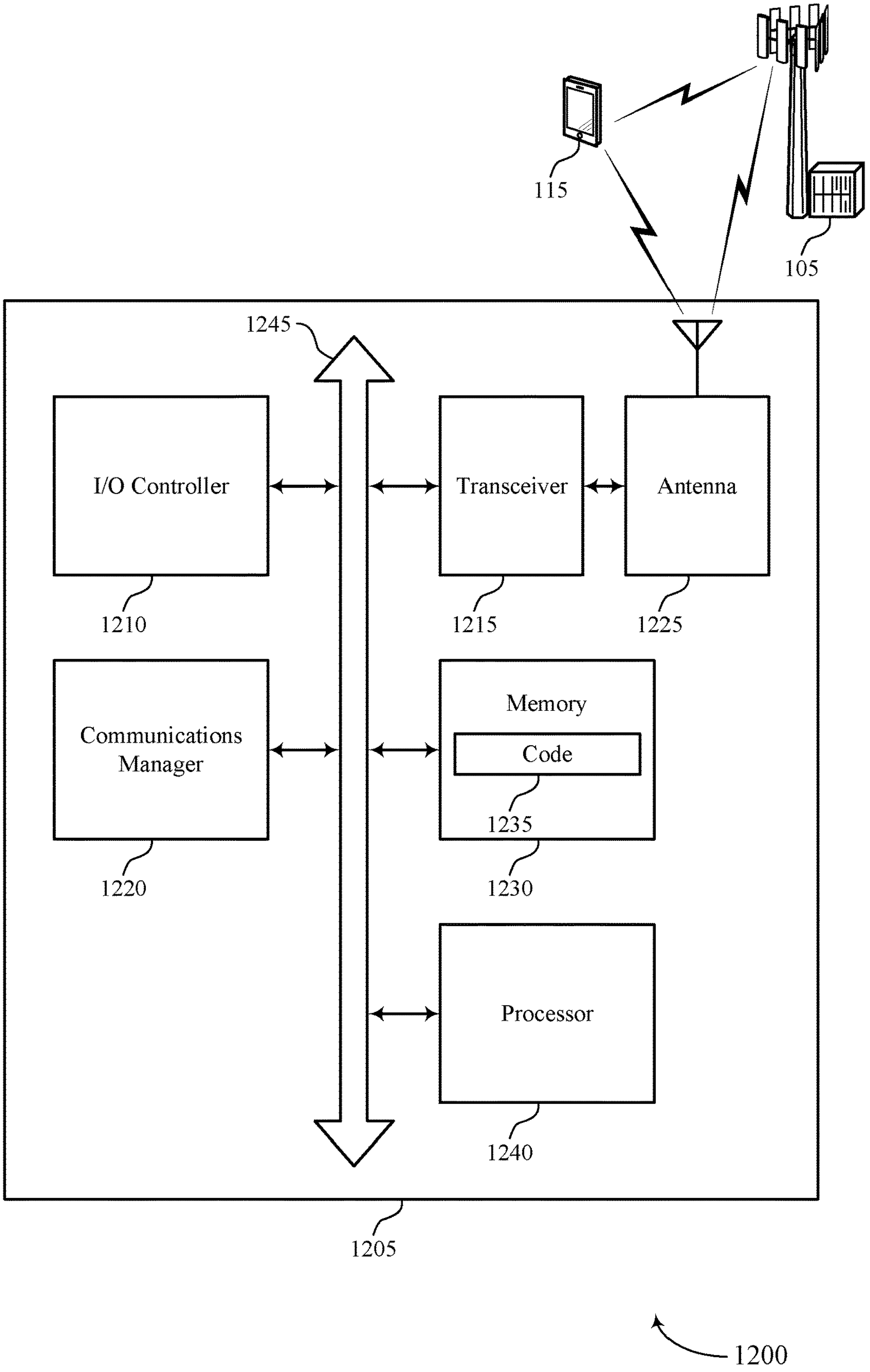
FIG. 12 shows a block diagram of a communications manager that supports a TDD framework for wireless energy and information transfer in accordance with one or more aspects of the present disclosure.

FIG. 12 shows a diagram of a system 1200 including a device 1205 that supports a TDD framework for wireless energy and information transfer in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting TDD framework for wireless energy and information transfer). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at an energy receiver device in accordance with examples as disclosed herein. For example, the communications manager 1220 may be configured as or otherwise support a means for receiving a first message that includes information indicative of a TDD configuration for energy reception and information transmission, the TDD configuration indicating a temporal arrangement of energy reception resources and information transmission resources. The communications manager 1220 may be configured as or otherwise support a means for receiving one or more energy signals during the energy reception resources in accordance with the TDD configuration, the one or more energy signals providing energy to the energy receiver device. The communications manager 1220 may be configured as or otherwise support a means for transmitting one or more second messages during the information transmission resources in accordance with the TDD configuration.

By including or configuring the communications manager 1220 in accordance with examples as described herein, the device 1205 may support techniques for configuring a TDD configuration (e.g., framework) for wireless energy and information transfer, which may support improved communications between an energy receiver device (e.g., a UE) and an energy transmitter device (e.g., a network entity). In some examples, the described techniques may reduce hardware costs, reduce interference and collisions between energy and information signals, and increase the dependability of an energy source for the energy receiver device, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of a TDD framework for wireless energy and information transfer as described herein, or the processor 1240 and the memory 1230 may be otherwise configured to perform or support such operations.

Figure 13:
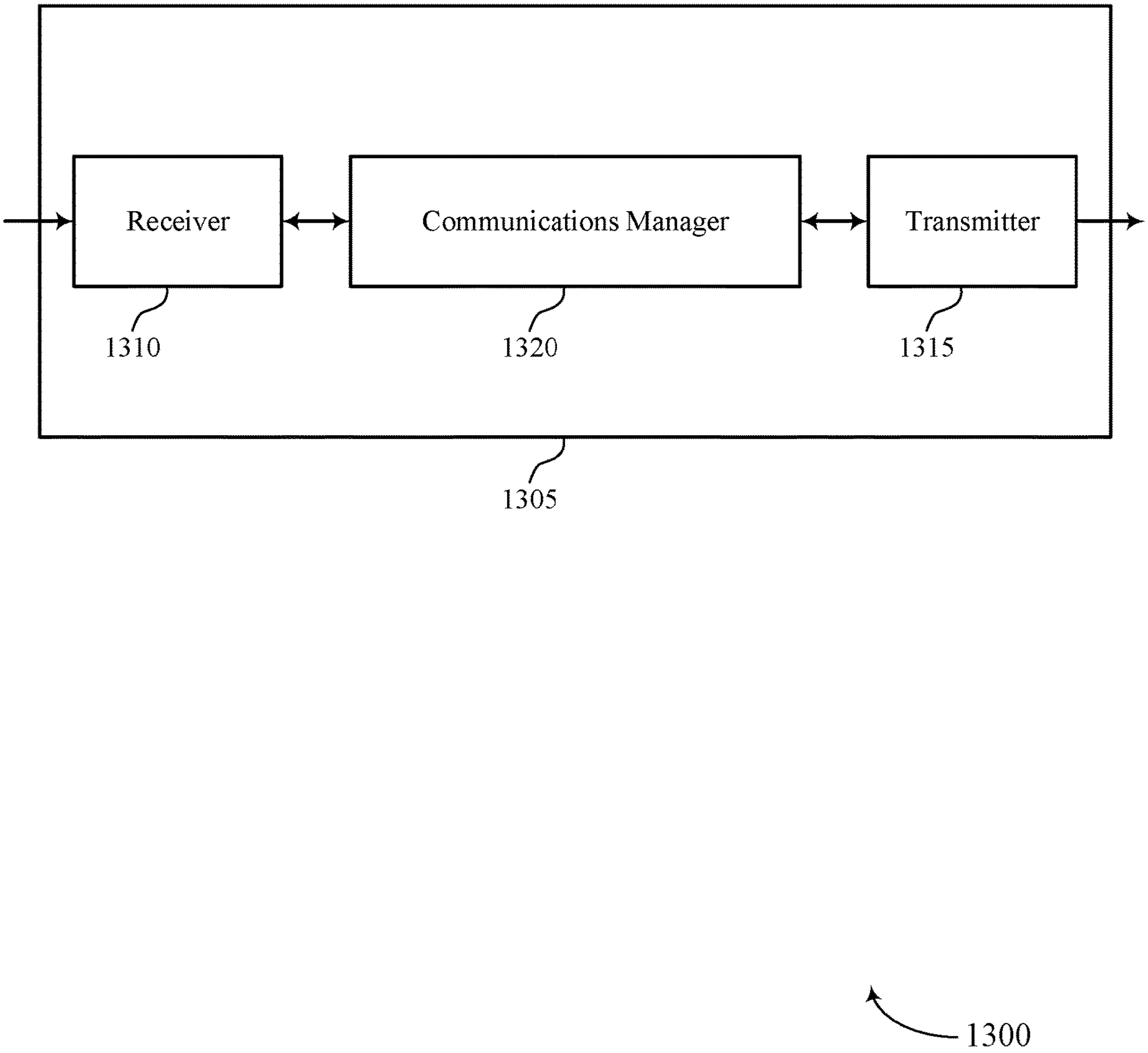
FIG. 13 shows a diagram of a system including a device that supports a TDD framework for wireless energy and information transfer in accordance with one or more aspects of the present disclosure.

FIG. 13 shows a block diagram 1300 of a device 1305 that supports a TDD framework for wireless energy and information transfer in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of a TDD framework for wireless energy and information transfer as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at an energy transmitter device in accordance with examples as disclosed herein. For example, the communications manager 1320 may be configured as or otherwise support a means for transmitting a first message that includes information indicative of a TDD configuration for energy transmission and information reception, the TDD configuration indicating a temporal arrangement of energy transmission resources and information reception resources. The communications manager 1320 may be configured as or otherwise support a means for transmitting one or more energy signals during the energy transmission resources in accordance with the TDD configuration, the one or more energy signals providing energy to an energy receiver device. The communications manager 1320 may be configured as or otherwise support a means for receiving one or more second messages during the information reception resources in accordance with the TDD configuration.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for configuring a TDD configuration (e.g., framework) for wireless energy and information transfer, which may support improved communications between an energy receiver device (e.g., a UE) and an energy transmitter device (e.g., a network entity). In some examples, the described techniques may reduce hardware costs, reduce interference and collisions between energy and information signals, and increase the dependability of an energy source for the energy receiver device, among other benefits.

Figure 14:
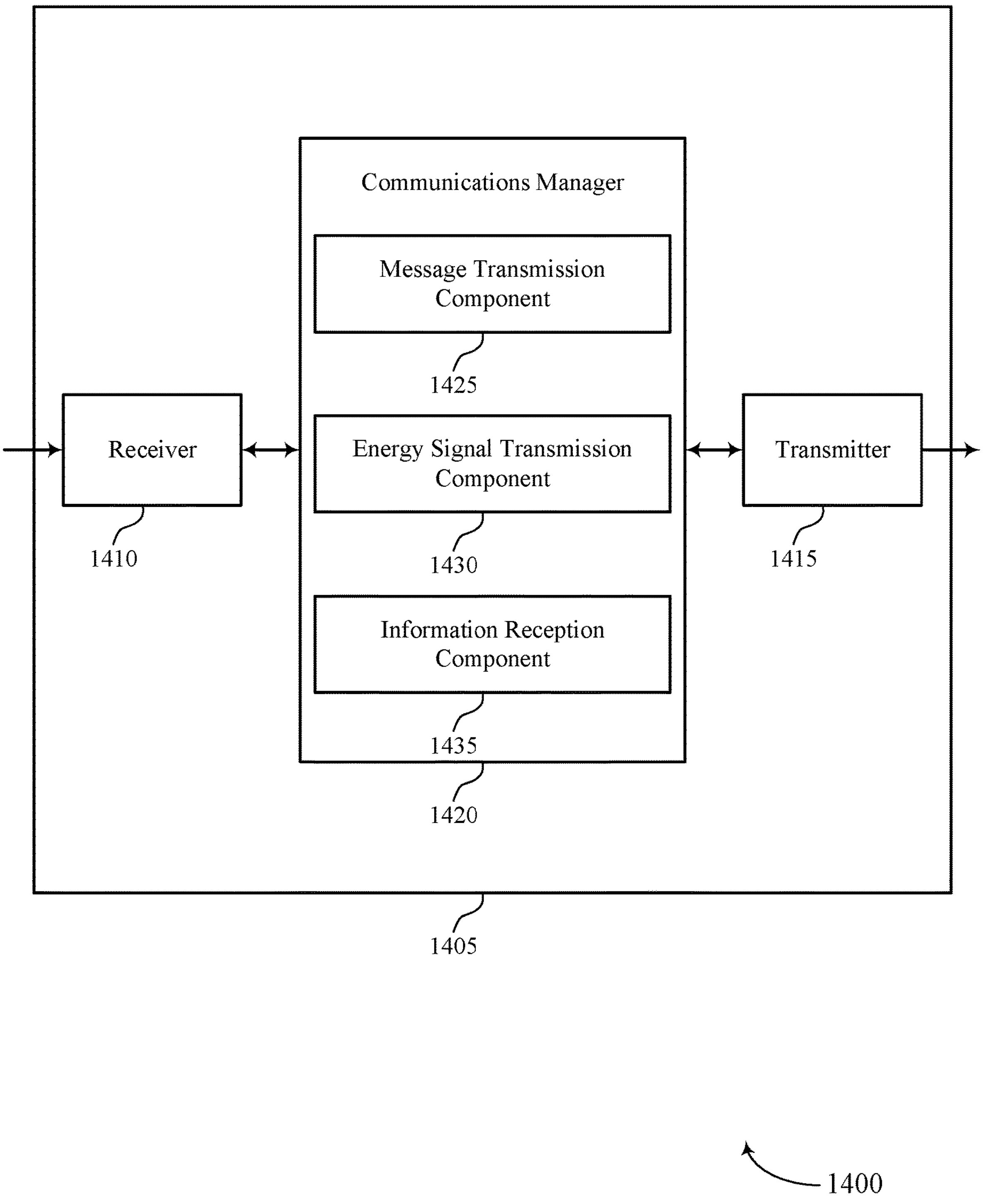
FIGS. 14 and 15 show block diagrams of devices that support a TDD framework for wireless energy and information transfer in accordance with one or more aspects of the present disclosure.

FIG. 14 shows a block diagram 1400 of a device 1405 that supports a TDD framework for wireless energy and information transfer in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of a TDD framework for wireless energy and information transfer as described herein. For example, the communications manager 1420 may include a message transmission component 1425, an energy signal transmission component 1430, an information reception component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at an energy transmitter device in accordance with examples as disclosed herein. The message transmission component 1425 may be configured as or otherwise support a means for transmitting a first message that includes information indicative of a TDD configuration for energy transmission and information reception, the TDD configuration indicating a temporal arrangement of energy transmission resources and information reception resources. The energy signal transmission component 1430 may be configured as or otherwise support a means for transmitting one or more energy signals during the energy transmission resources in accordance with the TDD configuration, the one or more energy signals providing energy to an energy receiver device. The information reception component 1435 may be configured as or otherwise support a means for receiving one or more second messages during the information reception resources in accordance with the TDD configuration.

Figure 15:
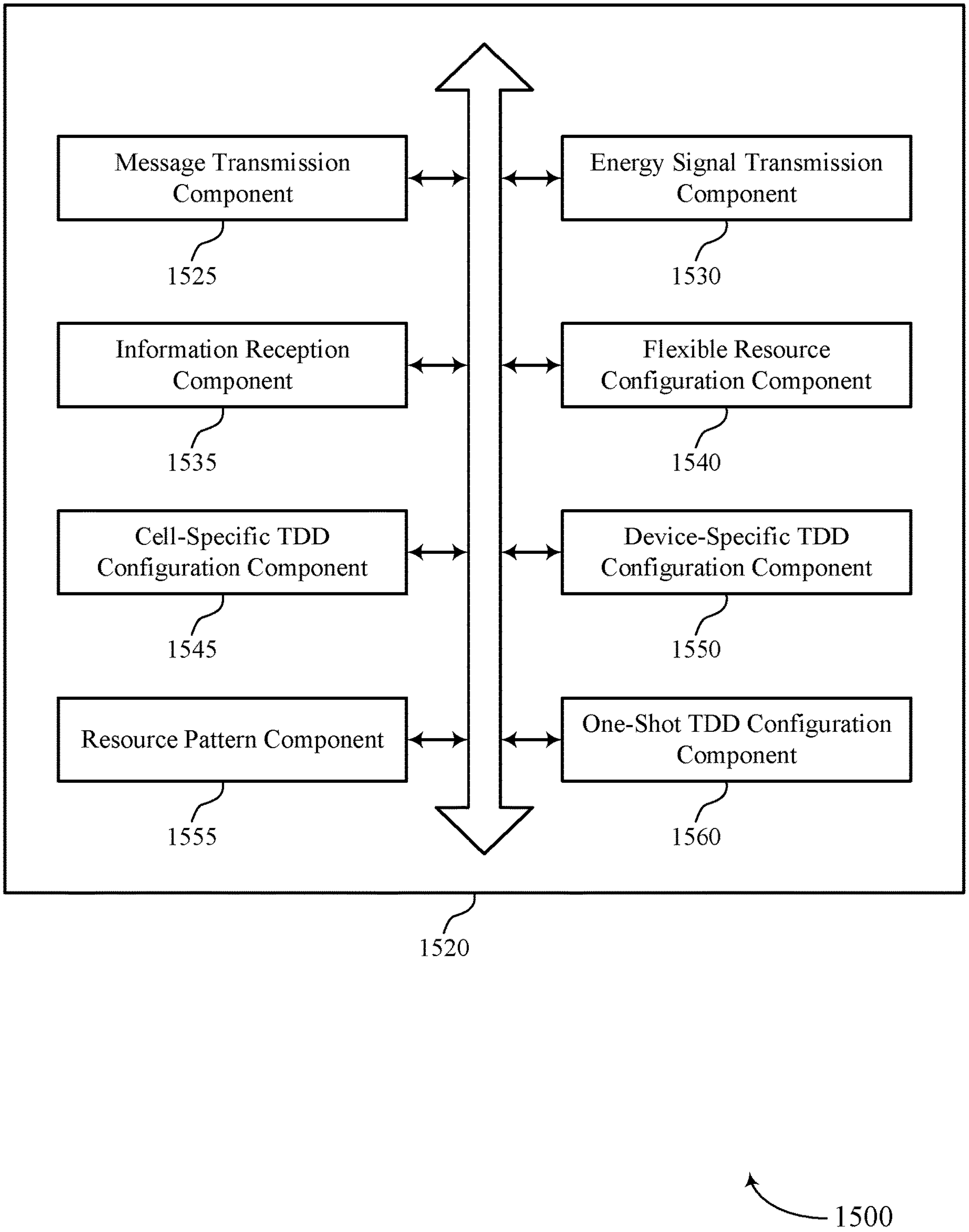

FIG. 15 shows a block diagram 1500 of a communications manager 1520 that supports a TDD framework for wireless energy and information transfer in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of a TDD framework for wireless energy and information transfer as described herein. For example, the communications manager 1520 may include a message transmission component 1525, an energy signal transmission component 1530, an information reception component 1535, a flexible resource configuration component 1540, a cell-specific TDD configuration component 1545, a device-specific TDD configuration component 1550, a resource pattern component 1555, a one-shot TDD configuration component 1560, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at an energy transmitter device in accordance with examples as disclosed herein. The message transmission component 1525 may be configured as or otherwise support a means for transmitting a first message that includes information indicative of a TDD configuration for energy transmission and information reception, the TDD configuration indicating a temporal arrangement of energy transmission resources and information reception resources. The energy signal transmission component 1530 may be configured as or otherwise support a means for transmitting one or more energy signals during the energy transmission resources in accordance with the TDD configuration, the one or more energy signals providing energy to an energy receiver device. The information reception component 1535 may be configured as or otherwise support a means for receiving one or more second messages during the information reception resources in accordance with the TDD configuration.

In some examples, the flexible resource configuration component 1540 may be configured as or otherwise support a means for identifying that the temporal arrangement indicated by the TDD configuration includes a combination of energy transmission resources, information reception resources, and flexible resources, where the flexible resources are able to be used for either energy transmission or information reception.

In some examples, the flexible resource configuration component 1540 may be configured as or otherwise support a means for configuring a flexible resource for energy transmission or information reception based on at least one of an energy storage capability or an energy charging capability of the energy receiver device. In some examples, the TDD configuration is cell-specific to an energy transmitter device that is in communication with the energy receiver device.

In some examples, to support transmitting the first message, the cell-specific TDD configuration component 1545 may be configured as or otherwise support a means for transmitting the information indicative of the TDD configuration via at least one of a SIB or a broadcast channel that includes a MIB. In some examples, the TDD configuration is one of a set of multiple pre-configured TDD configurations.

In some examples, the temporal arrangement of the energy transmission resources and the information reception resources is within a first time period having a first periodicity and that includes the energy transmission resources followed by the information reception resources, where the energy transmission resources include one or more energy transmission slots at a beginning of the first time period and the information reception resources include one or more information reception slots at an end of the first time period.

In some examples, the temporal arrangement of the energy transmission resources and the information reception resources further includes one or more energy transmission symbols in a partial energy transmission slot that follows the one or more energy transmission slots and one or more information reception symbols in a partial information reception slot that precedes the one or more information reception slots.

In some examples, the temporal arrangement of the energy transmission resources and the information reception resources further includes flexible resources in the partial energy transmission slot, in the partial information reception slot, and in one or more flexible slots that are temporally between the energy transmission resources and the information reception resources, where the flexible resources are able to be used for either energy transmission or information reception. In some examples, the first periodicity aligns the first time period with a TDD radio frame boundary.

In some examples, the temporal arrangement of the energy transmission resources and the information reception resources is within a combination of a first time period having a first periodicity and a second time period having a second periodicity, where the first time period includes a first portion of the energy transmission resources followed by a first portion of the information reception resources and the second time period includes a second portion of the energy transmission resources followed by a second portion of the information reception resources, where the energy transmission resources include one or more first energy transmission slots at a beginning of the first time period and one or more second energy transmission slots at a beginning of the second time period, and the information reception resources include one or more first information reception slots at an end of the first time period and one or more second information reception slots at an end of the second time period.

In some examples, the temporal arrangement of the energy transmission resources and the information reception resources further includes one or more first energy transmission symbols in a first partial energy transmission slot that follows the one or more first energy transmission slots in the first time period, one or more second energy transmission symbols in a second partial energy transmission slot that follows the one or more second energy transmission slots in the second time period, one or more first information reception symbols in a first partial information reception slot that precedes the one or more first information reception slots in the first time period, and one or more second information reception symbols in a second partial information reception slot that precedes the one or more second information reception slots in the second time period.

In some examples, the temporal arrangement of the energy transmission resources and the information reception resources further includes flexible resources in the first partial energy transmission slot, in the first partial information reception slot, in the second partial energy transmission slot, in the second partial information reception slot, in one or more first flexible slots that are temporally between the one or more first energy transmission slots and the one or more first information reception slots, and in one or more second flexible slots that are temporally between the one or more second energy transmission slots and the one or more second information reception slots, where the flexible resources are able to be used for either energy transmission or information reception. In some examples, the first periodicity and the second periodicity combine to align the temporal arrangement with a TDD radio frame boundary.

In some examples, the one-shot TDD configuration component 1560 may be configured as or otherwise support a means for transmitting a third message via group signaling that includes an SFI, the SFI indicative of a one-shot TDD configuration that identifies at least one or more flexible resources indicated by the TDD configuration of the first message to be used for energy transmission or information reception, where the flexible resources are able to be used for either energy transmission or information reception. In some examples, the one-shot TDD configuration is based on a traffic pattern and an energy usage requirement corresponding to the energy receiver device.

In some examples, the one-shot TDD configuration component 1560 may be configured as or otherwise support a means for determining a duration of applicability of the one-shot TDD configuration. In some examples, the duration of applicability of the one-shot TDD configuration is based on a periodicity of the third message that includes the SFI.

In some examples, to support transmitting the third message via group signaling that includes the SFI, the one-shot TDD configuration component 1560 may be configured as or otherwise support a means for transmitting the SFI from among a set of multiple SFIs included in the third message, each of the set of multiple SFIs pertaining to different sets of energy receiver devices.

In some examples, the one-shot TDD configuration identifies only the one or more flexible resources indicated by the TDD configuration of the first message for energy transmission or information reception.

In some examples, the one-shot TDD configuration additionally identifies one or more energy transmission resources in the TDD configuration to reconfigure and add to the information reception resources, one or more information reception resources in the TDD configuration to reconfigure and add to the energy transmission resources, or both.

In some examples, to support transmitting the third message via group signaling that includes the SFI, the one-shot TDD configuration component 1560 may be configured as or otherwise support a means for transmitting the SFI from among a set of multiple SFIs included in the third message, a combination of at least two of the set of multiple SFIs pertaining to the energy receiver device but for different time durations.

In some examples, to support transmitting the third message via group signaling that includes the SFI, the one-shot TDD configuration component 1560 may be configured as or otherwise support a means for transmitting a combination identifier that indicates a combination of the SFI with one or more additional SFIs, that combination pertaining to the energy receiver device, with different time durations corresponding to each of the SFI and the one or more additional SFIs.

In some examples, the device-specific TDD configuration component 1550 may be configured as or otherwise support a means for transmitting a third message via signaling that is specific to the energy receiver device, the third message indicative of an energy receiver device-specific TDD configuration that identifies one or more flexible resources indicated by the TDD configuration of the first message to be used for energy reception or information transmission, where the flexible resources are able to be used for either energy reception or information transmission.

In some examples, the device-specific TDD configuration component 1550 may be configured as or otherwise support a means for configuring, based on the energy receiver device-specific TDD configuration, to use all symbols within one or more slots of the flexible resources indicated by the TDD configuration of the first message for energy transmission, or to use all symbols within one or more slots of the flexible resources indicated by the TDD configuration of the first message for information reception.

In some examples, the device-specific TDD configuration component 1550 may be configured as or otherwise support a means for identifying, based on the energy receiver device-specific TDD configuration, specific flexible resources of the TDD configuration of the first message for either energy transmission or information transmission, the specific flexible resources indicated as a number of symbols or slots from among the flexible resources.

Figure 16:
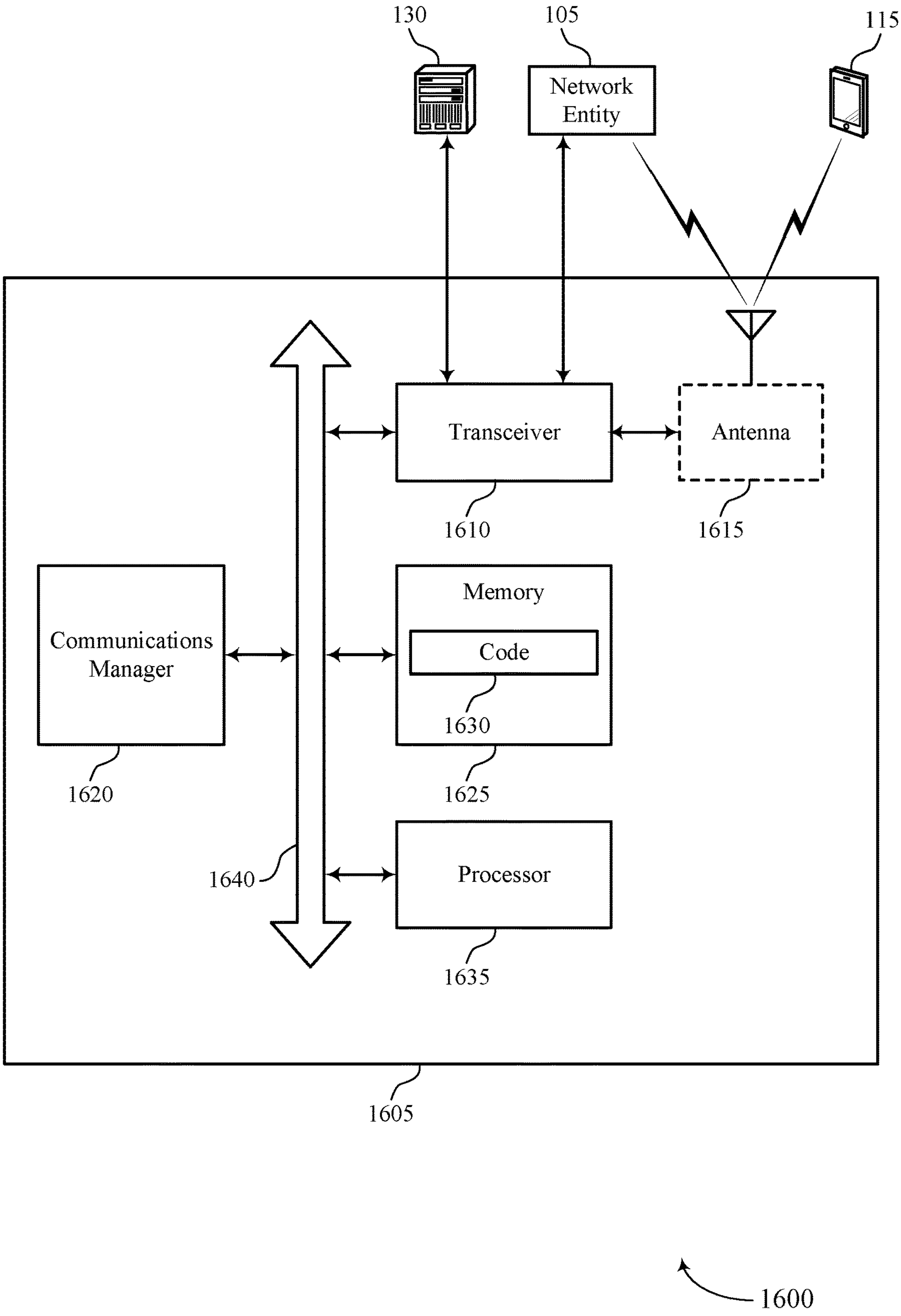
FIG. 16 shows a block diagram of a communications manager that supports a TDD framework for wireless energy and information transfer in accordance with one or more aspects of the present disclosure.

FIG. 16 shows a diagram of a system 1600 including a device 1605 that supports a TDD framework for wireless energy and information transfer in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. The transceiver 1610, or the transceiver 1610 and one or more antennas 1615 or wired interfaces, where applicable, may be an example of a transmitter 1315, a transmitter 1415, a receiver 1310, a receiver 1410, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting TDD framework for wireless energy and information transfer). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at an energy transmitter device in accordance with examples as disclosed herein. For example, the communications manager 1620 may be configured as or otherwise support a means for transmitting a first message that includes information indicative of a TDD configuration for energy transmission and information reception, the TDD configuration indicating a temporal arrangement of energy transmission resources and information reception resources. The communications manager 1620 may be configured as or otherwise support a means for transmitting one or more energy signals during the energy transmission resources in accordance with the TDD configuration, the one or more energy signals providing energy to an energy receiver device. The communications manager 1620 may be configured as or otherwise support a means for receiving one or more second messages during the information reception resources in accordance with the TDD configuration.

By including or configuring the communications manager 1620 in accordance with examples as described herein, the device 1605 may support techniques for configuring a TDD configuration (e.g., framework) for wireless energy and information transfer, which may support improved communications between an energy receiver device (e.g., a UE) and an energy transmitter device (e.g., a network entity). In some examples, the described techniques may reduce hardware costs, reduce interference and collisions between energy and information signals, and increase the dependability of an energy source for the energy receiver device, among other benefits.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the processor 1635, the memory 1625, the code 1630, the transceiver 1610, or any combination thereof. For example, the code 1630 may include instructions executable by the processor 1635 to cause the device 1605 to perform various aspects of a TDD framework for wireless energy and information transfer as described herein, or the processor 1635 and the memory 1625 may be otherwise configured to perform or support such operations.

Figure 17:
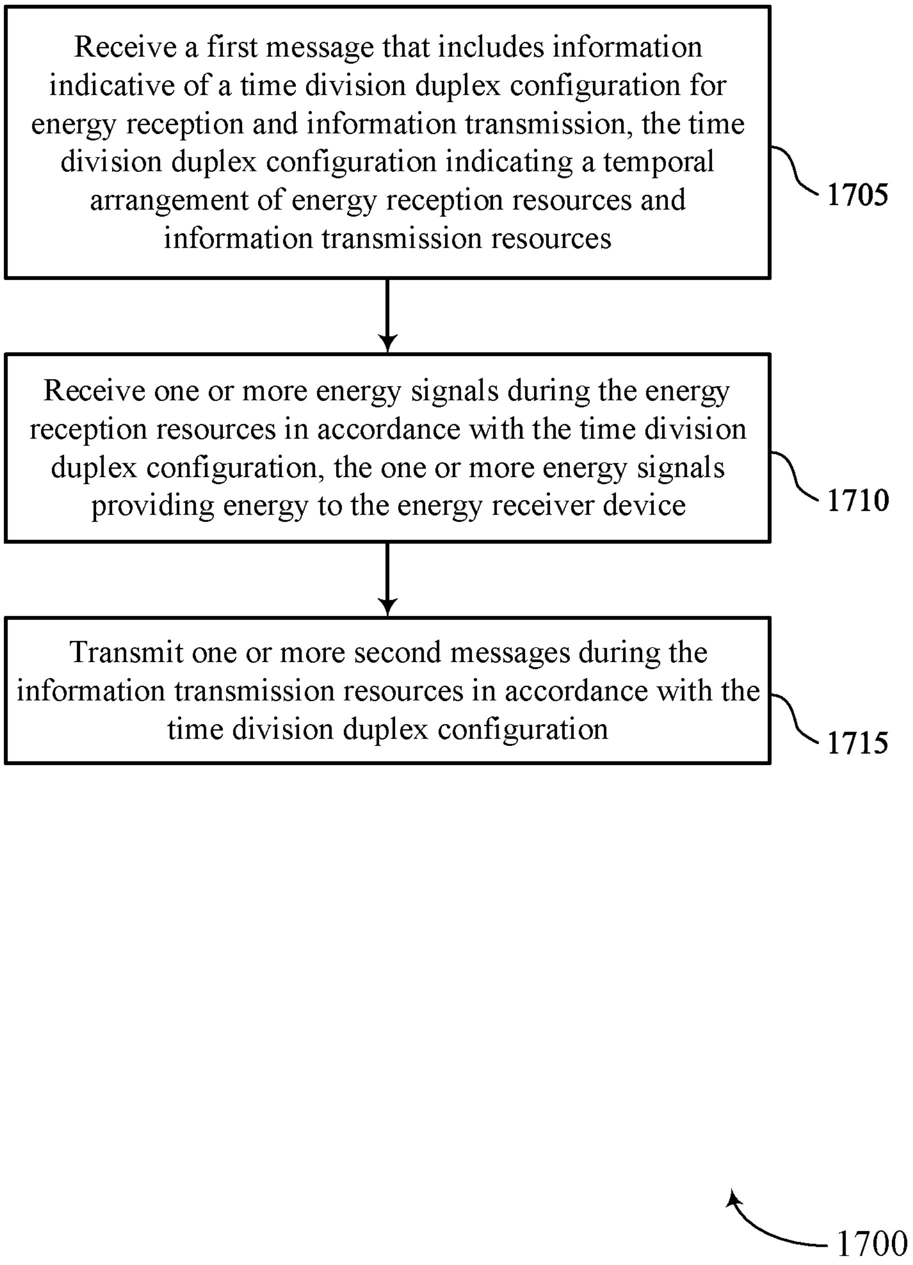
FIG. 17 shows a diagram of a system including a device that supports a TDD framework for wireless energy and information transfer in accordance with one or more aspects of the present disclosure.

FIG. 17 shows a flowchart illustrating a method 1700 that supports a TDD framework for wireless energy and information transfer in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving a first message that includes information indicative of a TDD configuration for energy reception and information transmission, the TDD configuration indicating a temporal arrangement of energy reception resources and information transmission resources. The operations of 1705 may be performed in accordance with examples as disclosed herein. In some examples, aspects of the operations of 1705 may be performed by a TDD configuration component 1125 as described with reference to FIG. 11.

At 1710, the method may include receiving one or more energy signals during the energy reception resources in accordance with the TDD configuration, the one or more energy signals providing energy to the energy receiver device. The operations of 1710 may be performed in accordance with examples as disclosed herein. In some examples, aspects of the operations of 1710 may be performed by an energy signal reception component 1130 as described with reference to FIG. 11.

At 1715, the method may include transmitting one or more second messages during the information transmission resources in accordance with the TDD configuration. The operations of 1715 may be performed in accordance with examples as disclosed herein. In some examples, aspects of the operations of 1715 may be performed by an information transmission component 1135 as described with reference to FIG. 11.

Figure 18:
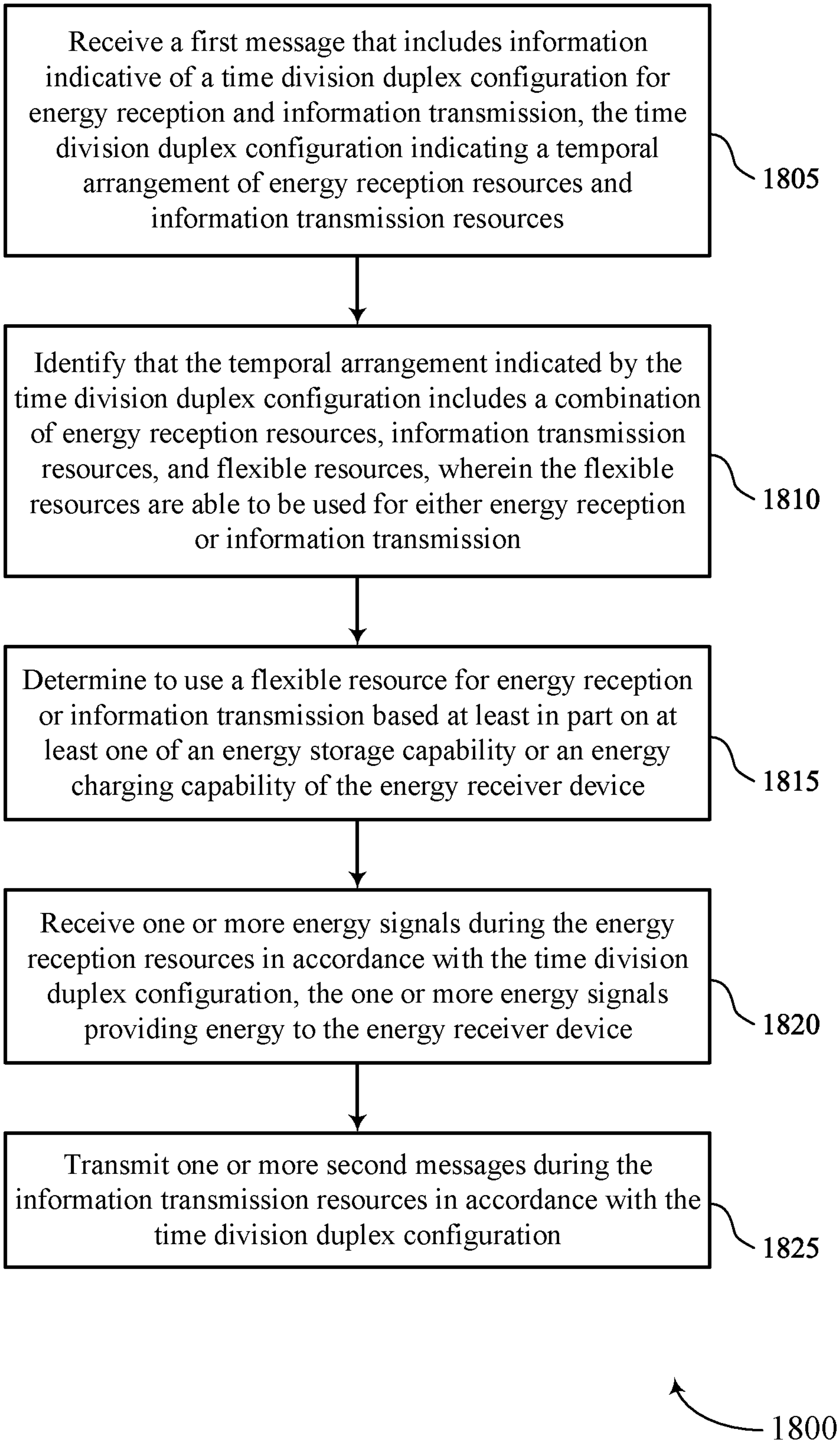
FIGS. 18 through 22 show flowcharts illustrating methods that support a TDD framework for wireless energy and information transfer in accordance with one or more aspects of the present disclosure.

FIG. 18 shows a flowchart illustrating a method 1800 that supports a TDD framework for wireless energy and information transfer in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving a first message that includes information indicative of a TDD configuration for energy reception and information transmission, the TDD configuration indicating a temporal arrangement of energy reception resources and information transmission resources. The operations of 1805 may be performed in accordance with examples as disclosed herein. In some examples, aspects of the operations of 1805 may be performed by a TDD configuration component 1125 as described with reference to FIG. 11.

At 1810, the method may include identifying that the temporal arrangement indicated by the TDD configuration includes a combination of energy reception resources, information transmission resources, and flexible resources, where the flexible resources are able to be used for either energy reception or information transmission. The operations of 1810 may be performed in accordance with examples as disclosed herein. In some examples, aspects of the operations of 1810 may be performed by a flexible resource component 1140 as described with reference to FIG. 11.

At 1815, the method may include determining to use a flexible resource for energy reception or information transmission based on at least one of an energy storage capability or an energy charging capability of the energy receiver device. The operations of 1815 may be performed in accordance with examples as disclosed herein. In some examples, aspects of the operations of 1815 may be performed by a flexible resource component 1140 as described with reference to FIG. 11.

At 1820, the method may include receiving one or more energy signals during the energy reception resources in accordance with the TDD configuration, the one or more energy signals providing energy to the energy receiver device. The operations of 1820 may be performed in accordance with examples as disclosed herein. In some examples, aspects of the operations of 1820 may be performed by an energy signal reception component 1130 as described with reference to FIG. 11.

At 1825, the method may include transmitting one or more second messages during the information transmission resources in accordance with the TDD configuration. The operations of 1825 may be performed in accordance with examples as disclosed herein. In some examples, aspects of the operations of 1825 may be performed by an information transmission component 1135 as described with reference to FIG. 11.

Figure 19:
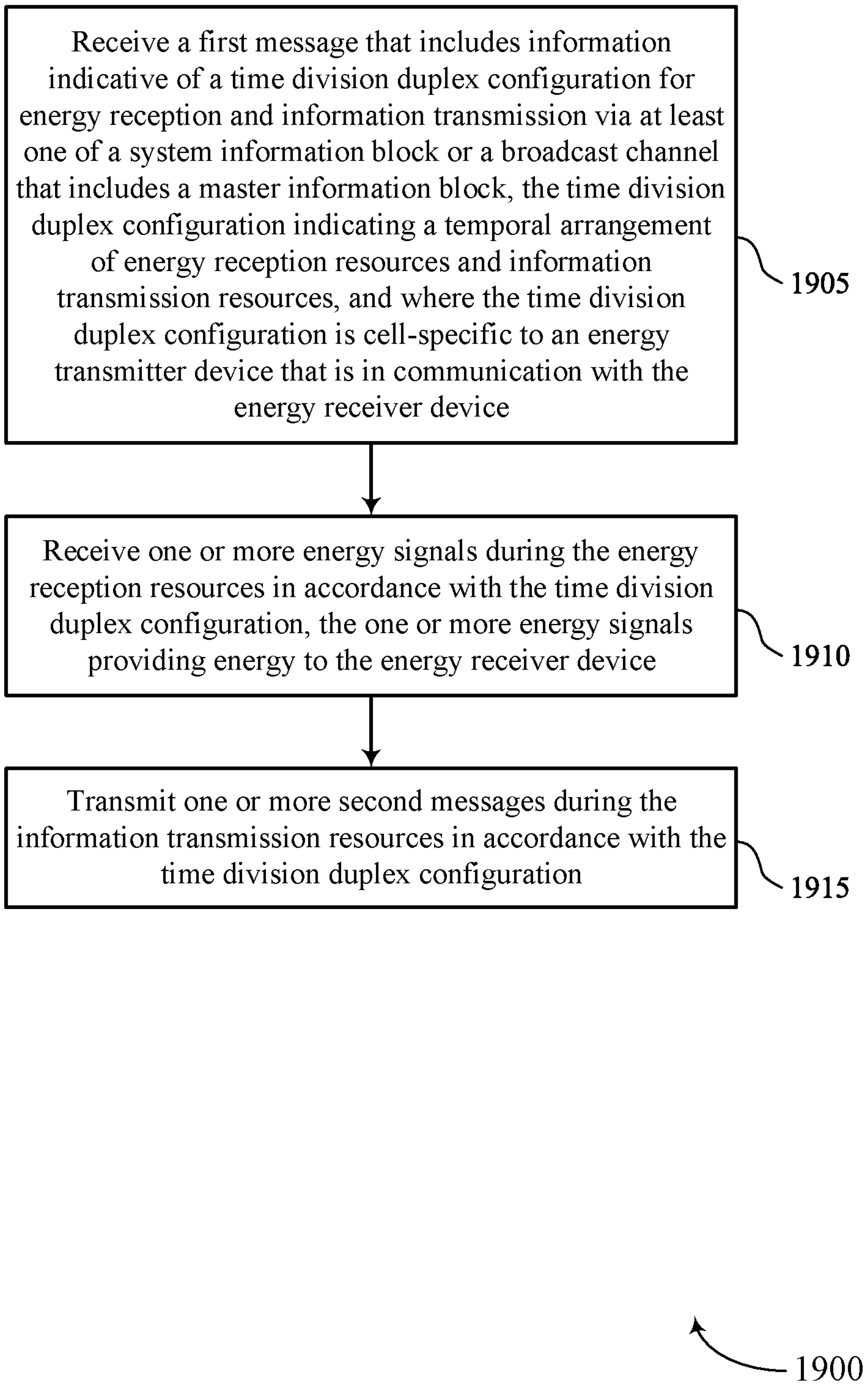

FIG. 19 shows a flowchart illustrating a method 1900 that supports a TDD framework for wireless energy and information transfer in accordance with one or more aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving a first message that includes information indicative of a TDD configuration for energy reception and information transmission via at least one of a SIB or a broadcast channel that includes a MIB, the TDD configuration indicating a temporal arrangement of energy reception resources and information transmission resources, and where the TDD configuration is cell-specific to an energy transmitter device that is in communication with the energy receiver device. The operations of 1905 may be performed in accordance with examples as disclosed herein. In some examples, aspects of the operations of 1905 may be performed by a TDD configuration component 1125 as described with reference to FIG. 11.

At 1910, the method may include receiving one or more energy signals during the energy reception resources in accordance with the TDD configuration, the one or more energy signals providing energy to the energy receiver device. The operations of 1910 may be performed in accordance with examples as disclosed herein. In some examples, aspects of the operations of 1910 may be performed by an energy signal reception component 1130 as described with reference to FIG. 11.

At 1915, the method may include transmitting one or more second messages during the information transmission resources in accordance with the TDD configuration. The operations of 1915 may be performed in accordance with examples as disclosed herein. In some examples, aspects of the operations of 1915 may be performed by an information transmission component 1135 as described with reference to FIG. 11.

Figure 20:
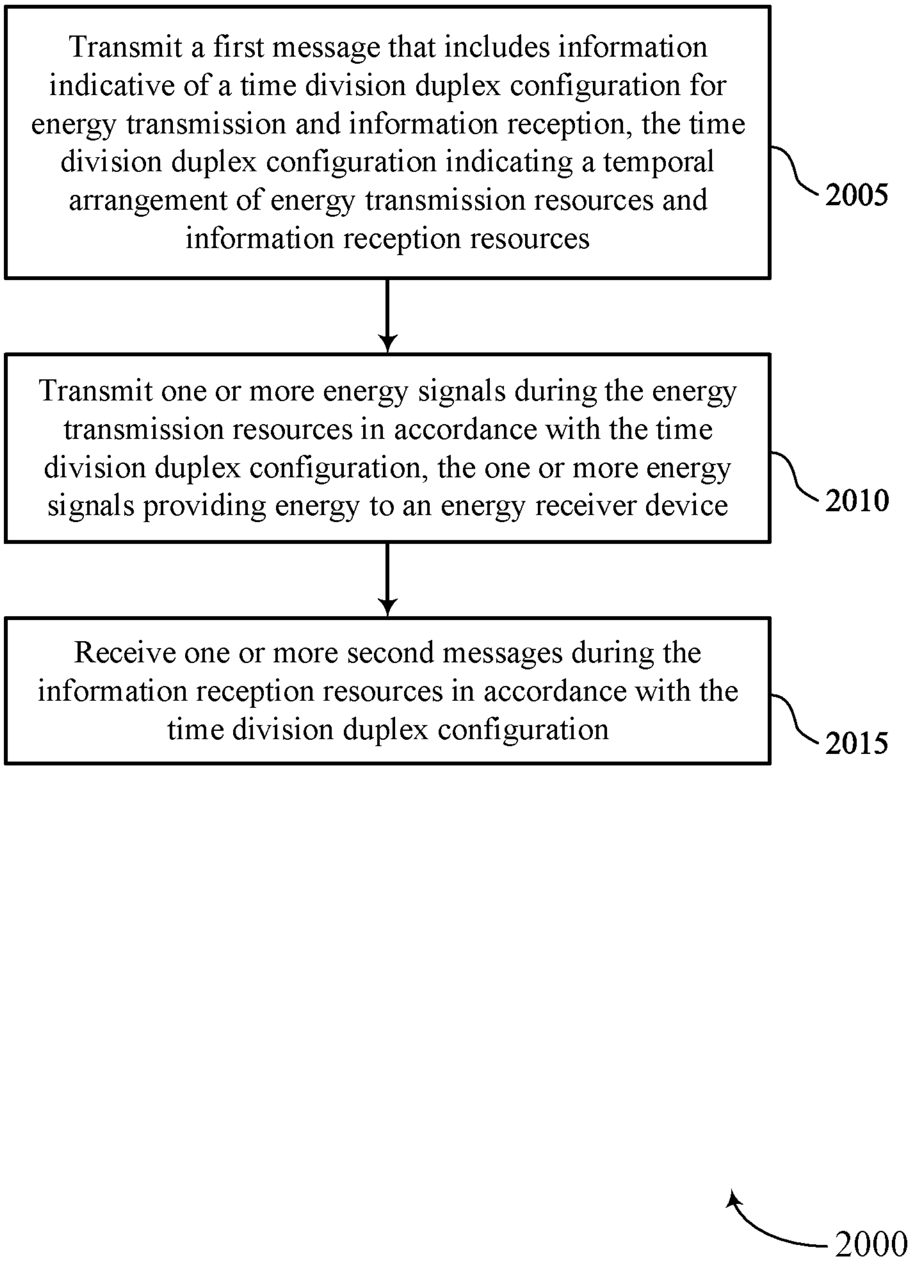

FIG. 20 shows a flowchart illustrating a method 2000 that supports a TDD framework for wireless energy and information transfer in accordance with one or more aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include transmitting a first message that includes information indicative of a TDD configuration for energy transmission and information reception, the TDD configuration indicating a temporal arrangement of energy transmission resources and information reception resources. The operations of 2005 may be performed in accordance with examples as disclosed herein. In some examples, aspects of the operations of 2005 may be performed by a message transmission component 1525 as described with reference to FIG. 15.

At 2010, the method may include transmitting one or more energy signals during the energy transmission resources in accordance with the TDD configuration, the one or more energy signals providing energy to an energy receiver device. The operations of 2010 may be performed in accordance with examples as disclosed herein. In some examples, aspects of the operations of 2010 may be performed by an energy signal transmission component 1530 as described with reference to FIG. 15.

At 2015, the method may include receiving one or more second messages during the information reception resources in accordance with the TDD configuration. The operations of 2015 may be performed in accordance with examples as disclosed herein. In some examples, aspects of the operations of 2015 may be performed by an information reception component 1535 as described with reference to FIG. 15.

Figure 21:
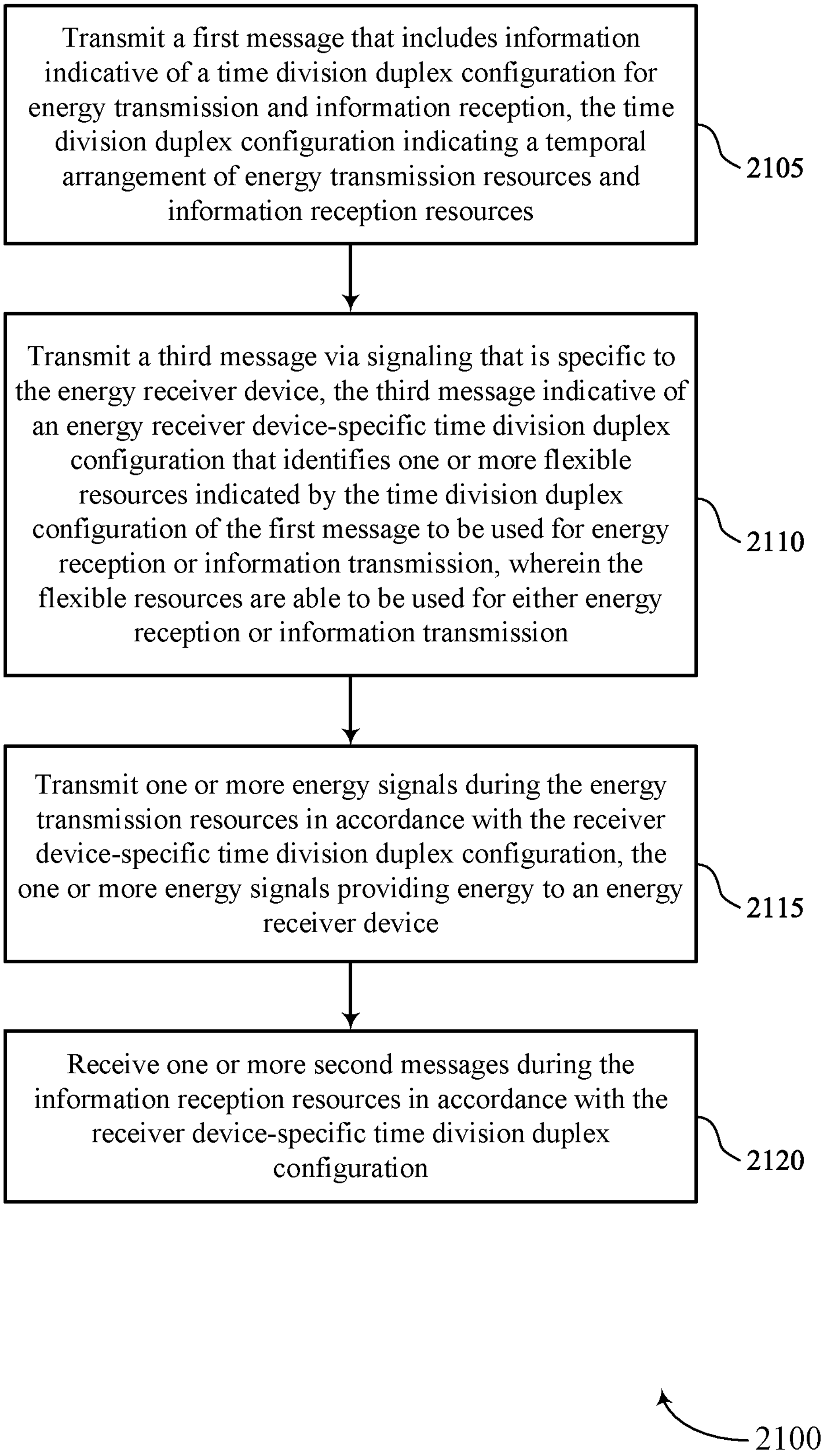

FIG. 21 shows a flowchart illustrating a method 2100 that supports a TDD framework for wireless energy and information transfer in accordance with one or more aspects of the present disclosure. The operations of the method 2100 may be implemented by a network entity or its components as described herein. For example, the operations of the method 2100 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2105, the method may include transmitting a first message that includes information indicative of a TDD configuration for energy transmission and information reception, the TDD configuration indicating a temporal arrangement of energy transmission resources and information reception resources. The operations of 2105 may be performed in accordance with examples as disclosed herein. In some examples, aspects of the operations of 2105 may be performed by a message transmission component 1525 as described with reference to FIG. 15.

At 2110, the method may include transmitting a third message via signaling that is specific to the energy receiver device, the third message indicative of an energy receiver device-specific TDD configuration that identifies one or more flexible resources indicated by the TDD configuration of the first message to be used for energy reception or information transmission, where the flexible resources are able to be used for either energy reception or information transmission. The operations of 2110 may be performed in accordance with examples as disclosed herein. In some examples, aspects of the operations of 2110 may be performed by a device-specific TDD configuration component 1550 as described with reference to FIG. 15.

At 2115, the method may include transmitting one or more energy signals during the energy transmission resources in accordance with the receiver device-specific TDD configuration, the one or more energy signals providing energy to an energy receiver device. The operations of 2115 may be performed in accordance with examples as disclosed herein. In some examples, aspects of the operations of 2115 may be performed by an energy signal transmission component 1530 as described with reference to FIG. 15.

At 2120, the method may include receiving one or more second messages during the information reception resources in accordance with the energy receiver device-specific TDD configuration. The operations of 2120 may be performed in accordance with examples as disclosed herein. In some examples, aspects of the operations of 2120 may be performed by an information reception component 1535 as described with reference to FIG. 15.

Figure 22:
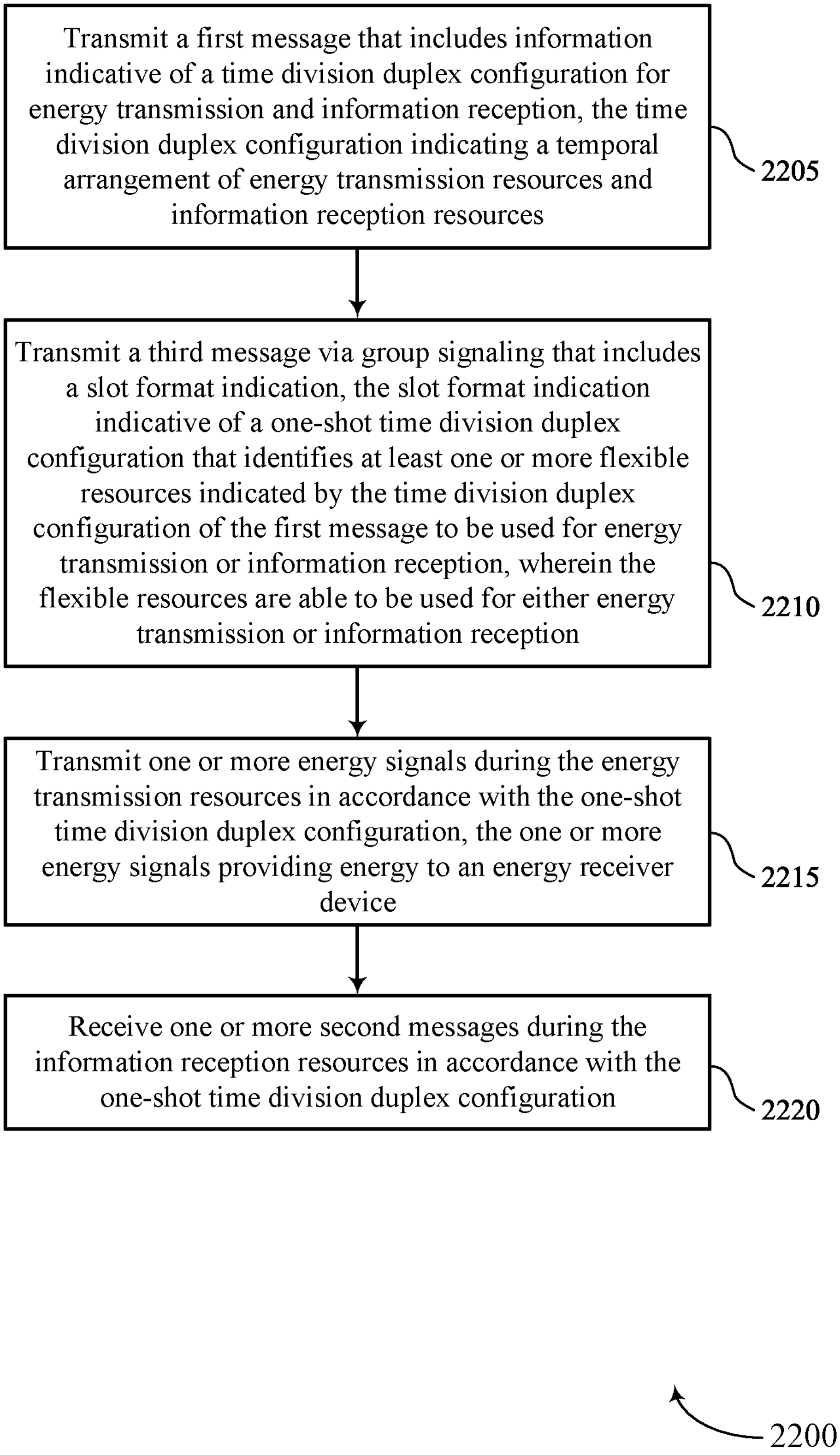

FIG. 22 shows a flowchart illustrating a method 2200 that supports a TDD framework for wireless energy and information transfer in accordance with one or more aspects of the present disclosure. The operations of the method 2200 may be implemented by a network entity or its components as described herein. For example, the operations of the method 2200 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2205, the method may include transmitting a first message that includes information indicative of a TDD configuration for energy transmission and information reception, the TDD configuration indicating a temporal arrangement of energy transmission resources and information reception resources. The operations of 2205 may be performed in accordance with examples as disclosed herein. In some examples, aspects of the operations of 2205 may be performed by a message transmission component 1525 as described with reference to FIG. 15.

At 2210, the method may include transmitting a third message via group signaling that includes an SFI, the SFI indicative of a one-shot TDD configuration that identifies at least one or more flexible resources indicated by the TDD configuration of the first message to be used for energy transmission or information reception, where the flexible resources are able to be used for either energy transmission or information reception. The operations of 2210 may be performed in accordance with examples as disclosed herein. In some examples, aspects of the operations of 2210 may be performed by a one-shot TDD configuration component 1560 as described with reference to FIG. 15.

At 2215, the method may include transmitting one or more energy signals during the energy transmission resources in accordance with the one-shot TDD configuration, the one or more energy signals providing energy to an energy receiver device. The operations of 2215 may be performed in accordance with examples as disclosed herein. In some examples, aspects of the operations of 2215 may be performed by an energy signal transmission component 1530 as described with reference to FIG. 15.

At 2220, the method may include receiving one or more second messages during the information reception resources in accordance with the one-shot TDD configuration. The operations of 2220 may be performed in accordance with examples as disclosed herein. In some examples, aspects of the operations of 2220 may be performed by an information reception component 1535 as described with reference to FIG. 15.

The following provides an overview of aspects of the present disclosure:

Aspect 1: A method for wireless communication at an energy receiver device, comprising: receiving a first message that includes information indicative of a TDD configuration for energy reception and information transmission, the TDD configuration indicating a temporal arrangement of energy reception resources and information transmission resources; receiving one or more energy signals during the energy reception resources in accordance with the TDD configuration, the one or more energy signals providing energy to the energy receiver device; and transmitting one or more second messages during the information transmission resources in accordance with the TDD configuration.

Aspect 2: The method of aspect 1, further comprising: identifying that the temporal arrangement indicated by the TDD configuration includes a combination of energy reception resources, information transmission resources, and flexible resources, wherein the flexible resources are able to be used for either energy reception or information transmission.

Aspect 3: The method of aspect 2, further comprising: determining to use a flexible resource for energy reception or information transmission based at least in part on at least one of an energy storage capability or an energy charging capability of the energy receiver device.

Aspect 4: The method of any of aspects 1 through 3, wherein the TDD configuration is cell-specific to an energy transmitter device that is in communication with the energy receiver device.

Aspect 5: The method of aspect 4, wherein receiving the first message comprises: receiving the information indicative of the TDD configuration via at least one of a SIB or a broadcast channel that includes a MIB.

Aspect 6: The method of any of aspects 4 through 5, wherein the TDD configuration is one of a plurality of pre-configured TDD configurations.

Aspect 7: The method of any of aspects 4 through 6, wherein the temporal arrangement of the energy reception resources and the information transmission resources is within a first time period having a first periodicity and that includes the energy reception resources followed by the information transmission resources, wherein the energy reception resources include one or more energy reception slots at a beginning of the first time period and the information transmission resources include one or more information transmission slots at an end of the first time period.

Aspect 8: The method of aspect 7, wherein the temporal arrangement of the energy reception resources and the information transmission resources further includes one or more energy reception symbols in a partial energy reception slot that follows the one or more energy reception slots and one or more information transmission symbols in a partial information transmission slot that precedes the one or more information transmission slots.

Aspect 9: The method of aspect 8, wherein the temporal arrangement of the energy reception resources and the information transmission resources further includes flexible resources in the partial energy reception slot, in the partial information transmission slot, and in one or more flexible slots that are temporally between the energy reception resources and the information transmission resources, wherein the flexible resources are able to be used for either energy reception or information transmission.

Aspect 10: The method of any of aspects 7 through 9, wherein the first periodicity aligns the first time period with a TDD radio frame boundary.

Aspect 11: The method of any of aspects 4 through 10, wherein the temporal arrangement of the energy reception resources and the information transmission resources is within a combination of a first time period having a first periodicity and a second time period having a second periodicity, wherein the first time period includes a first portion of the energy reception resources followed by a first portion of the information transmission resources and the second time period includes a second portion of the energy reception resources followed by a second portion of the information transmission resources, wherein the energy reception resources include one or more first energy reception slots at a beginning of the first time period and one or more second energy reception slots at a beginning of the second time period, and the information transmission resources include one or more first information transmission slots at an end of the first time period and one or more second information transmission slots at an end of the second time period.

Aspect 12: The method of aspect 11, wherein the temporal arrangement of the energy reception resources and the information transmission resources further includes one or more first energy reception symbols in a first partial energy reception slot that follows the one or more first energy reception slots in the first time period, one or more second energy reception symbols in a second partial energy reception slot that follows the one or more second energy reception slots in the second time period, one or more first information transmission symbols in a first partial information transmission slot that precedes the one or more first information transmission slots in the first time period, and one or more second information transmission symbols in a second partial information transmission slot that precedes the one or more second information transmission slots in the second time period.

Aspect 13: The method of aspect 12, wherein the temporal arrangement of the energy reception resources and the information transmission resources further includes flexible resources in the first partial energy reception slot, in the first partial information transmission slot, in the second partial energy reception slot, in the second partial information transmission slot, in one or more first flexible slots that are temporally between the one or more first energy reception slots and the one or more first information transmission slots, and in one or more second flexible slots that are temporally between the one or more second energy reception slots and the one or more second information transmission slots, wherein the flexible resources are able to be used for either energy reception or information transmission.

Aspect 14: The method of any of aspects 11 through 13, wherein the first periodicity and the second periodicity combine to align the temporal arrangement with a TDD radio frame boundary.

Aspect 15: The method of any of aspects 4 through 14, further comprising: receiving a third message via signaling that is specific to the energy receiver device, the third message indicative of an energy receiver device-specific TDD configuration that identifies one or more flexible resources indicated by the TDD configuration of the first message to be used for energy reception or information transmission, wherein the flexible resources are able to be used for either energy reception or information transmission.

Aspect 16: The method of aspect 15, further comprising: determining, based at least in part on the energy receiver device-specific TDD configuration, to use all symbols within one or more slots of the flexible resources indicated by the TDD configuration of the first message for energy reception, or to use all symbols within one or more slots of the flexible resources indicated by the TDD configuration of the first message for information transmission.

Aspect 17: The method of any of aspects 15 through 16, further comprising: identifying, based at least in part on the energy receiver device-specific TDD configuration, specific flexible resources of the TDD configuration of the first message for either energy reception or information transmission, the specific flexible resources indicated as a number of symbols or slots from among the flexible resources.

Aspect 18: The method of any of aspects 4 through 17, further comprising: receiving a third message via group signaling that includes an SFI, the SFI indicative of a one-shot TDD configuration that identifies at least one or more flexible resources indicated by the TDD configuration of the first message to be used for energy reception or information transmission, wherein the flexible resources are able to be used for either energy reception or information transmission.

Aspect 19: The method of aspect 18, wherein the one-shot TDD configuration is based at least in part on a traffic pattern and an energy usage requirement corresponding to the energy receiver device.

Aspect 20: The method of any of aspects 18 through 19, further comprising: determining a duration of applicability of the one-shot TDD configuration.

Aspect 21: The method of aspect 20, wherein the duration of applicability of the one-shot TDD configuration is based at least in part on a periodicity of the third message that includes the SFI.

Aspect 22: The method of any of aspects 18 through 21, wherein receiving the third message via group signaling that includes the SFI comprises: receiving the SFI from among a plurality of SFIs included in the third message, each of the plurality of SFIs pertaining to different sets of energy receiver devices.

Aspect 23: The method of any of aspects 18 through 22, wherein the one-shot TDD configuration identifies only the one or more flexible resources indicated by the TDD configuration of the first message for energy reception or information transmission.

Aspect 24: The method of aspect 23, wherein the one-shot TDD configuration additionally identifies one or more energy reception resources in the TDD configuration to reconfigure and add to the information transmission resources, one or more information transmission resources in the TDD configuration to reconfigure and add to the energy reception resources, or both.

Aspect 25: The method of any of aspects 18 through 24, wherein receiving the third message via group signaling that includes the SFI comprises: receiving the SFI from among a plurality of SFIs included in the third message, a combination of at least two of the plurality of SFIs pertaining to the energy receiver device but for different time durations.

Aspect 26: The method of any of aspects 18 through 25, wherein receiving the third message via group signaling that includes the SFI comprises: receiving a combination identifier that indicates a combination of the SFI with one or more additional SFIs, that combination pertaining to the energy receiver device, with different time durations corresponding to each of the SFI and the one or more additional SFIs.

Aspect 27: A method for wireless communication at an energy transmitter device, comprising: transmitting a first message that includes information indicative of a TDD configuration for energy transmission and information reception, the TDD configuration indicating a temporal arrangement of energy transmission resources and information reception resources; transmitting one or more energy signals during the energy transmission resources in accordance with the TDD configuration, the one or more energy signals providing energy to an energy receiver device; and receiving one or more second messages during the information reception resources in accordance with the TDD configuration.

Aspect 28: The method of aspect 27, further comprising: identifying that the temporal arrangement indicated by the TDD configuration includes a combination of energy transmission resources, information reception resources, and flexible resources, wherein the flexible resources are able to be used for either energy transmission or information reception.

Aspect 29: The method of aspect 28, further comprising: configuring a flexible resource for energy transmission or information reception based at least in part on at least one of an energy storage capability or an energy charging capability of the energy receiver device.

Aspect 30: The method of any of aspects 27 through 29, wherein the TDD configuration is cell-specific to an energy transmitter device that is in communication with the energy receiver device.

Aspect 31: The method of aspect 30, wherein transmitting the first message comprises: transmitting the information indicative of the TDD configuration via at least one of a SIB or a broadcast channel that includes a MIB.

Aspect 32: The method of any of aspects 30 through 31, wherein the TDD configuration is one of a plurality of pre-configured TDD configurations.

Aspect 33: The method of any of aspects 30 through 32, wherein the temporal arrangement of the energy transmission resources and the information reception resources is within a first time period having a first periodicity and that includes the energy transmission resources followed by the information reception resources, wherein the energy transmission resources include one or more energy transmission slots at a beginning of the first time period and the information reception resources include one or more information reception slots at an end of the first time period.

Aspect 34: The method of aspect 33, wherein the temporal arrangement of the energy transmission resources and the information reception resources further includes one or more energy transmission symbols in a partial energy transmission slot that follows the one or more energy transmission slots and one or more information reception symbols in a partial information reception slot that precedes the one or more information reception slots.

Aspect 35: The method of aspect 34, wherein the temporal arrangement of the energy transmission resources and the information reception resources further includes flexible resources in the partial energy transmission slot, in the partial information reception slot, and in one or more flexible slots that are temporally between the energy transmission resources and the information reception resources, wherein the flexible resources are able to be used for either energy transmission or information reception.

Aspect 36: The method of any of aspects 33 through 35, wherein the first periodicity aligns the first time period with a TDD radio frame boundary.

Aspect 37: The method of any of aspects 30 through 36, wherein the temporal arrangement of the energy transmission resources and the information reception resources is within a combination of a first time period having a first periodicity and a second time period having a second periodicity, wherein the first time period includes a first portion of the energy transmission resources followed by a first portion of the information reception resources and the second time period includes a second portion of the energy transmission resources followed by a second portion of the information reception resources, wherein the energy transmission resources include one or more first energy transmission slots at a beginning of the first time period and one or more second energy transmission slots at a beginning of the second time period, and the information reception resources include one or more first information reception slots at an end of the first time period and one or more second information reception slots at an end of the second time period.

Aspect 38: The method of aspect 37, wherein the temporal arrangement of the energy transmission resources and the information reception resources further includes one or more first energy transmission symbols in a first partial energy transmission slot that follows the one or more first energy transmission slots in the first time period, one or more second energy transmission symbols in a second partial energy transmission slot that follows the one or more second energy transmission slots in the second time period, one or more first information reception symbols in a first partial information reception slot that precedes the one or more first information reception slots in the first time period, and one or more second information reception symbols in a second partial information reception slot that precedes the one or more second information reception slots in the second time period.

Aspect 39: The method of aspect 38, wherein the temporal arrangement of the energy transmission resources and the information reception resources further includes flexible resources in the first partial energy transmission slot, in the first partial information reception slot, in the second partial energy transmission slot, in the second partial information reception slot, in one or more first flexible slots that are temporally between the one or more first energy transmission slots and the one or more first information reception slots, and in one or more second flexible slots that are temporally between the one or more second energy transmission slots and the one or more second information reception slots, wherein the flexible resources are able to be used for either energy transmission or information reception.

Aspect 40: The method of any of aspects 37 through 39, wherein the first periodicity and the second periodicity combine to align the temporal arrangement with a TDD radio frame boundary.

Aspect 41: The method of any of aspects 30 through 40, further comprising: transmitting a third message via group signaling that includes an SFI, the SFI indicative of a one-shot TDD configuration that identifies at least one or more flexible resources indicated by the TDD configuration of the first message to be used for energy transmission or information reception, wherein the flexible resources are able to be used for either energy transmission or information reception.

Aspect 42: The method of aspect 41, wherein the one-shot TDD configuration is based at least in part on a traffic pattern and an energy usage requirement corresponding to the energy receiver device.

Aspect 43: The method of any of aspects 41 through 42, further comprising: determining a duration of applicability of the one-shot TDD configuration.

Aspect 44: The method of aspect 43, wherein the duration of applicability of the one-shot TDD configuration is based at least in part on a periodicity of the third message that includes the SFI.

Aspect 45: The method of any of aspects 41 through 44, wherein transmitting the third message via group signaling that includes the SFI comprises: transmitting the SFI from among a plurality of SFIs included in the third message, each of the plurality of SFIs pertaining to different sets of energy receiver devices.

Aspect 46: The method of any of aspects 41 through 45, wherein the one-shot TDD configuration identifies only the one or more flexible resources indicated by the TDD configuration of the first message for energy transmission or information reception.

Aspect 47: The method of aspect 46, wherein the one-shot TDD configuration additionally identifies one or more energy transmission resources in the TDD configuration to reconfigure and add to the information reception resources, one or more information reception resources in the TDD configuration to reconfigure and add to the energy transmission resources, or both.

Aspect 48: The method of any of aspects 41 through 47, wherein transmitting the third message via group signaling that includes the SFI comprises: transmitting the SFI from among a plurality of SFIs included in the third message, a combination of at least two of the plurality of SFIs pertaining to the energy receiver device but for different time durations.

Aspect 49: The method of any of aspects 41 through 48, wherein transmitting the third message via group signaling that includes the SFI comprises: transmitting a combination identifier that indicates a combination of the SFI with one or more additional SFIs, that combination pertaining to the energy receiver device, with different time durations corresponding to each of the SFI and the one or more additional SFIs.

Aspect 50: The method of any of aspects 27 through 49, further comprising: transmitting a third message via signaling that is specific to the energy receiver device, the third message indicative of an energy receiver device-specific TDD configuration that identifies one or more flexible resources indicated by the TDD configuration of the first message to be used for energy reception or information transmission, wherein the flexible resources are able to be used for either energy reception or information transmission.

Aspect 51: The method of aspect 50, further comprising: configuring, based at least in part on the energy receiver device-specific TDD configuration, to use all symbols within one or more slots of the flexible resources indicated by the TDD configuration of the first message for energy transmission, or to use all symbols within one or more slots of the flexible resources indicated by the TDD configuration of the first message for information reception.

Aspect 52: The method of any of aspects 50 through 51, further comprising: identifying, based at least in part on the energy receiver device-specific TDD configuration, specific flexible resources of the TDD configuration of the first message for either energy transmission or information transmission, the specific flexible resources indicated as a number of symbols or slots from among the flexible resources.

Aspect 53: An apparatus for wireless communication at an energy receiver device, comprising a processor; memory coupled with the processor; and instructions stored in the memory and executable by the processor to cause the apparatus to perform a method of any of aspects 1 through 26.

Aspect 54: An apparatus for wireless communication at an energy receiver device, comprising at least one means for performing a method of any of aspects 1 through 26.

Aspect 55: A non-transitory computer-readable medium storing code for wireless communication at an energy receiver device, the code comprising instructions executable by a processor to perform a method of any of aspects 1 through 26.

Aspect 56: An apparatus for wireless communication at an energy transmitter device, comprising a processor; memory coupled with the processor; and instructions stored in the memory and executable by the processor to cause the apparatus to perform a method of any of aspects 27 through 52.

Aspect 57: An apparatus for wireless communication at an energy transmitter device, comprising at least one means for performing a method of any of aspects 27 through 52.

Aspect 58: A non-transitory computer-readable medium storing code for wireless communication at an energy transmitter device, the code comprising instructions executable by a processor to perform a method of any of aspects 27 through 52.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at an energy receiver device, comprising:

receiving a first message that includes information indicative of a time division duplex configuration for energy reception and information transmission, the time division duplex configuration indicating a temporal arrangement of energy reception resources and information transmission resources;

identifying that the temporal arrangement indicated by the time division duplex configuration includes a combination of energy reception resources, information transmission resources, and flexible resources, wherein the flexible resources are able to be used for either energy reception or information transmission;

receiving one or more energy signals during the energy reception resources in accordance with the time division duplex configuration, the one or more energy signals providing energy to the energy receiver device; and transmitting one or more second messages during the information transmission resources in accordance with the time division duplex configuration.

2. The method of claim 1, further comprising:

determining to use a flexible resource for energy reception or information transmission based at least in part on at least one of an energy storage capability or an energy charging capability of the energy receiver device.

3. The method of claim 1, wherein the time division duplex configuration is cell-specific to an energy transmitter device that is in communication with the energy receiver device.

4. The method of claim 3, wherein receiving the first message comprises:

receiving the information indicative of the time division duplex configuration via at least one of a system information block or a broadcast channel that includes a master information block.

5. The method of claim 3, wherein the time division duplex configuration is one of a plurality of pre-configured time division duplex configurations.

6. The method of claim 3, wherein the temporal arrangement of the energy reception resources and the information transmission resources is within a first time period having a first periodicity and that includes the energy reception resources followed by the information transmission resources, wherein the energy reception resources include one or more energy reception slots at a beginning of the first time period and the information transmission resources include one or more information transmission slots at an end of the first time period.

7. The method of claim 6, wherein the temporal arrangement of the energy reception resources and the information transmission resources further includes one or more energy reception symbols in a partial energy reception slot that follows the one or more energy reception slots and one or more information transmission symbols in a partial information transmission slot that precedes the one or more information transmission slots.

8. The method of claim 7, wherein the temporal arrangement of the energy reception resources and the information transmission resources further includes flexible resources in the partial energy reception slot, in the partial information transmission slot, and in one or more flexible slots that are temporally between the energy reception resources and the information transmission resources, wherein the flexible resources are able to be used for either energy reception or information transmission.

9. The method of claim 6, wherein the first periodicity aligns the first time period with a time division duplex radio frame boundary.

10. The method of claim 3, wherein the temporal arrangement of the energy reception resources and the information transmission resources is within a combination of a first time period having a first periodicity and a second time period having a second periodicity, wherein the first time period includes a first portion of the energy reception resources followed by a first portion of the information transmission resources and the second time period includes a second portion of the energy reception resources followed by a second portion of the information transmission resources, wherein the energy reception resources include one or more first energy reception slots at a beginning of the first time period and one or more second energy reception slots at a beginning of the second time period, and the information transmission resources include one or more first information transmission slots at an end of the first time period and one or more second information transmission slots at an end of the second time period.

11. The method of claim 10, wherein the temporal arrangement of the energy reception resources and the information transmission resources further includes one or more first energy reception symbols in a first partial energy reception slot that follows the one or more first energy reception slots in the first time period, one or more second energy reception symbols in a second partial energy reception slot that follows the one or more second energy reception slots in the second time period, one or more first information transmission symbols in a first partial information transmission slot that precedes the one or more first information transmission slots in the first time period, and one or more second information transmission symbols in a second partial information transmission slot that precedes the one or more second information transmission slots in the second time period.

12. The method of claim 11, wherein the temporal arrangement of the energy reception resources and the information transmission resources further includes flexible resources in the first partial energy reception slot, in the first partial information transmission slot, in the second partial energy reception slot, in the second partial information transmission slot, in one or more first flexible slots that are temporally between the one or more first energy reception slots and the one or more first information transmission slots, and in one or more second flexible slots that are temporally between the one or more second energy reception slots and the one or more second information transmission slots, wherein the flexible resources are able to be used for either energy reception or information transmission.

13. The method of claim 10, wherein the first periodicity and the second periodicity combine to align the temporal arrangement with a time division duplex radio frame boundary.

14. A method for wireless communication at an energy transmitter device, comprising:

transmitting a first message that includes information indicative of a time division duplex configuration for energy transmission and information reception, the time division duplex configuration indicating a temporal arrangement of energy transmission resources and information reception resources;

identifying that the temporal arrangement indicated by the time division duplex configuration includes a combination of energy reception resources, information transmission resources, and flexible resources, wherein the flexible resources are able to be used for either energy reception or information transmission;

transmitting one or more energy signals during the energy transmission resources in accordance with the time division duplex configuration, the one or more energy signals providing energy to an energy receiver device; and receiving one or more second messages during the information reception resources in accordance with the time division duplex configuration.

15. The method of claim 14, further comprising:

configuring a flexible resource for energy transmission or information reception based at least in part on at least one of an energy storage capability or an energy charging capability of the energy receiver device.

16. The method of claim 14, wherein the time division duplex configuration is cell-specific to an energy transmitter device that is in communication with the energy receiver device.

17. The method of claim 16, wherein transmitting the first message comprises:

transmitting the information indicative of the time division duplex configuration via at least one of a system information block or a broadcast channel that includes a master information block.

18. The method of claim 16, wherein the time division duplex configuration is one of a plurality of pre-configured time division duplex configurations.

19. The method of claim 16, wherein the temporal arrangement of the energy transmission resources and the information reception resources is within a first time period having a first periodicity and that includes the energy transmission resources followed by the information reception resources, wherein the energy transmission resources include one or more energy transmission slots at a beginning of the first time period and the information reception resources include one or more information reception slots at an end of the first time period.

20. The method of claim 19, wherein the temporal arrangement of the energy transmission resources and the information reception resources further includes one or more energy transmission symbols in a partial energy transmission slot that follows the one or more energy transmission slots and one or more information reception symbols in a partial information reception slot that precedes the one or more information reception slots.

21. The method of claim 20, wherein the temporal arrangement of the energy transmission resources and the information reception resources further includes flexible resources in the partial energy transmission slot, in the partial information reception slot, and in one or more flexible slots that are temporally between the energy transmission resources and the information reception resources, wherein the flexible resources are able to be used for either energy transmission or information reception.

22. The method of claim 19, wherein the first periodicity aligns the first time period with a time division duplex radio frame boundary.

23. The method of claim 16, wherein the temporal arrangement of the energy transmission resources and the information reception resources is within a combination of a first time period having a first periodicity and a second time period having a second periodicity, wherein the first time period includes a first portion of the energy transmission resources followed by a first portion of the information reception resources and the second time period includes a second portion of the energy transmission resources followed by a second portion of the information reception resources, wherein the energy transmission resources include one or more first energy transmission slots at a beginning of the first time period and one or more second energy transmission slots at a beginning of the second time period, and the information reception resources include one or more first information reception slots at an end of the first time period and one or more second information reception slots at an end of the second time period.

24. The method of claim 23, wherein the temporal arrangement of the energy transmission resources and the information reception resources further includes one or more first energy transmission symbols in a first partial energy transmission slot that follows the one or more first energy transmission slots in the first time period, one or more second energy transmission symbols in a second partial energy transmission slot that follows the one or more second energy transmission slots in the second time period, one or more first information reception symbols in a first partial information reception slot that precedes the one or more first information reception slots in the first time period, and one or more second information reception symbols in a second partial information reception slot that precedes the one or more second information reception slots in the second time period.

25. The method of claim 24, wherein the temporal arrangement of the energy transmission resources and the information reception resources further includes flexible resources in the first partial energy transmission slot, in the first partial information reception slot, in the second partial energy transmission slot, in the second partial information reception slot, in one or more first flexible slots that are temporally between the one or more first energy transmission slots and the one or more first information reception slots, and in one or more second flexible slots that are temporally between the one or more second energy transmission slots and the one or more second information reception slots, wherein the flexible resources are able to be used for either energy transmission or information reception.

26. The method of claim 23, wherein the first periodicity and the second periodicity combine to align the temporal arrangement with a time division duplex radio frame boundary.

27. An apparatus for wireless communication at an energy receiver device, comprising:

a processor;

memory coupled with the processor; and instructions stored in the memory and executable by the processor to cause the apparatus to:

receive a first message that includes information indicative of a time division duplex configuration for energy reception and information transmission, the time division duplex configuration indicating a temporal arrangement of energy reception resources and information transmission resources;

identifying that the temporal arrangement indicated by the time division duplex configuration includes a combination of energy reception resources, information transmission resources, and flexible resources, wherein the flexible resources are able to be used for either energy reception or information transmission;

receive one or more energy signals during the energy reception resources in accordance with the time division duplex configuration, the one or more energy signals providing energy to the energy receiver device; and transmit one or more second messages during the information transmission resources in accordance with the time division duplex configuration.

28. An apparatus for wireless communication at an energy transmitter device, comprising:

a processor;

memory coupled with the processor; and instructions stored in the memory and executable by the processor to cause the apparatus to:

transmit a first message that includes information indicative of a time division duplex configuration for energy transmission and information reception, the time division duplex configuration indicating a temporal arrangement of energy transmission resources and information reception resources;

identifying that the temporal arrangement indicated by the time division duplex configuration includes a combination of energy reception resources, information transmission resources, and flexible resources, wherein the flexible resources are able to be used for either energy reception or information transmission;

transmit one or more energy signals during the energy transmission resources in accordance with the time division duplex configuration, the one or more energy signals providing energy to an energy receiver device; and receive one or more second messages during the information reception resources in accordance with the time division duplex configuration.

* * * * *